May 19, 1970     R. M. HENDERSON ET AL     3,513,444
VOLUME DETERMINING SYSTEM
Filed Aug. 8, 1966     17 Sheets-Sheet 1
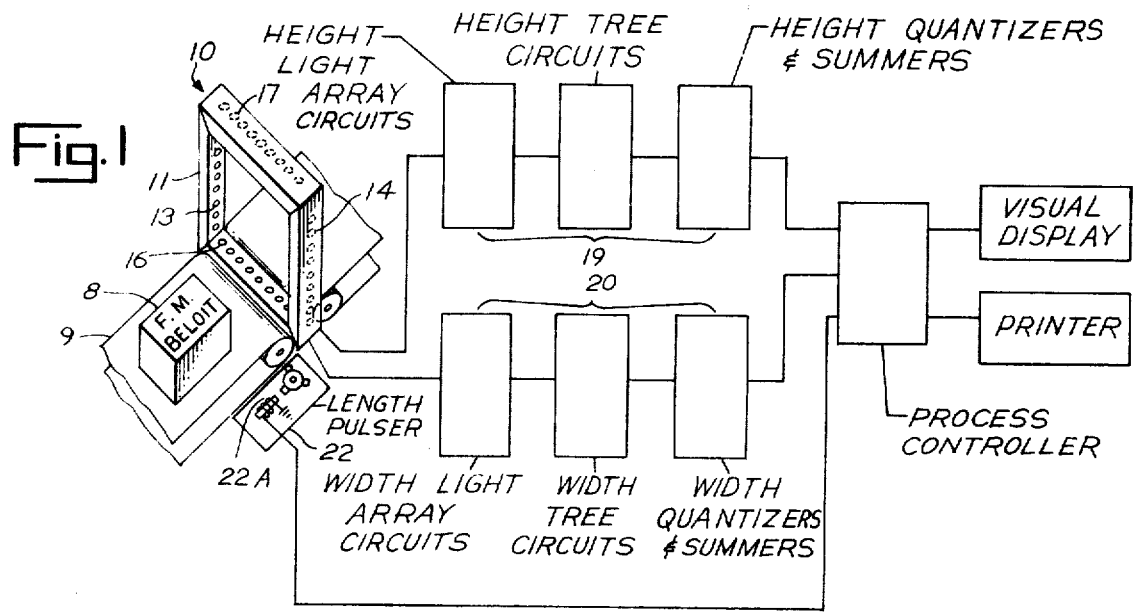
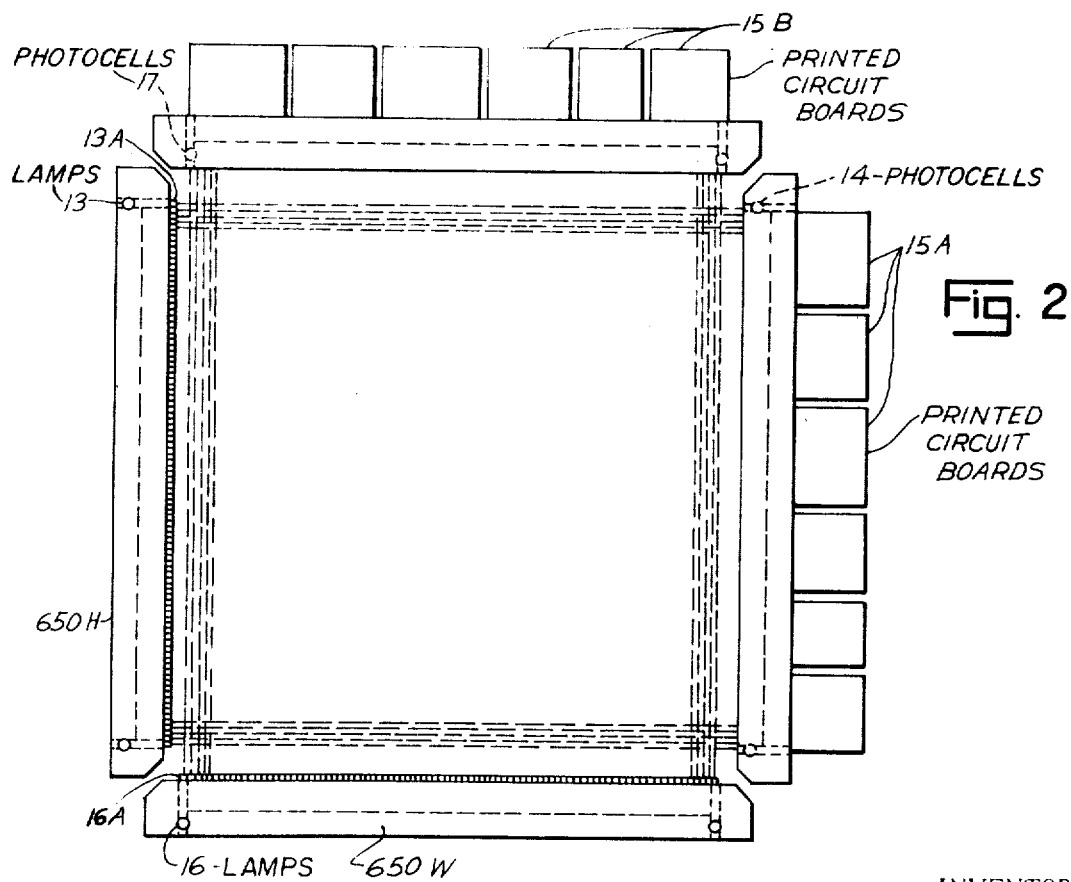
INVENTOR.
ROBERT M. HENDERSON, LOWELL E. MILLER
& RICHARD ZECHLIN
BY Petherbridge, O'Neill & Aubel
ATTORNEYS

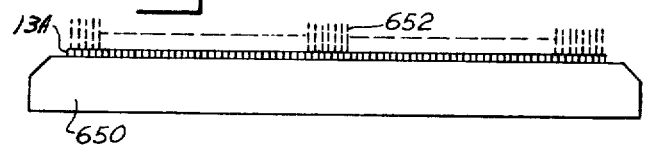
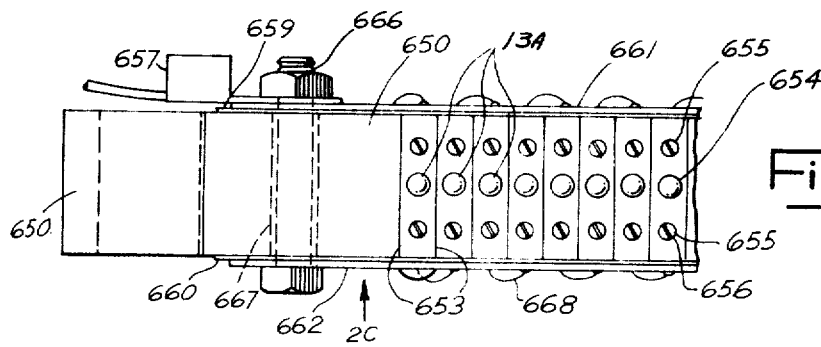
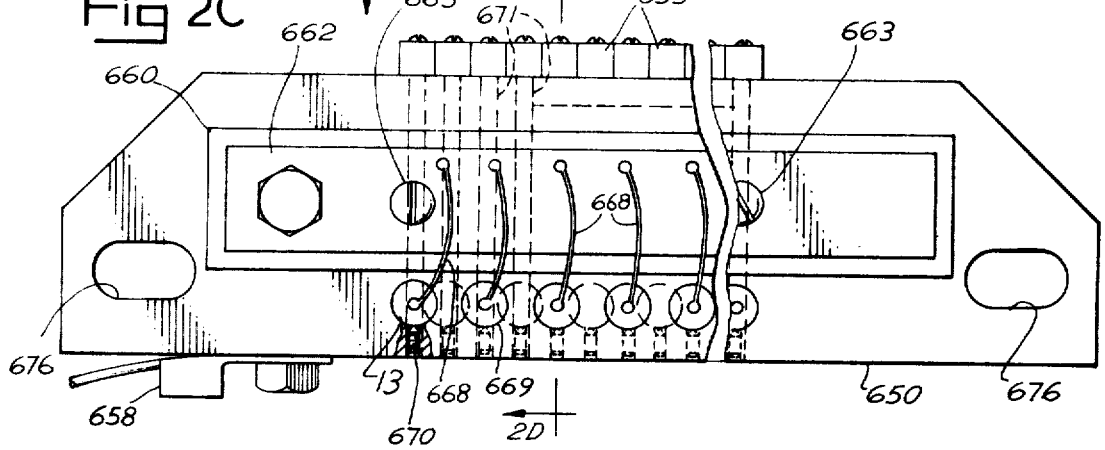
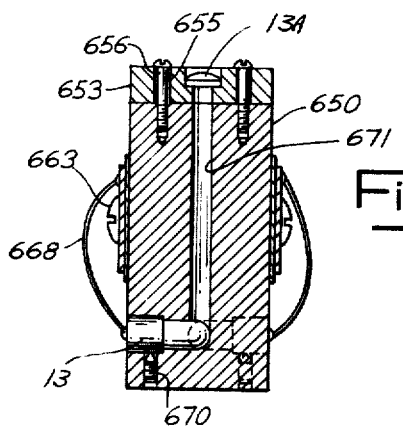

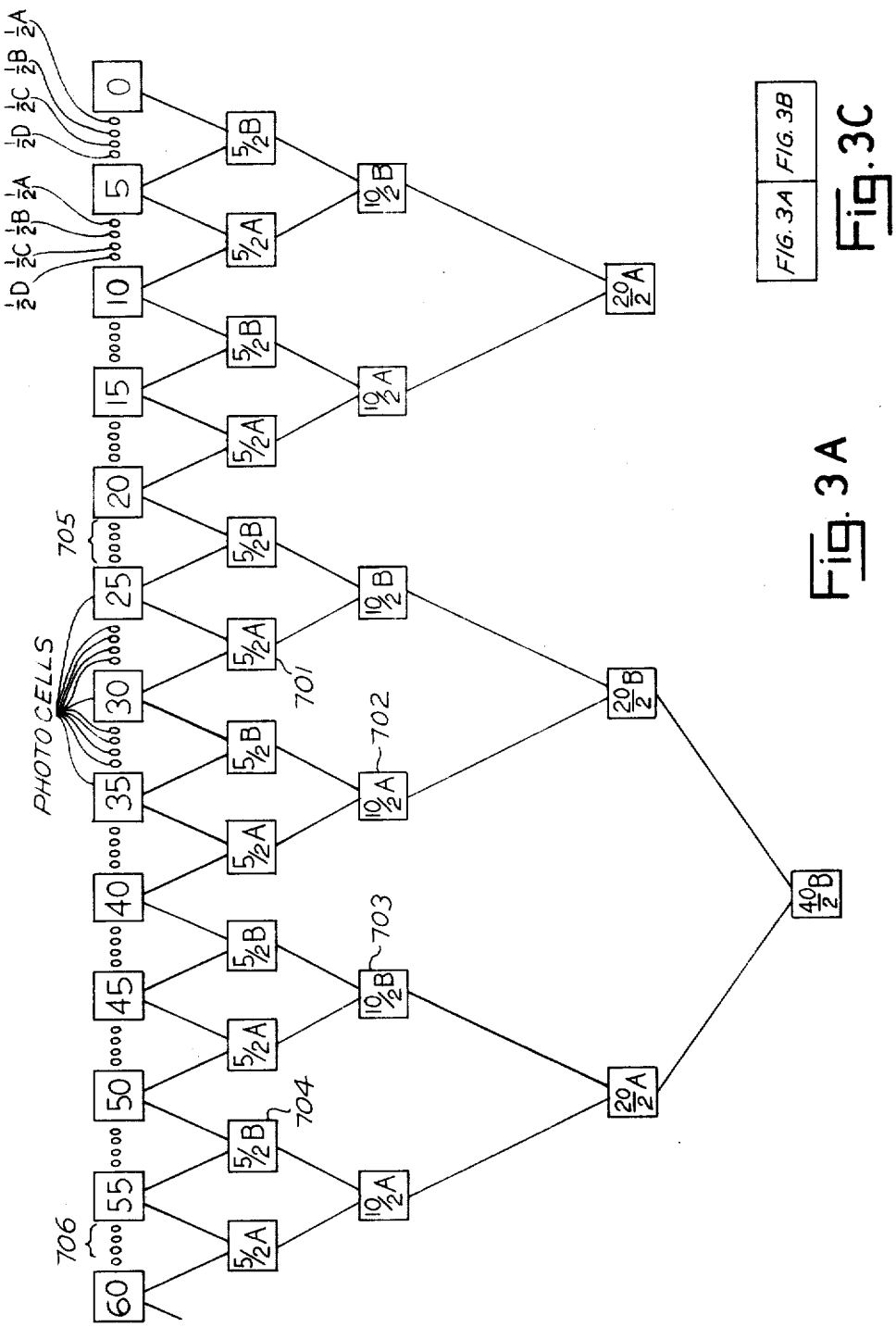

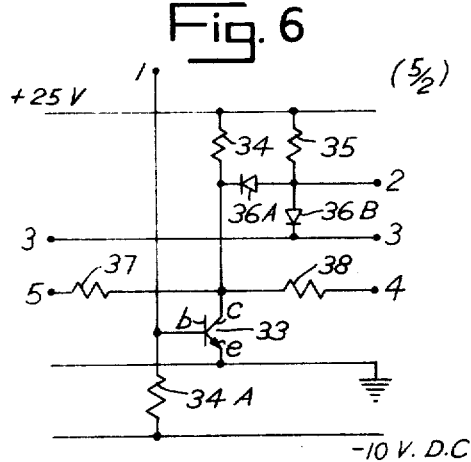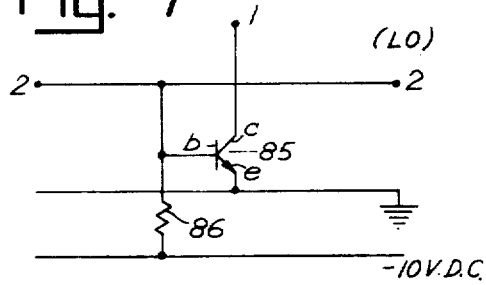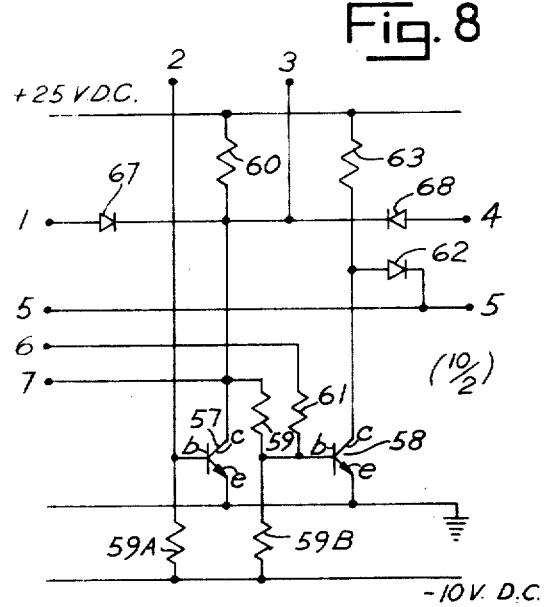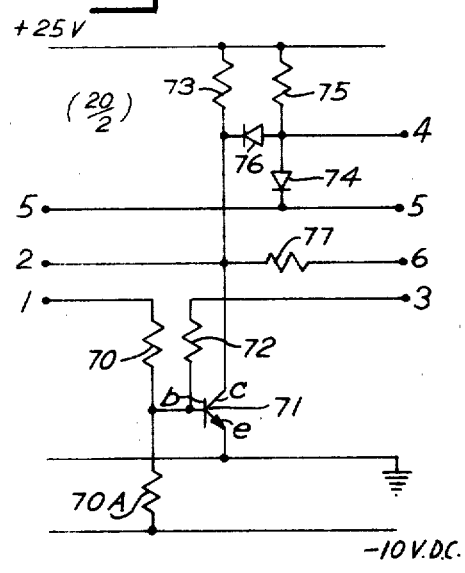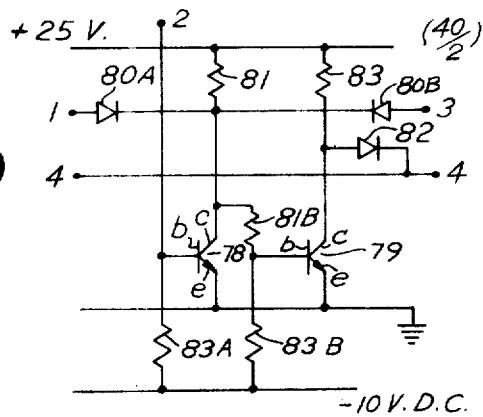

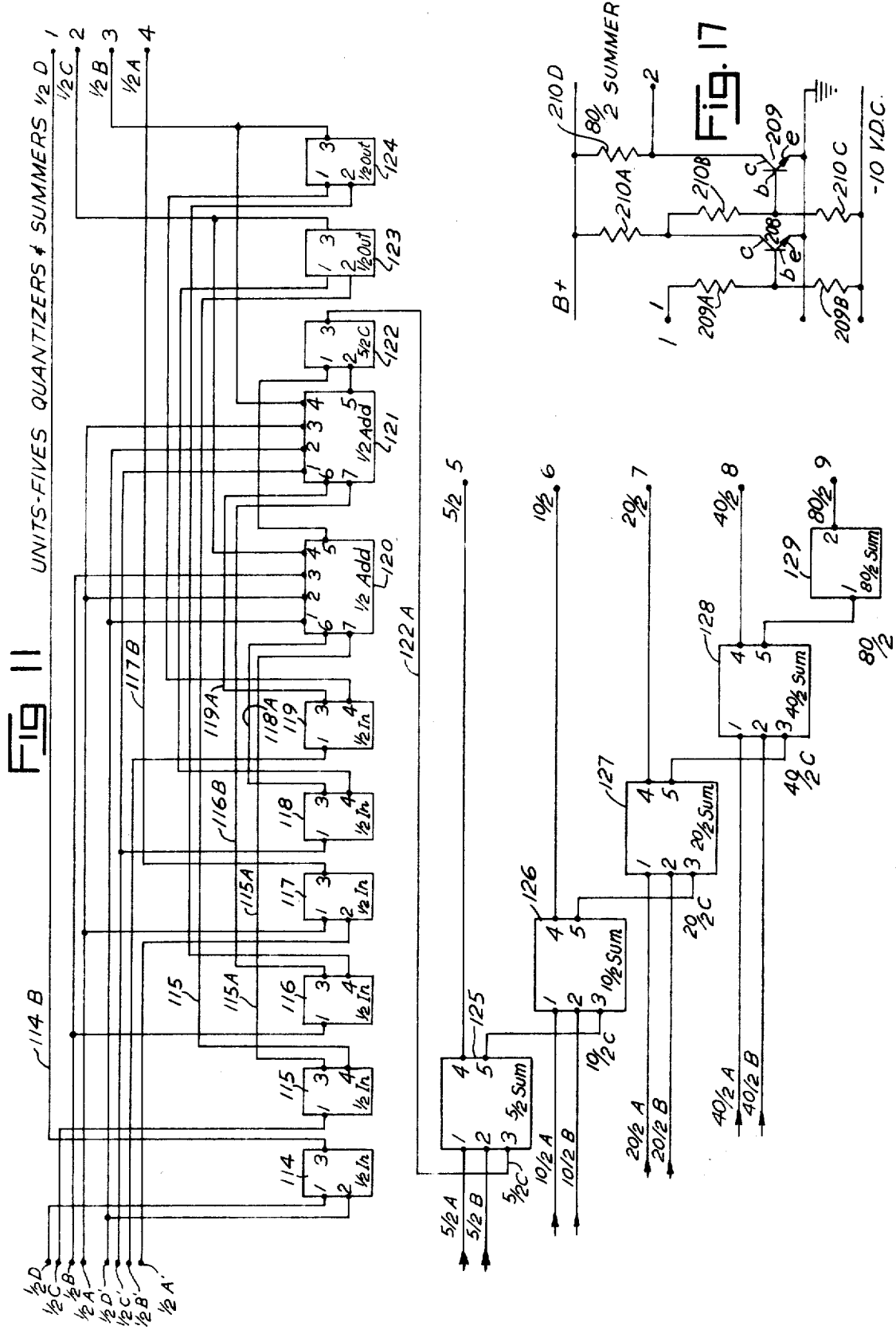

N- SUMMER
N = 5/2 OR 10/2 OR 20/2 OR 40/2

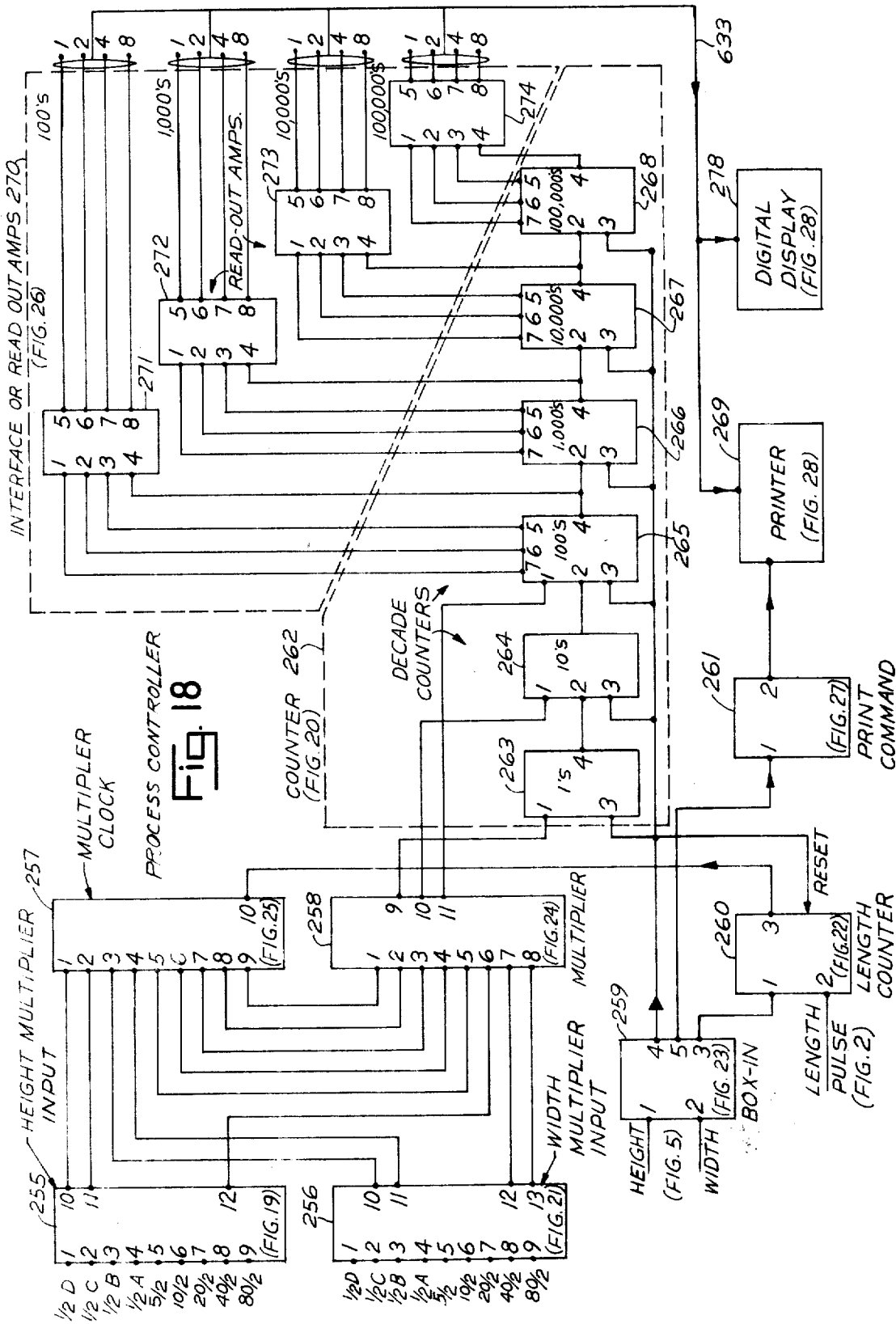

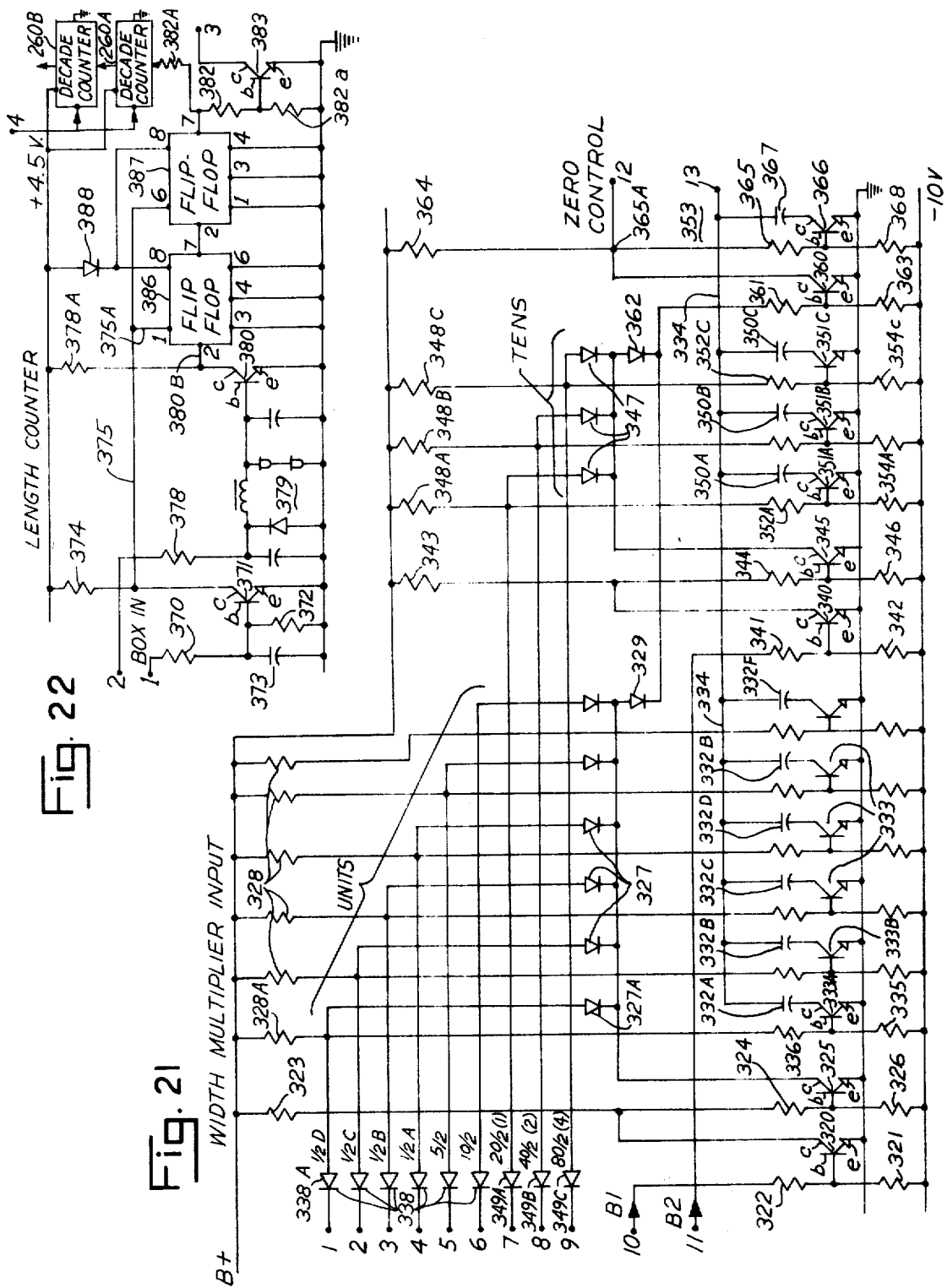

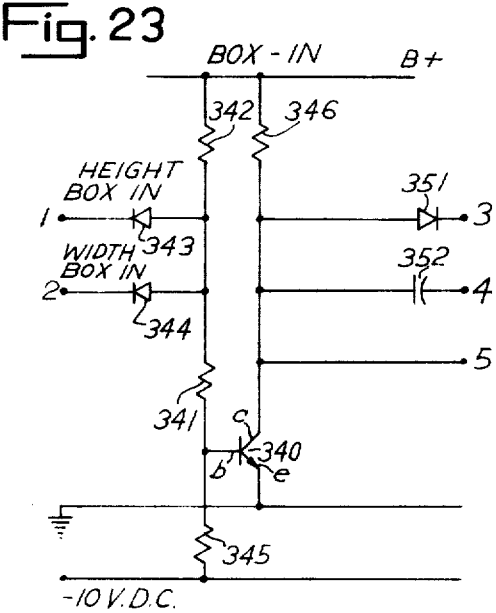
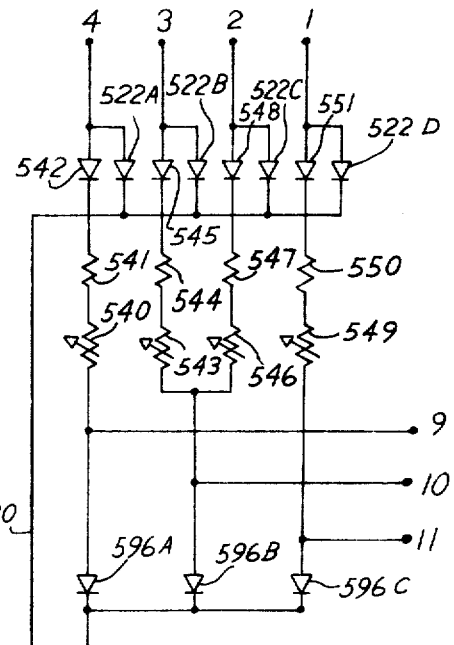
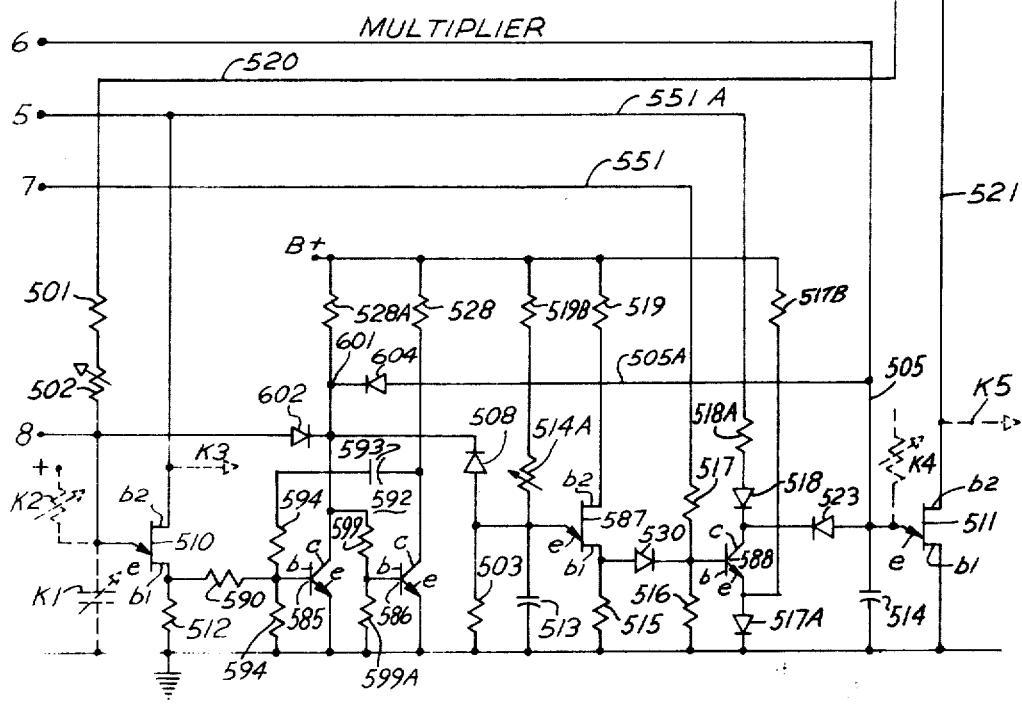

INTERFACE MEMORY
-READ-OUT AMPLIFIERS

PRINT COMMAND

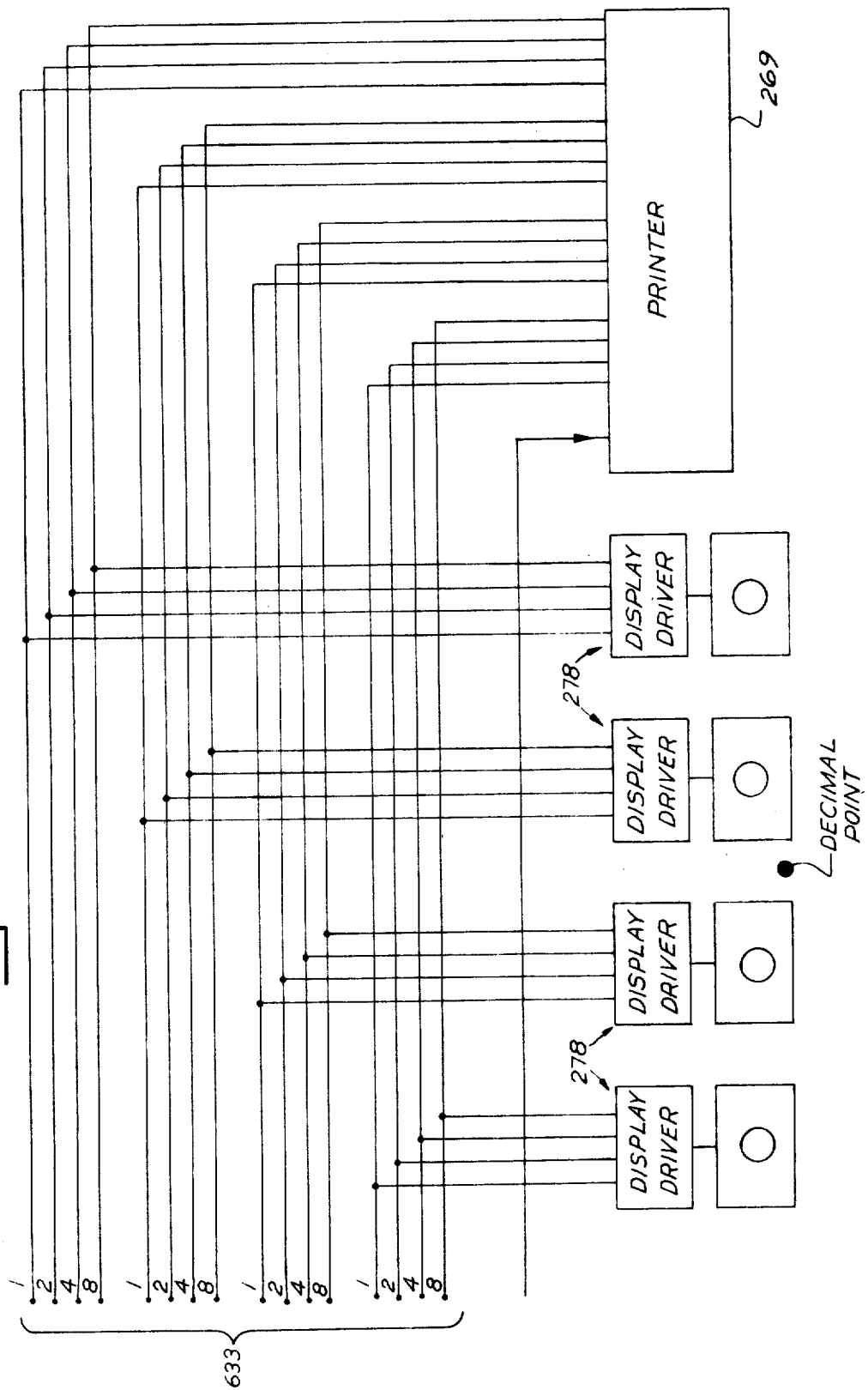
Fig. 28 DIGITAL DISPLAY & PRINTER

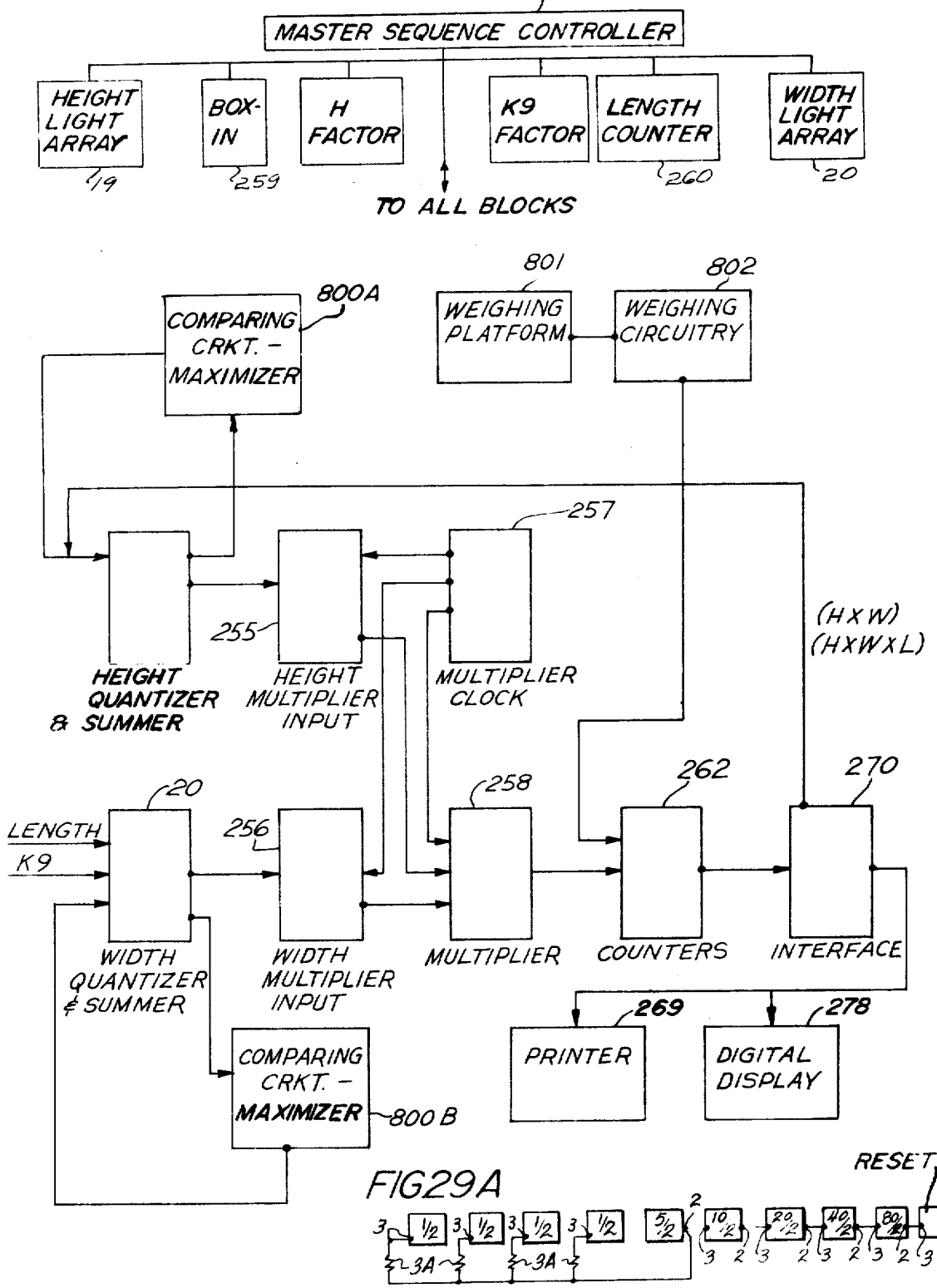

United States Patent Office 3,513,444
Patented May 19, 1970

3,513,444
VOLUME DETERMINING SYSTEM
Robert M. Henderson, Williams Bay, and Lowell E. Miller and Richard Zechlin, Beloit, Wis., assignors to Fairbanks Morse Inc., New York, N.Y., a corporation of Delaware
Filed Aug. 8, 1966, Ser. No. 571,112
Int. Cl. G01f 17/00
U.S. Cl. 340—172.5                    29 Claims

ABSTRACT OF THE DISCLOSURE

A system and method for obtaining the volume of an object moving along a selected path is disclosed. The system includes apparatus for incrementally sensing two dimensions of a moving object. Circuitry is provided for multiplying data representative of said incremental dimensions and summing the resultant of said multiplications whereby the volume of the object is determined.

---

This invention relates to a measuring system and, more particularly, to a measuring system arranged to measure the height, width, and length of an article including means for determining the volume of the article.

Accordingly, it is a principal object of the present invention to provide an improved means of obtaining the height, width and length measurements of an article and combining these measurements to obtain and determine the volume of the article.

It is another object of this invention to provide a means for obtaining the volume of a moving article which article may be of any cross section or shape.

It is another object of the present invention to provide an improved apparatus and method for obtaining or computing the volume of an article.

It is another object of the invention to provide a means for obtaining the height, width, and length measurements of an article moving through a selected plane and combining the height, width, and length to obtain the volume of the article.

It is yet another object of the present invention to provide a means for measuring the height and width of an article moving through a sensing field, such as a photosensitive field, a sonar field or a radar field, and determining the number of selected increments of the article passing through said sensing field whereby the height, width, and length of the article can be multiplied to obtain the volume measurement.

It is still a further object of the invention to provide a novel means and method of computing the volume of a moving article wherein given increments of the height and width of an article are measured and multiplied with the length of a selected increment to give a volume measurement of that discrete increment and whereby said volume measurements of said discrete increments are summed to provide the total volume of an article.

It is another object of the present invention to provide a means of obtaining the volume of a moving article at high speed.

It is another object of the present invention to obtain the volume of an article of any given shape or form.

It is still another object of the present invention to provide an apparatus for computing the volume of the article wherein the major portion of the apparatus is essentially all electronic.

Yet another object of the present invention is to provide an apparatus useful in determining the volume of an article including an improved photosensitive system.

Still another object of the present invention is to provide an apparatus useful in determining the volume of an article including improved circuitry for processing data obtained from a photoelectric system.

A still further object of the present invention is to provide an apparatus useful in determining the volume of an article including improved circuitry for combining and multiplying data derived from a photosensitive system to obtain the volume of the article.

Another object of the invention is to obtain the volume of a moving object with a high degree of accuracy.

In one embodiment of the invention, the measurement representative of the volume of the article may be applied directly to a control means or it may be combined with measurement information of the weight of the given article to thereby obtain data which may be used such as in obtaining rate information, shipping charges, loading criteria, billing information, etc., for shipment of the article.

Accordingly, it is still a further object of the present invention to provide an improved apparatus for obtaining the volume of an article and coupling the volume data to the control means.

For purposes of simplicity in description, the term "box" will be used hereinafter and the term will be understood to refer to articles, packages, materials, parcels, mailbags, cargo, objects, etc.

The foregoing and other objects, features and advantages of the invention will be apparent from the following more particular description of preferred embodiments of the invention as illustrated in the accompanying drawings wherein:

FIG. 1 is a block diagram of an apparatus or system in accordance with the invention including a showing of a lamp frame and conveying means for conveying a box through the field of a light array comprising a series of lights or lamps and photosensitive cells;

FIG. 2 is a front view of the frame of FIG. 1 containing the light array and indicating the positioning of the lamps, photocells, and the associated lenses;

FIG. 2A is a side view of the member or block on which the lamps are mounted.

FIG. 2B is a front view (approximately full size) of the member of FIG. 2A showing the mounting of the lenses;

FIG. 2C is a side view (enlarged with respect to FIG. 2A) showing the positioning of the lamps and the lenses;

FIG. 2D is a view in cross section showing the details of the mounting of the lamps and lenses;

FIG. 3A and 3B is a block diagram of the electronic arrangement of the photocell circuits commonly known as an electronic tree;

FIG. 3C is a sketch showing the relative orientations of FIGS. 3A and 3B;

FIG. 6 is a schematic diagram showing the circuit details of the 5/2 circuits of FIG. 4;

FIG. 7 is a schematic diagram of the LO or Lock-Out circuits of FIG. 4;

FIG. 8 is a schematic diagram showing the circuit details of the 10/2 circuits of FIG. 4;

FIG. 9 is a schematic diagram of the circuit details of the 20/2 circuits of FIG. 4;

FIG. 10 is a schematic diagram of the circuit details of the 40/2 circuit blocks of FIG. 4;

FIG. 11 is a block diagram of the Units Quantizers and Summers circuits which are arranged to receive the output from the electronic tree circuits of FIG. 4 and to combine the code received from the electronic circuits into a simplified code;

Figure 12:
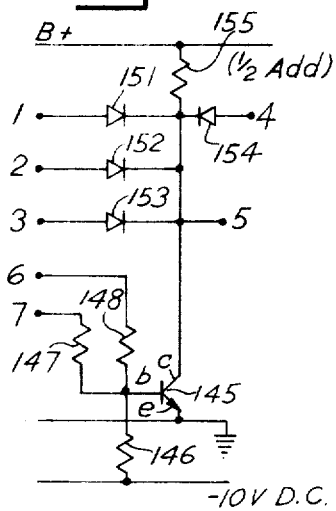
Figure 13:
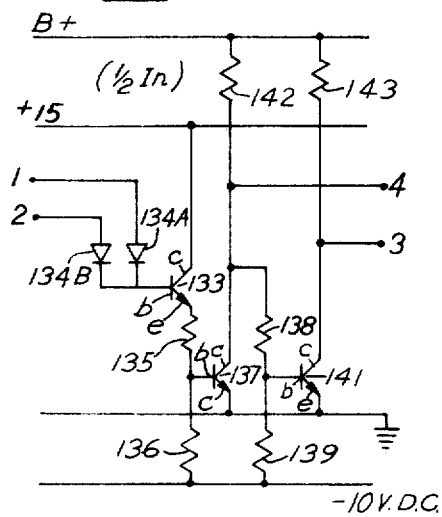
Figure 14:
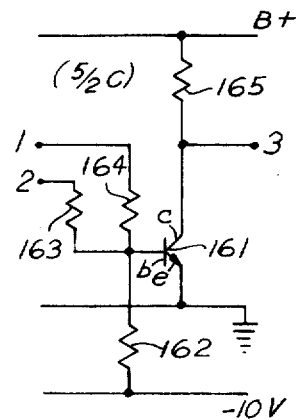
Figure 15:
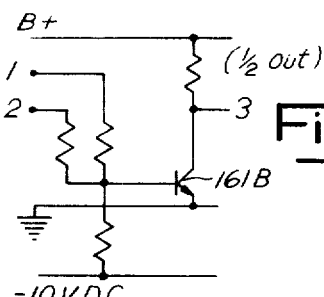
Figure 16:
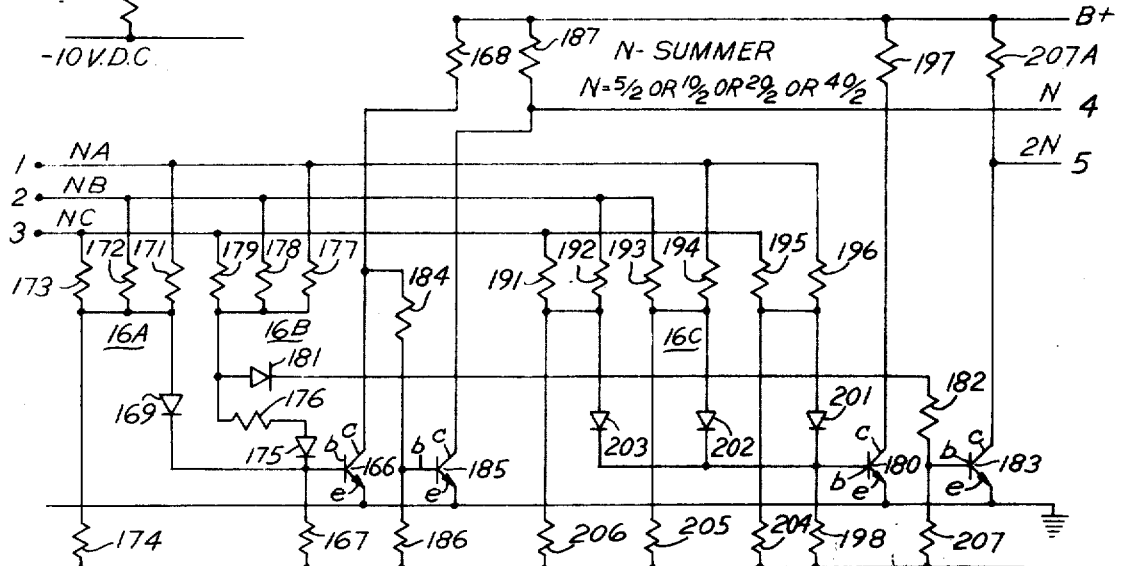
Figure 19:
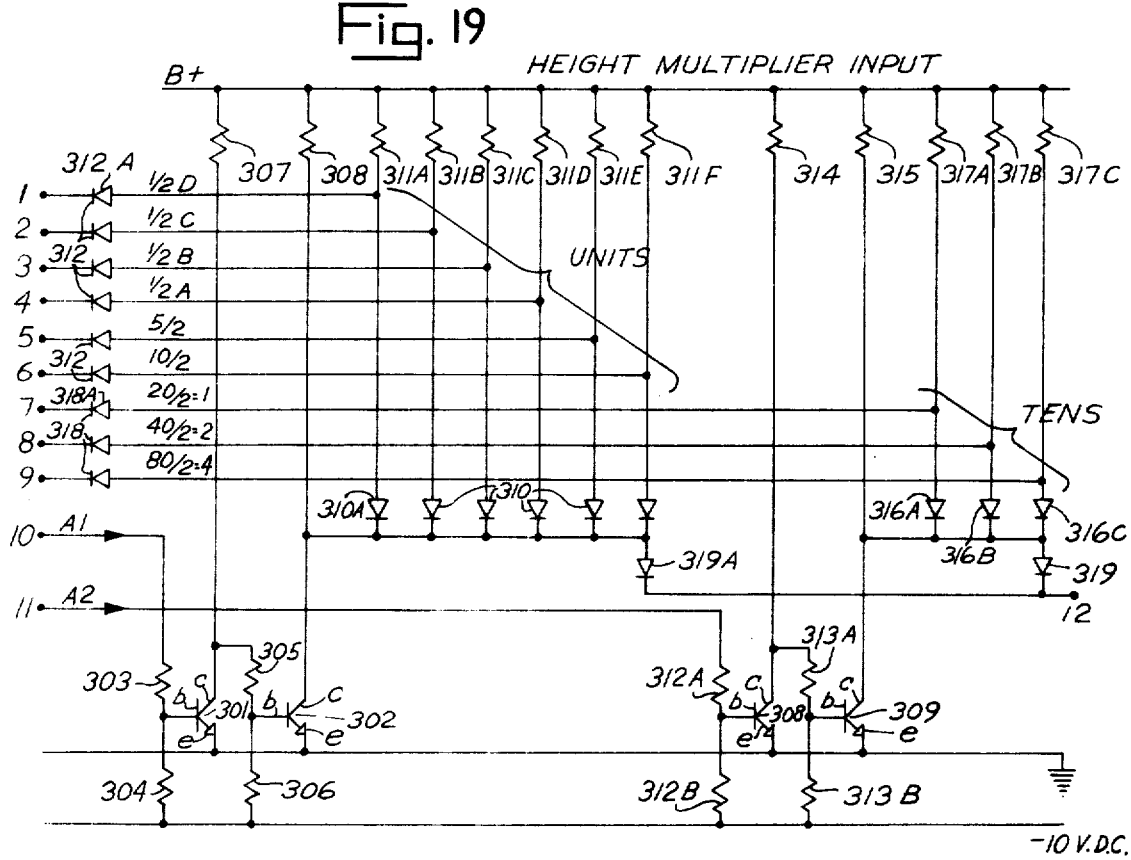
Figure 20:
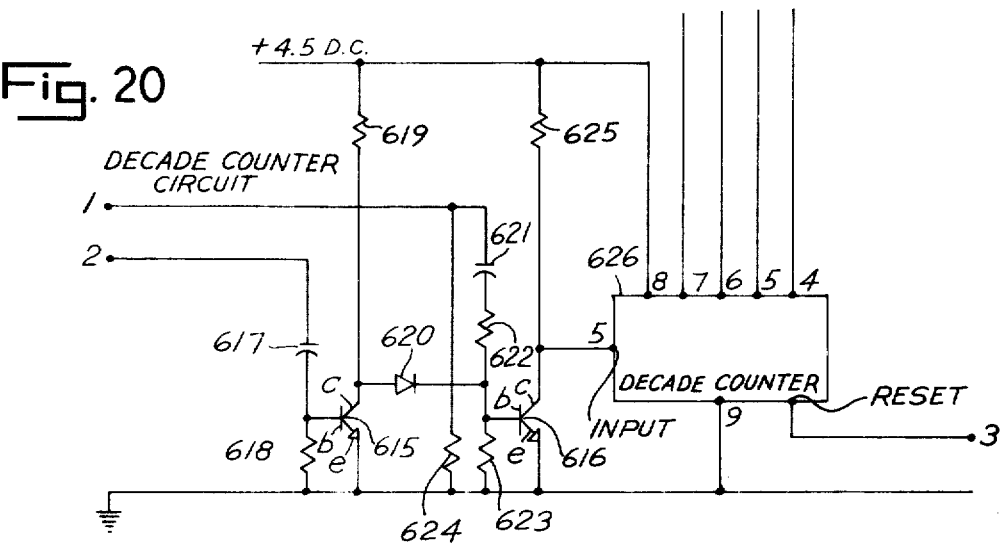
Figure 25:
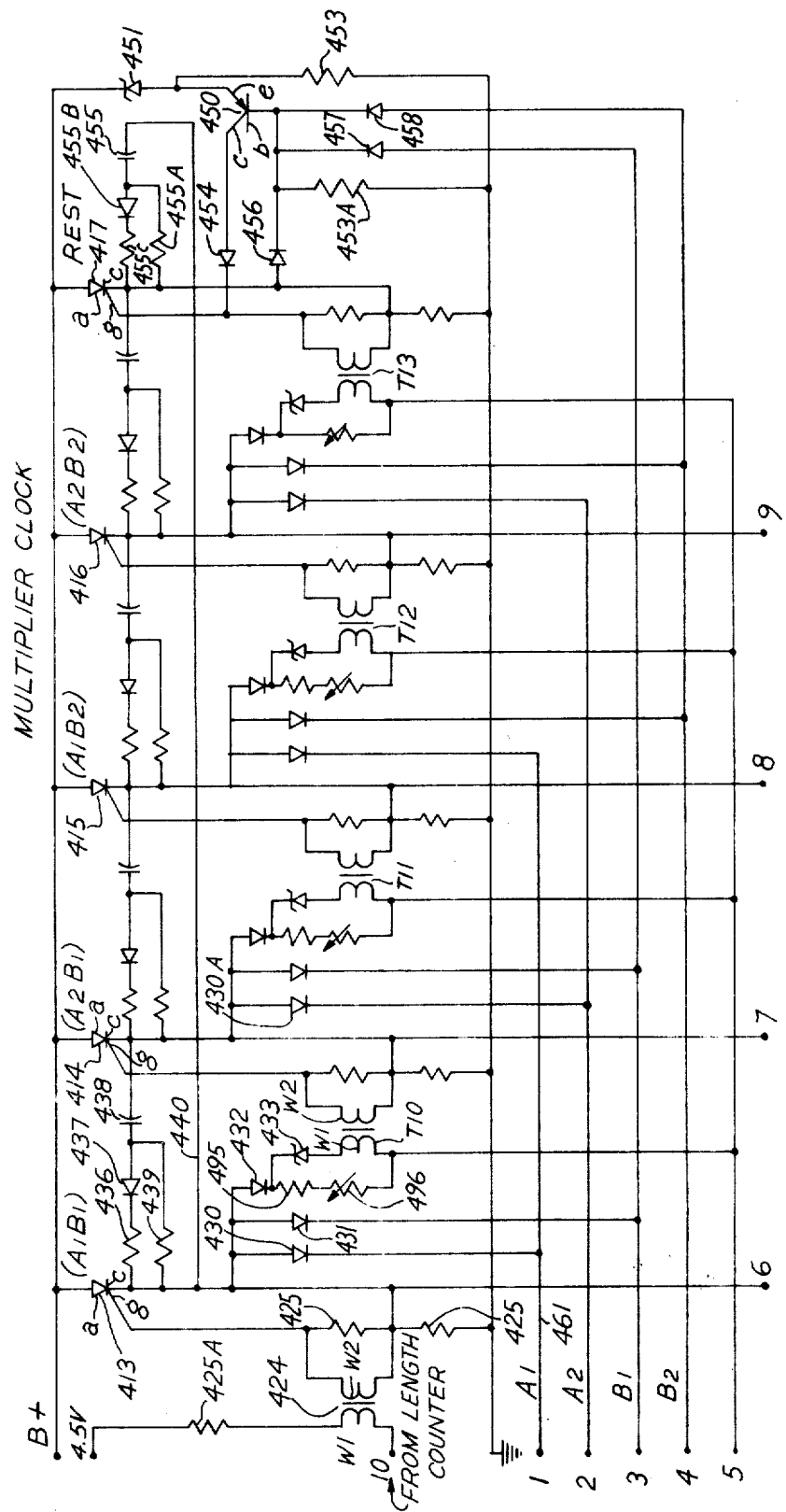
Figure 26:
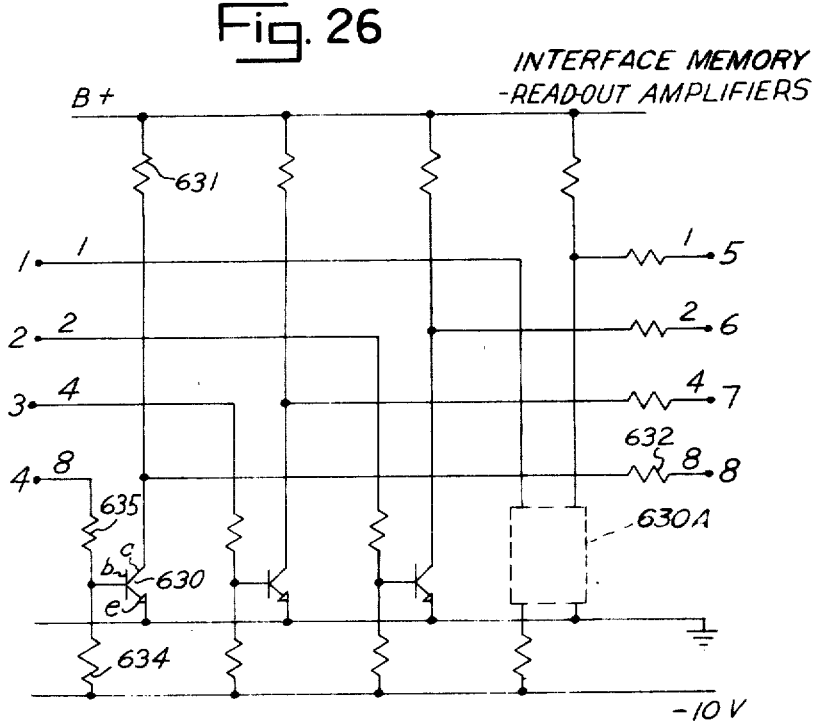
Figure 27:
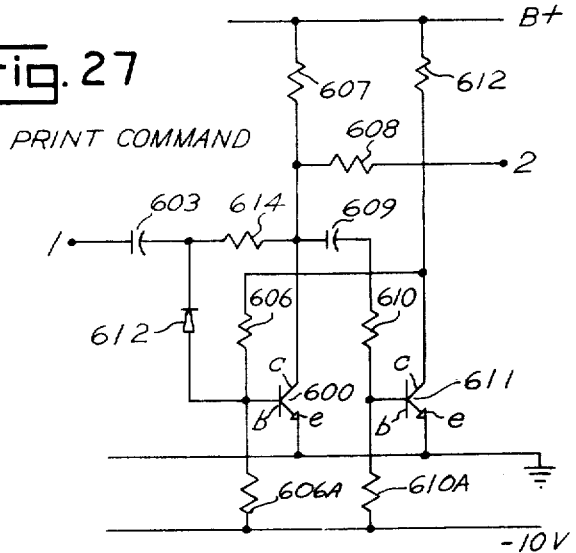

FIG. 12 shows a schematic diagram of the details of the 1/2 Add blocks 120 and 121 of FIG. 11;

FIG. 13 is a schematic diagram showing the circuit details of the 1/2 In blocks 114–119 of FIG. 11;

FIG. 14 is a schematic diagram showing the circuit details of the 5/2C block 122 of FIG. 11;

FIG. 15 is a schematic diagram of the 1/2 Out blocks 123 and 124 of FIG. 11;

FIG. 16 is a schematic diagram showing the circuit details of the N-Summers 125–128 of FIG. 11;

FIG. 17 is a schematic diagram of the 80/2 Summers block 129 of FIG. 11;

FIG. 18 is a block diagram of the Process Controller circuit of FIG. 1 showing the Process Controller in more detail;

FIG. 19 is a schematic diagram of the Height Multiplier Input block 255 of FIG. 18;

FIG. 20 is a schematic diagram of each of the Decade Counter Circuits 263–268 of FIG. 18;

FIG. 21 is a schematic diagram of the circuit details of the Width Multiplier Input block 256 of FIG. 18;

FIG. 22 is a schematic diagram of the Length Counter block 260 of FIG. 18;

FIG. 23 is a schematic diagram of the circuit details of the Box-In signal block 259 of FIG. 18;

FIG. 24 is a schematic diagram of the circuit of the Multiplier 258 of FIG. 18;

FIG. 25 is a schematic diagram of the Multiplier Clock circuit 257 of FIG. 18;

FIG. 26 is a schematic diagram of the Read-Out Amplifier blocks 271–274 of FIG. 18;

FIG. 27 is a schematic diagram of a Print Command block 261 of FIG. 18;

FIG. 28 is a block diagram showing in somewhat more detail a printer block 269 and a digital display block 278 of FIG. 18;

FIG. 29 is a block diagram showing a system for obtaining cubed volume; and

FIG. 29A is a block diagram showing certain connections for the Comparing Circuits 800A and 800B of FIG. 29.

INDEX (This index is provided for the purpose of ready reference in reading the specification.)

| | Col. |
|---|---|
| Functional Concept | 4 |
| Description of Light Array | 6 |
| Increment of Measurement | 6 |
| System Block Diagram | 7 |
| Lamp or Light Frame | 7 |
| Photocells and Associated Circuits | 8 |
| Photocell Circuit Details | 9 |
| Major or Fives Photocells | 10 |
| 5/2 Blocks | 11 |
| 10/2 Blocks | 12 |
| 20/2 Blocks | 13 |
| 40/2 Blocks | 13 |
| Lock-Out Feature | 14 |
| 10/2 Lock-Out | 14 |
| LO Circuit Lock-Out | 14 |
| Nullifying Feature | 15 |
| Minor or Units Photocells | 16 |
| Units-Fives Quantizers and Summers Circuits | 18 |
| 1/2 IN Circuits | 19 |
| 1/2 Add Circuits | 19 |
| 5/2C Circuit | 20 |
| 1/2 Out Circuit | 20 |
| N-Summers | 20 |
| 80/2 Summer | 22 |
| Operation of Units-Fives Quantizers and Summers with Box Covering 38 Photocells | 22 |
| Process Controller | 24 |
| Height Multiplier Input Circuit | 25 |
| Units Input Portion of Height Multiplier Input | 25 |
| Tens Input Portion of Height Multiplier Input | 26 |
| Operation of Height Multiplier Input Circuit | 27 |
| Width Multiplier Input | 28 |
| Units Input Portion of Width Multiplier Input | 28 |
| Tens Input Portion of Width Multiplier Input | 29 |
| Zero Control of the Width Multiplier Input | 30 |
| Box-In Circuit | 31 |
| Length Counter | 32 |
| Multiplier Clock | 33 |
| Rest Control | 35 |
| Commutating or Stepping Operation | 35 |
| Multiplying Circuit (Multplier) | 37 |
| Operation of Synchronizing Portion of Multiplier | 40 |
| Operation of the Multiplier Clock and Multiplier Inputs | 41 |
| Print Command | 43 |
| Counters | 44 |
| Carry Operation | 45 |
| Interface or Amplifiers | 46 |
| Printer and Digital Display | 46 |
| Data Processing Operation | 46 |

FUNCTIONAL CONCEPT

The apparatus or system of the invention basically provides a system and method for obtaining measurements of a box moving through the field of a light array from which the volume of the article may be computed. The system of the invention utilizes a light array comprising light sources and photocells energized by the light sources and arranged as a matrix to obtain an indication of the dimensions of the box. For purposes of simplicity in this description, the term "photocell" and "cell" will be used interchangeably as will the terms "light" and "lamp."

Before describing the physical details of the lamp frame and light array and the electronic circuitry represented in FIG. 1, the functional concept of the system of the invention will first be described. For present purposes, the system may be considered to comprise two groups of lights or lamps functioning as light emitters with each lamp separately associated with its own suitable photosensitive cell functioning as a receiver and each photocell being responsive or sensitive to only its associated lamp. Note that each of the lamps with an associated lens is arranged to provide separate, parallel, and continuous light beams such that a single beam of light will impinge only upon its associated photocell. As mentioned hereinabove, other beam energy providing means such as sonar or radar could be employed to provide the matrix or plane of beams.

The characteristics of the photoconductive cells used as the receivers are such that its electrical resistance when it is dark or covered, that is, its resistance with a low level light energy impinging upon the cell, is several orders of magnitude higher than its resistance when it is uncovered and light is energizing or impinging on the cell. As will be described in detail hereinafter, an electronic circuit arrangement is provided to obtain a photocell circuit providing a digital output; that is, an on-or-off signal, depending upon the resistance state of the photocell; and, in one particular embodiment, the photocells and their associated circuitry specifically provide a digital count of the number of photocells in the dark condition.

As mentioned, two distinct groups of lamps or light sources and their associated photocells are employed. One group of light sources with their associated lenses is arranged to provide a plurality of parallel, horizontally oriented beams to obtain a height measurement of a box, and the other group of light sources with their associated lenses is arranged to provide a plurality of parallel, vertically oriented beams to obtain a width measurement of a box. The two groups of lamps are preferably positioned to form an essentially vertical plane of light rays. The spacing between each of the light beams is the same; and, accordingly the number of vertical beams interrupted by a box gives an indication of the width dimension of the box and the number of horizontal beams interrupted by a box gives an indication of the height dimension of the box. As is known, instead of a plurality of light sources, a single light source and a plurality of lenses could comprise the beam providing means.

As will be described, the photocell arrangement provided by the invention purposely does not discriminate as to the position of the photocells in the light array. If, for example, a box is passed through the light array, the same relative measurement of the box is obtained whether the box is interrupting cell numbers 10–40 or cells 30–60.

The box to be measured and whose volume is to be computed is moved through the measuring field of the light array; for example, as by a conveyor belt. The movement of the conveyor is associated with a digital output representative of the travel of the belt. For this purpose, a pulse forming means such as a sharply toothed gear wheel, associated with an electromagnetic pulse developing means is arranged to be driven in response to the travel of the belt to provide a pulsed output wherein each pulse represents a selected unit of length. As will be discussed hereinafter, selected pulses initiate a multiplication operation of the width times the height. As will be appreciated for certain applications, as when the speed of the conveyor belt is constant, a pulse forming means operating substantially independently of the conveyor belt may be employed.

The light array of the system of the invention thus is capable of measuring the box height and box width at any given instant of time, and also is capable of providing pulses indicative of a unit of length or extent of travel of the box through the plane of the light array.

Assume that a box whose volume is to be computed is traveling toward the plane of the light rays or measuring position but the box has not interrupted the light rays. For the period when the box is not interrupting the light rays, the height and width signals indicate zero and, therefore, for an increment of length $L=1$, a multiplication of width times height times length to give a volume measurement will be given by the following relation:

$$\text{Width} \times \text{Height} \times \text{Length} = 0 \times 0 \times 1 = 0$$

Assume now that the box has just interrupted the beams of light associated with both the height and width measurement; and assume that eight light beams indicative of seven spaces or increments of height are interrupted on the height receivers, and eleven light beams indicative of ten spaces or increments of width are interrupted on the height receivers. The next selected pulse representative of unit of length would thus initiate the following multiplication:

$$\text{Width} \times \text{Height} \times \text{Length} = 10 \times 7 \times 1 = 70 \text{ units}$$

If the output indicative of 70 units is a series of pulses directly associated with the multiplication of the width and the height, these pulses can be fed directly into a counter.

Assume the box continues to move on the conveyor and that the next selected unit length pulse is received, at which time the width and height are again measured and another multiplication operation is initiated. Assume the width has changed to 12 and the height has changed to 20 increments, the multiplication operation would thus be:

$$\text{Width} \times \text{Height} \times \text{Length} = 12 \times 20 \times 1 = 240$$

Thus, each time a multiplication operation is performed, a pulsed output is obtained which is indicative of:

$$\text{Width} \times \text{Height} \times \text{Length} = \text{Volume}$$

It can be seen that increments of volume have been measured or computed. If the counters receiving the pulses are not reset, the pulse count of 240 is added to the previous pulse count of 70 and the result is 310. If the foregoing operation is continued until all the "slices" of the volume of the box are summed, the total volume of the box will be obtained. Thus, the volume obtaining process of the invention might be considered an integration or summation of volumes.

When the box has passed the plane of the light array, the width and height dimensions become zero, which result may be arranged to terminate the volume summation, and initiate the recording or display of the volume of the box just measured. Note that it is not necessary to synchronize the beginning and the end of the box, but only to provide a means of initiating and terminating the multiplication process.

Thus, the apparatus and method of the invention enables obtaining accurate box dimension data, performs a digital multiplication on each dimension to obtain an element of volume, and allows for summation of the elements of volume to obtain the total volume of a given box.

The apparatus and method of the invention thus also provides a means for accurately obtaining the width, height and length data of a box, as well as a means for processing and computing the dimensions to obtain volume information for the box.

DESCRIPTION OF LIGHT ARRAY

Referring to FIGS. 1 and 2, the light array 10 comprises a lamp or light frame 11 which straddles the conveyor 9 which moves the box 8 through the plane of the light array. The light frame 11 in one embodiment has two essentially identical groups of lamps respectively labeled 13 and 16 and the associated photocells respectively labeled 14 and 17.

The first group of height measuring lamps 13, and their associated beam forming lenses 13A comprise a total of 134 similar lamp and lens assemblies of any suitable known type. The lamps 13 are mounted in a row on the left vertical member of frame 11 and are positioned to be equally spaced a distance of .0232 feet from each other.

Each lamp and its associated lens is arranged to direct its beam of light to a respective, or corresponding light responsive photocell, indicated generally by the numeral 14, mounted on the right vertical member of frame 11. All of the photocells 14 are similar and are of any suitable conventional type arranged to be electrically connected to produce a change in an electrical signal when a light beam is interrupted. The blocks generally labeled 15A in FIG. 2 comprise printed circuit boards containing electronic circuitry associated with the height measuring photocells 14. The photocells are likewise spaced at the same intervals of .0232 feet to receive the light from their associated lamp and lens assemblies.

A second group of lamps and lens assemblies useful in measuring the width of a box and comprising a total of 134 lamps, generally labeled 16, are mounted in a row on the bottom horizontal member of frame 11 and are positioned to be equally spaced a distance of .0232 feet from each other. Each lamp with its associated lens is arranged to direct its beam of light to a respective or corresponding photocell indicated generally by the numeral 17 mounted on the upper horizontal members of frame 11. The blocks generally labeled 15B in FIG. 2 comprise printed circuit boards containing electronic circuitry associated with the width measuring photocells 17.

As indicated by the dashed lines in FIG. 2, the light beams provided by the height and width lamps and their associated lens form a planar grid covering essentially the entire area within the vertical and horizontal members of frame 11, for purposes of measuring the height and width of a box passing therethrough, as will be explained.

INCREMENT OF MEASUREMENT

The basic increment of measurement utilized in this embodiment of the invention is .0464 feet. It should, of course, be appreciated that while other increments of measurement could likewise be employed, the basic increment of .0464 feet was chosen in order to simplify the computation of the volume as will now be explained. If light beams are arranged such that the width measurement of a box is obtained by counting the number of spaces between width cells activated and multiplying the number obtained by .0464; if the height is obtained by counting the number of spaces between height cells activated and multiplying the number obtained by .0464; and, if the length is obtained by counting the number of increments measured and multiplied by .0464, then the following relationship exists:

$W = N_w \times .0464$ feet
$H = N_h \times .0464$ feet
$L = N_l \times .0464$ feet Volume in ft.$^3 = W \times H \times L$;

then,

Vol. in ft.$^3 = (N_w \times .0464)(N_h \times .0464)(N_A \times .0464)$
Vol. in ft.$^3 = (N_w \times N_h \times N_l)(.0464^3)$; therefore,
Vol. in ft.$^3 = (N_w \times N_h \times N_l)(10^{-4})$ NOTE.—W=width in feet, H=height in feet, L=length in feet, $N_w$=number of width spaces, $N_h$=number of height spaces, $N_l$=number of increments counted.

To effect a simple multiplication by $10^{-4}$, the $N_w$, $N_h$ and $N_l$ factors can be multiplied and the decimal point moved four places to the left, or, another way to consider the multiplication, is that in the resultant of the multiplication, the units order position is four places to the right of the decimal point; the tens order position is three places to the right; the hundreds order position is two places to the right; and, the thousands order position is one place to the right of the decimal point. For example, a multiplication resulting in a number such as 1111 would be .1111 when recorded or displayed.

While the basic increment of measurement is .0464 feet, in order to achieve a high degree of accuracy of the boxes passing through the light array, the basic unit of measurement is, in effect, divided by two by placing or spacing the lamps and photocells a distance of .0232 feet apart, as will become clear.

SYSTEM BLOCK DIAGRAM

A height and width measuring system and volume computing system according to the invention is shown in block diagram form in FIG. 1, which shows as a part of the system the light frame including the associated photocells which are connected to various electronic circuitry. The electronic circuitry for the system includes a group of circuitry for obtaining a measurement of the height of a box shown by the Height Light Array, Height Tree Circuits and Height Quantizers and Summers indicated generally as 19. The electronic circuitry for the system further includes a group of similar circuitry for obtaining a measurement of the width of a box shown by the Width Light Array, Width Tree Circuits and Width Quantizers and Summers indicated generally as 20.

The Process Controller selectively combines the height and width measurements with data from the length pulser to provide a resultant which is a computation of the volume of the box. The method of obtaining or computing the volume of a box will be explained more fully hereinbelow. The volume information may be visually displayed, as indicated by the block labeled Digital Display, or the said information may be printed out as by a printer, or provided as an output to a data line or a computer.

LAMP OR LIGHT FRAME

The drawings of FIGS. 2A–2D show a means for mounting the lamps 13 used in the system and comprise a so-called lamp or light bar 650, made of aluminum or any other suitable material, in which a plurality of individual lamps 13 are mounted to provide a plane of parallel individual light beams .0232 feet from each other as indicated in FIG. 2. The height and width measuring lamp bars respectively numbered 650H and 650W in FIG. 2 are essentially identical; hence, the lamp bar 650 depicted in FIGS. 2A and 2D and the following description apply to both lamp bars 650H and 650W. As mentioned, the light beams from the two lamp bars form a planar matrix or field as indicated in FIG. 2.

FIG. 2A shows the lamp bar 650 and the plurality of lenses generally labeled 13A mounted on the lamp bar. A lens is provided for each lamp, hence there is a total of 134 lenses. The light beams provided by some of the lenses in the associated lamps are indicated generally by the dashed lines 652.

FIG. 2B is a top view of lamp block 650 in approximately actual size showing the details of mounting the lenses on the block 650. In FIG. 2B, each lens assembly includes an individual lens holder generally labeled 653 and consisting of an elongated rectangular piece having a center opening 654 in which the individual lens 13A is mounted and a pair of screw holes 655 into which associated screws 656 can be inserted for positioning the lens holder on the mounting block 650. The screw holes 655 are oversize and permit a lateral and longitudinal fine adjustment for positioning of the lens to control the direction of the beam emanating from the lamp to exactly impinge on its associated photocell mounted on the opposite member of the frame 11. A cable clamp 657 which attaches to one terminal of a source of potential, not shown, provides suitable energization for the lamps, and the other cable clamp 658, shown in FIG. 2C, provides the other connection to the source.

A flat copper conductor bus 661 for conducting the current is mounted on one side of the block 650 and another conductor bus 662 is mounted on the opposite side of the block 650. Respective insulation sheets 659 and 660 insulate the copper buses 661 and 662 from the block 650. The copper buses are connected such as by nonconductive nylon screws 663 (see FIG. 2C) to the block 650.

A bolt-and-nut assembly 666 secures buses 661 and 662 to the block 650 and conducts the current between the buses 661 and 662. The bolt and nut assembly 666 is shielded from the block 650 by an insulating bushing 667. Pigtail connectors 668 are connected from the bus 662 to the base of the lamps 13. As can be seen quite clearly in FIG. 2B in connection with FIG. 2C, adjacent lamps 13 are arranged to be mounted on alternate sides of the block 650.

The lamps are held into position by set screws 670 which insure a good electrical connection between the base of the lamps 13 to the block 650. As shown in FIG. 2D, the structure comprises a simple lens system in which lamps 13 are placed at a predetermined distance from the lens 13A to permit the proper image of the filament of the lamp to be projected to the associated photocell mounted on the opposite frame member. Each lamp 13 provides a beam which is directed through communicating hole 671 to the associated lens 13A. As mentioned, the screw holes 655 in the lens holder 653 are larger in diameter than the diameter of the screws 656 to permit a fine adjustment of the position of the lens with respect to the lamp to compensate for manufacturing or other variations, for example, placement of the filament in the lamp. Thus the lens 13A can be properly adjusted to provide an image of the lamp filament to the associated photocell.

The two elliptical holes 676 provides a means of adjusting the entire lamp bar 650 in a longitudinal direction. Note in FIGS. 2A and 2C that the ends of the lamp bar 650 are beveled to permit the lamp bar 650 to mate or fit the adjustment member of the light frame 11.

PHOTOCELLS AND ASSOCIATED CIRCUITS

Figure 3B:
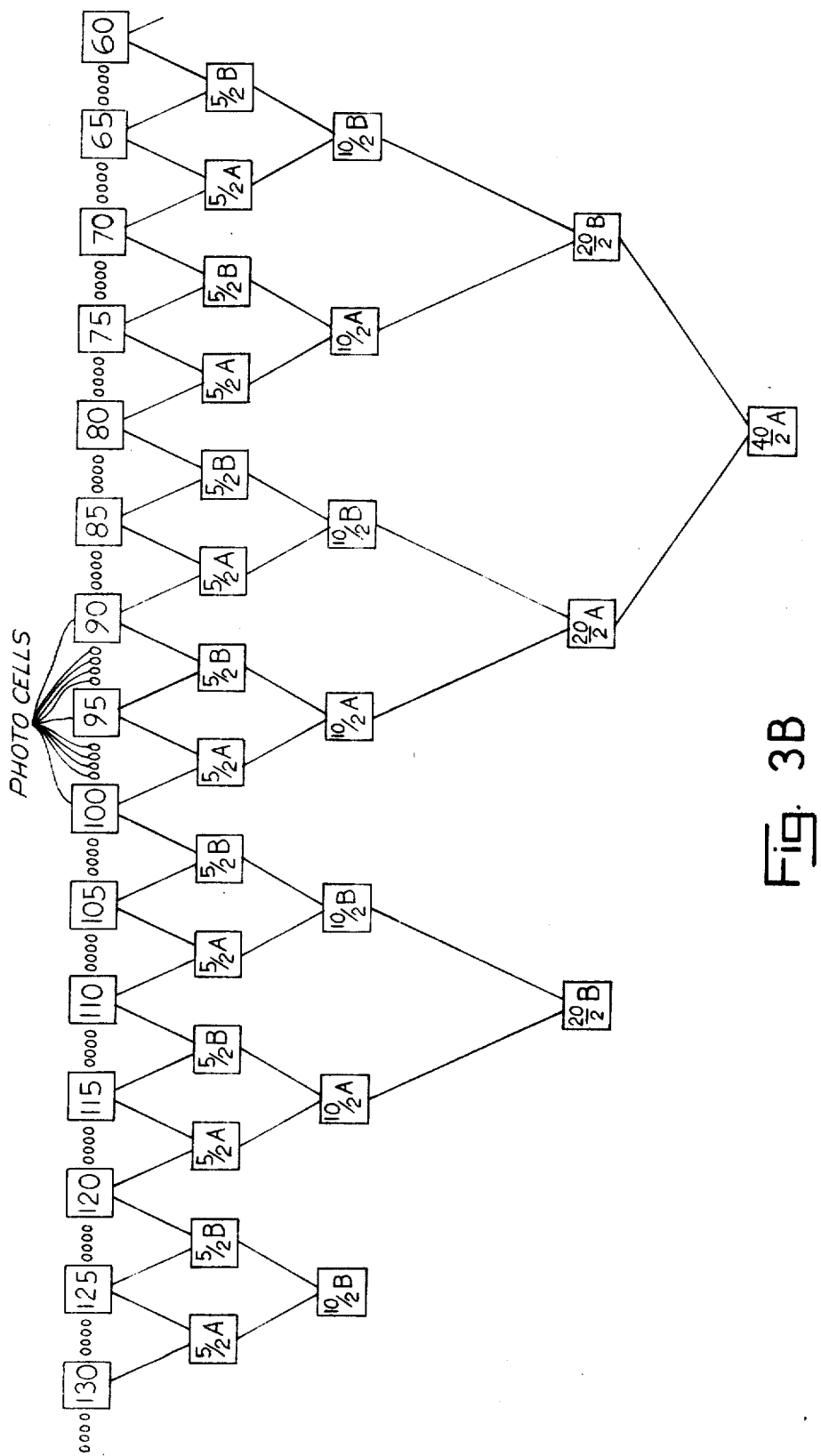

FIGS. 3A and 3B provide a pictorial representation of the arrangement of the photocells and their associated electronic circuitry. As can be readily appreciated, the blocks labeled 0, 5, 10, 15 . . . 130, represent the photocells which are groups in the form of a so-called electronic tree effect or tree configuration with their associated electronic circuitry labeled 5/2B, 5/2A, 10/2B . . . 40/2B, 40/2A. The electronic tree arranges the major cells into an output code which comprises 5/2A, 5/2B, 10/2A, 10/2B, 20/2A, 20/2B, 40/2A and 40/2B, for purposes to be explained hereinbelow.

The photocells considered are grouped into the above-noted fives or major cells and the units or minor cells; that is, – –, 1, 2, 3, 4, – –, 6, 7, 8, 9, – –, 11, 12, 13, 14, – –, 16 . . . . As the nomenclature suggests, every fifth cell is designated as a major or fives cell with a cell numbered 0 being the first of these major cells.

In the embodiment of the invention being described, the provision of a total of 134 cells results in 133 measuring spaces of 0.232 feet each. Obviously, the number of cells used is not limited to any particular number; however, in the one embodiment of the invention being described, the number of cells and the size of the frame were chosen to accurately measure boxes which are a maximum of three feet in height and width; that is, $133 \times .0232 = 3.0856$ feet.

The four minor cells between each two major cells are combined into a code which consists of 1/2D, 1/2D', 1/2C, 1/2C', 1/2B, 1/2B', 1/2A and 1/2A', for purposes to be explained hereinbelow. As mentioned above, in order to obtain a higher degree of accuracy, the 1/2 designation results from the fact that the photocells are spaced .0232 feet apart or 1/2 of the basic increment of .0464 feet and the 5/2 designation results from the fact that the major photocells are spaced apart $5 \times .0232$ feet or 5/2's of the basic increment of measurement of .0464 feet. Likewise, the 10/2 designation is twice the 5/2 designation, the 20/2 designation is twice the 10/2 designation, etc. For example, a box moving in the light array of which interrupts two adjacent light beams, or in other words, covers two photocells, gives a 1/2 measurement. A box which covers two major cells, such as cells 0 and 5, gives a 5/2 measurement. Likewise, a box which covers cells 0 to 10 provides a 10/2 measurement, etc.

The measurement of 5/2, 10/2, 20/2 and 40/2 are further subdivided or designated as A and B, for purposes of convenience. As will be explained fully hereinbelow, if cells numbers 0–5 are dark, the 5/2B code line is energized; if the cells numbers 10–20 are dark, the 10/2A line is energized, etc. Likewise, when cells numbers 0–20 are dark, the output is 20/2A, etc.

PHOTOCELL CIRCUIT DETAILS

Figure 4:
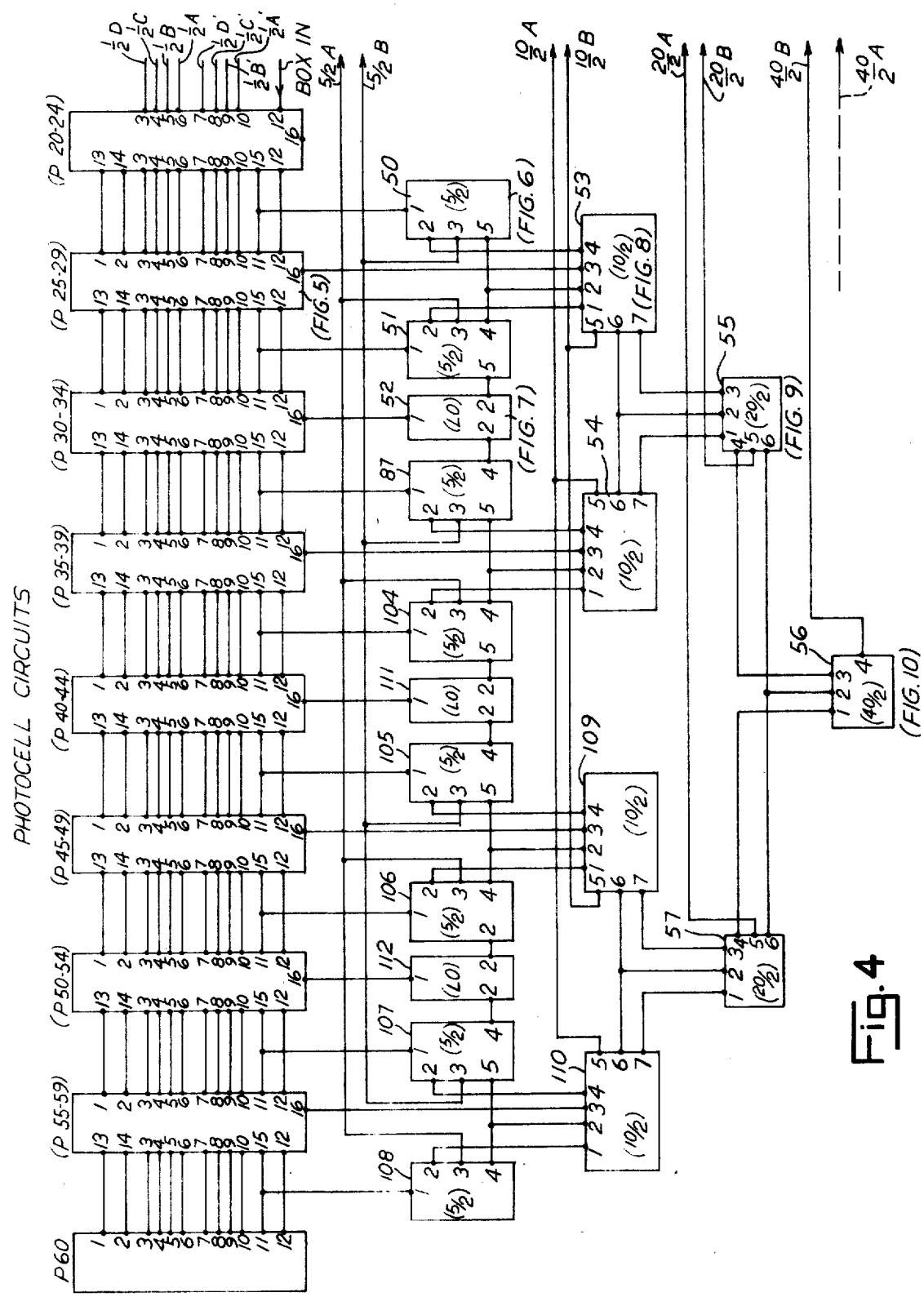
FIG. 4 is a block diagram showing in specific detail the connection of a portion of the electronic circuits of FIGS. 3A and 3B.

Reference will now be made to the block diagram of FIG. 4 for more specific discussion of the circuitry indicated schematically in FIGS. 3A and 3B. In FIG. 4 each of the blocks numbered P20–24, P25–29 . . . P60 represent the electronic circuitry connected to the respective photocells P20–24, P25–29 . . . P60. (Hereinafter the photocell numbers will be designated or prefaced by a capital P as P0 . . . P130.) FIG. 4 shows or represents a portion of the electronic circuitry of FIGS. 3A and 3B, and, more specifically, FIG. 4 shows the circuits for photocells P20 through P60 which are representative of the overall electronic circuitry for all of the cells in FIGS. 3A and 3B. The operation of the cells in FIGS. 3A and 3B, and their associated electronic circuitry can be appreciated from an understanding of the circuitry of the cells P20–P60 of FIG. 4.

The electronic circuitry of FIG. 4 receives the signals generated by the photocells and indicates whether the cells are in a darkened or lighted condition; and, further operates to combine these signals into coded information, as mentioned above and as will be described fully hereinbelow.

As mentioned, the numbers above the blocks generally labeled photocell circuits indicate the respective photocells and their associated electronic circuitry. The numbers within the blocks in FIG. 4 indicate the connection points of the circuits; for example, connection point 13 in block P20–24 is connected to connection point 1 in block P25–29. The connection points will be more fully discussed with reference to the description of the schematic diagram of the circuit of FIG. 5 which shows an individual electronic circuit representative of each of the photocells in blocks labeled P20–24, P25–29 . . . P60.

Figure 5:
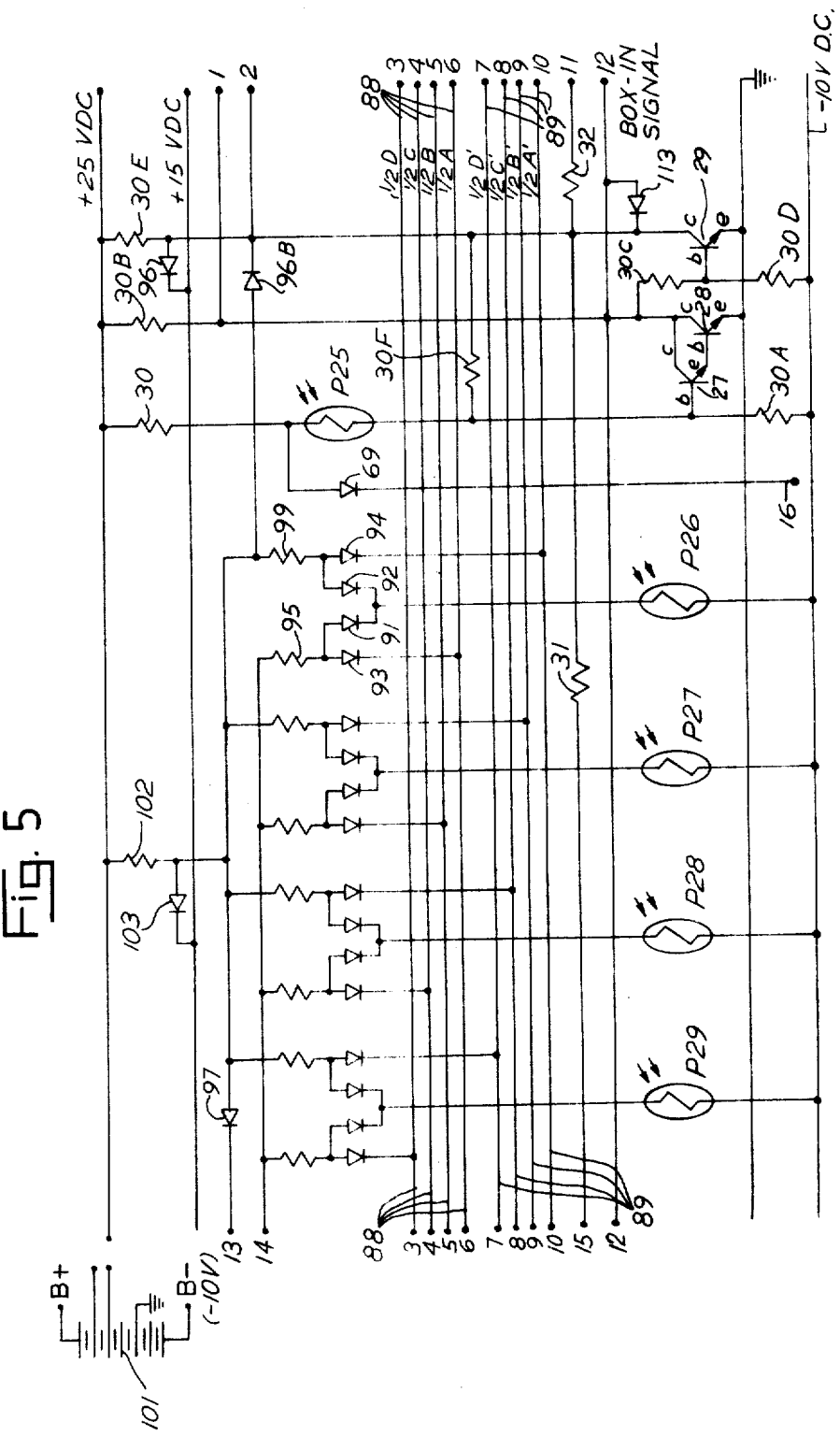
FIG. 5 is a schematic diagram showing the circuit details of the photocell circuits of FIG. 4.

FIG. 4 in combination, or with reference to FIG. 5 thus shows the connection between the various photocell circuits of P20–24, P25–29, etc. For example, the connection point labeled 13 in the block P20–24 in FIG. 4 is connected to the connection point labeled 1 in block P25–29 and the same connection points are shown in FIG. 5. Assuming FIG. 5 represents block P20–24 in FIG. 4, the connection point 13 in FIG. 5 is thus connected to the connection point 1 of a circuit identical to FIG. 5 and representing block P25–29 in FIG. 4. Likewise, the other connection points labeled or numbered in FIGS. 4 and 5 are connected as indicated to provide a combination of circuits to form an operable system.

FIG. 4 also shows blocks representing the 5/2 circuits, the LO or Lock-Out circuits, the 10/2 circuits, the 20/2 and the 40/2 circuits, which circuits are shown in detail in FIGS. 6, 7, 8, 9 and 10, respectively, and which will be described hereinbelow. The numbers on each block in FIG. 4 and in FIGS. 6–10 represent connection points connecting the various blocks to provide an operable circuit.

MAJOR OR FIVES PHOTOCELLS

The circuit of FIG. 5 is, in fact, a sensing circuit for indicating or sensing when the respective photocells shown therein have been changed from a light to a dark condition; as, for example, when a box has interrupted their associated light beams.

A description will first be given of the major or fives cells, then a description will be given of the minor or units cells. As mentioned, FIG. 5 is representative of each of the circuits of blocks P20–24, P25–29 . . . P60 in FIG. 4.

Refer to the major photocell number P25 in FIG. 5. The upper terminal of cell P25 is connected through a resistor 30 to the +25-volt line. The lower terminal of cell P25 is connected through resistor 30A to the −10-volt D.C. line. The lower terminal of cell P25 is also connected to the base $b$ of an NPN transistor 27 which is one-half of a signal amplifier consisting of transistors 27 and 28, each having a base $b$, an emitter $e$, and a collector $c$. The emitter $e$ of transistor 27 is connected to the base of transistor 28 and the emitter $e$ of transistor 28 is connected to ground reference. The collectors $c$ of transistors 27 and 28 are connected together and through a load resistor 30B to the +25-volt line.

The collectors $c$ of transistors 27 and 28 are also connected through a resistor 30C to the base $b$ of an NPN transistor 29 having a base $b$, an emitter $e$, and a collector $c$. The base $b$ of transistor 29 is connected through resistor 30D to the −10-volt line. The emitter $e$ of transistor 29 is connected to ground. The collector $c$ of transistor 29 is connected through a resistor 30F to the base $b$ of transistor 27. The collector $c$ of transistor 29 is also connected through a resistor 30E to +25-volt line, and is also connected to the junction of resistors 31 and 32, and it is further connected to connection point 2. The collector $c$ of transistor 29 is also connected to the cathode of a diode 96B, the anode of diode 96B is connected to the junction of resistors 99 and 102 for purposes to be described. The collector $c$ of transistor 29 is further connected to the anode of diode 96, and the cathode of diode 96 is connected to the +15-volt D.C. line. Diode 96 functions to maintain or clamp the voltage at the lower terminal of resistor 30E at the +15-volt level. The collector $c$ of transistor 29 is also connected to the cathode of a diode 113 and the anode of diode 113 is connected to the connection point 12 to provide a Box-In signal to the system.

When the cell P25 is being energized by light, the cell is in a low electrical resistance state. Therefore, enough current is supplied through cell P25 to cause a base current to flow through transistor 27 thereby causing transistors 27 and 28 to be ON or in a saturated condition. When transistors 27 and 28 are ON, the potential at their collectors c drops to a low level (approximately ground) which removes the base current from transistor 29 and turns transistor 29 OFF. When transistor 29 is turned OFF, the potential at its collector c rises to a high level and this potential is coupled through resistor 32 and connection point 11 to connection point 1 of the 5/2 block 50 (see FIG. 4) to prevent block 50 from providing an output, as will be explained.

Whenever a box interrupts the light beam of any of the major cells, the transistors 27 and 28 corresponding to transistors 27 and 28 in FIG. 5 will be turned OFF and the respective transistor 29 will conduct. Whenever transistor 29 conducts, its collector c will be at a low potential, which is coupled through resistors 31 to connection point 15 and through resistor 32 to connection point 11. Also, the low potential at the collector c of transistor 29 will forward-bias its respective diode 113 to drop its respective connection point 12 to essentially ground potential to indicate to the system that a box is in the field of the light array, as will also be explained.

5/2 BLOCKS

The circuit details of the 5/2 block labeled 50 of FIG. 4 are shown in FIG. 6 which comprises an NPN transistor 33 having a base b, an emitter e, and a collector c. Note, of course, that the circuit of FIG. 6 is representative of each of the circuits labeled 5/2 in FIG. 4. The base b of transistor 33 is connected through the connection point 1 to the connection point 15 in block P20–24 and to connection point 11 in block P25–29. The collector c of transistor 33 is connected through a resistor 37 and connection point 5 to the connection point 2 in the 10/2 block 53, see also FIG. 4. The collector c of transistor 33 is also connected through resistor 38 to connection point 4 which is not connected in the block 50; however, connection point 4 is connected in the other 5/2 blocks as shown in FIG. 4. More specifically, connection point 4 in said other 5/2 blocks is connected to the connection point 5 in the respective preceding block. The collector c of transistor 33 is further connected through a load resistor 34 to +25-volt line. The collector c of transistor 33 is further connected to the cathode of a diode 36A and the anode of diode 36A is connected through a resistor 35 to the +25-volt line. The junction of diode 36A and resistor 35 is connected to connection point 2, and also to the anode of a diode 36B whose cathode is connected to connection point 3.

When the potential on the base b of transistor 33 in FIG. 6 is high, transistor 33 will conduct and establish a current flow path from the +25-volt line through resistor 35, diode 36A and the transistor 33 to ground reference. Thus, when transistor 33 is conducting, it holds down or lowers the potential at the junction of resistor 35 and diode 36A to essentially ground potential and keeps any current from flowing to connection point 3 and the 5/2B line, see also FIG. 4.

If either the collector c of transistor 29 in the block P25–29 or collector c of transistor 29 in the block P20–24 is at a high potential, which is the condition when the respective cell P25 and cell P20 are in a light condition, base current will be supplied to the transistor 33 in block 50 to hold transistor 33 in a saturated condition.

In operation, assume a box has entered the field of the light array and the box interrupts the respective light beams which have been energizing photocells P20 and P25; that is, cells P20 and P25 are now in a dark condition. When the photocell P20 is in a dark condition, its resistance will increase to a high level. The transistors 27 and 28 associated with cell P20 in block P20–24 will be turned OFF and the associated transistor 29 will be turned ON. In this condition, the collector c of transistor 29 of block P20–24 will be at essentially ground potential. Thus, the current which normally flows through resistor 31, connection point 15 of block P20–24 and to connection point 1 of block 50 will be shunted to ground. Likewise, if photocell P25 of block P25–29 is in a dark condition, its associated transistor 29 will be turned ON and its collector c will be at ground potential. Thus, the current which normally flows through resistor 32, connection point 11 of block P25–29 and to connection point 1 of block 50 will be shunted to ground. If both photocells P20 and P25 are in a dark condition, a low potential will be coupled to connection point 1 of the 5/2 circuit 50 and its transistor 33 will be turned OFF. When this occurs, a current will be permitted to flow from +25-volt line through resistor 35 and diode 36B to connection point 3 providing an output on the 5/2B line to indicate a 5/2 measurement, see FIG. 4 also.

10/2 BLOCKS

The details of the 10/2 blocks of FIG. 4 are shown in FIG. 8. FIG. 8 shows a pair of NPN transistors 57 and 58, each having a base b, an emitter e, and collector c electrodes. The base b of transistor 57 is connected through connection point 2 to the connection point 5 of the 5/2 block 50 and connection point 4 of the 5/2 block 51, see also FIG. 4. The base b of transistor 57 is also connected through resistor 59A to the −10-volt D.C. line. The emitter e of transistor 67 is connected to ground and the collector c connected through a load resistor 60 to the +25-volt line. The collector c of transistor 57 is also connected through connection point 7 to connection point 3 of the 20/2 block 55, see FIG. 4. The collector c of transistor 57 is further connected through connection point 3 to connection point 16 of the photocell block P25–29. The collector c of transistor 57 is also connected to the cathode of diode 67 whose anode is connected through connection point 1 to connection point 2 in the block 51; and, further, collector c of transistor 57 is connected to the cathode of diode 68 whose anode is connected through connection point 4 to connection point 2 in the 5/2 block 50, see FIG. 4. The collector c of transistor 57 is also connected through a resistor 59 to base b of transistor 58. Base b of transistor 58 is connected through a resistor 59B to the −10-volt line and through a resistor 61 and connection point 6 to connection point 2 of the 20/2 block 55, see FIG. 4. The emitter e of transistor 58 is connected to ground, and its collector c is connected through load resistor 63 to the +25-volt line. The collector c of transistor 58 is also connected to the anode of a diode 62 whose cathode is connected to connection point 5 and the 10/2B line, see FIG. 4.

Transistor 57, FIG. 8, is normally nonconducting or OFF, and transistor 58 is conducting or ON. When transistor 58 is conducting its collector c will be essentially at ground reference and will, in effect, shunt to ground any current tending to flow from the +25-volt D.C. line through resistor 63 and diode 62 to the connection point 5 and the 10/2B output line, see FIG. 4, block 53.

The collector c of transistor 33 of the 5/2 block 50, FIG. 6, is connected through resistor 37 and connection point 5 to connection point 2 of the 10/2 block 53, and the collector c of transistor 33 of the 5/2 block 51 is connected through resistor 38 and connection point 4 also to connection point 2 of the 10/2 block 53 to form an "And" Logical circuit for block 53. That is, when the respective transistor 33 in the 5/2 blocks 50 and 51 are turned OFF and the potential at their collector c is high, these high potentials are coupled to connection point 2 of block 53, see FIG. 8, and thence to the base b of transistor 57 ON. When transistor 57 turns ON, transistor 58 turns OFF to provide a 10/2 output from connection point 5 to the 10/2B line, see FIG. 4. Also when transistor 57 turns ON, a potential will be provided to nullify the two 5/2 outputs from blocks 50 and 51 as will be descirbed hereinbelow.

20/2 BLOCKS

The details of the 20/2 blocks of FIG. 4 are shown in FIG. 9. FIG. 9 includes an NPN transistor 71 having a base $b$ connected through resistor 70A to the —10-volt line and through another resistor 70 and connection point 1 to connection point 7 of the 10/2 block 54, see FIG. 4. The base $b$ of transistor 71 is also connected through resistor 72 and connection point 3 to the connection point 7 of the 10/2 block 43, see FIG. 4. The emitter $e$ of transistor 71 is connected to ground and the collector $c$ is connected through a load resistor 73 to the +25-volt line. The collector $c$ of transistor 71 is also connected to the cathode of a diode 76 whose anode is connected through a resistor 75 to the +25-volt line. The junction of diode 76 and resistor 75 is connected to connection point 4 which is, in turn, connected to connection point 3 of the 40/2 block 56, see also FIG. 4. The junction of diode 76 and resistor 75 is also connected to the anode of a diode 74 whose cathode is connected through connection point 5 to the 20/2B output line. The collector $c$ of transistor 71 is also connected through a resistor 77 to connection point 6 and thence to the connection point 2 of the block 56.

The input connections to the base $b$ of transistor 71 through connection point 1 and resistor 70, and through connection point 3 and resistor 72 form a "Nand" logical circuit. With no box in the light array, a high potential is applied to the circuit, of FIG. 9, through connection point 1 from 10/2 block 54, connection point 3 from 10/2 block 53 to transistor 71 causing transistor 71 to be ON. If the potential at both connection points 1 and 3 is removed or reduced to zero, transistor 71 will turn OFF and its collector $c$ will rise to a high potential, thus permitting a current to flow from the +25-volt D.C. line through resistor 75 and diode 74 to connection point 5 and the 20/2B output line, see FIG. 4, block 55.

40/2 BLOCKS

The details of the 40/2 blocks of FIG. 4 are shown in FIG. 10. FIG. 10 includes two NPN transistors 78 and 79, each having a base $b$, an emitter $e$, and collector $c$ electrodes. The base $b$ of transistor 78 is connected through connection point 2 to connection point 6 of each of the 20/2 blocks 55 and 57, see FIG. 4. The base $b$ of transistor 78 is also connected through resistor 83A to a —10-volt D.C. line. The emitter $e$ of transistor 78 is connected to ground, and its collector $c$ is connected through load resistor 81 to the +25-volt line. The collector $c$ is also connected to the cathode of a diode 80A whose anode is connected through connection point 1 to connection point 4 in the 20/2 block 57. The collector $c$ of transistor 78 is also connected to the cathode of a diode 80B whose anode is connected through connection point 3 to connection point 4 in the 20/2 block 55. The collector $c$ of transistor 78 is further connected through resistor 81B to the base $b$ of transistor 79. The base $b$ of transistor 79 is connected through resistor 83B to the —10-volt line. The emitter $e$ of transistor 79 is connected to ground, and the collector $c$ is connected through a load resistor 83 to the +25-volt line. The collector $c$ of transistor 79 is further connected to the anode of diode 82 whose cathode is connected through connection point 4 to provide an output on the 40/2B line.

Normally, that is, with no box in the light array, transistor 78 is OFF and transistor 79 is ON or conducting. When transistor 79 is conducting its collector $c$ is essentially at ground potential and no current will flow from the +25-volt line through resistor 83 and diode 82 to connection point 4 to provide a signal on the 40/2B line.

The connection point 6 and the resistor 77 in each of blocks 55 and 57 function as an "And" logical circuit to connection point 2 and the base of transistor 78 in the 40/2 block, see also FIGS. 4 and 10. When the respective transistors 71 in both the 20/2 blocks 55 and 57 are OFF, a positive potential will be coupled to connection point 2 of FIG. 10 (block 56, FIG. 4) to cause transistor 78 in the 40/2 block 56 to be turned ON and transistor 79 in block 56 will be turned OFF to permit a current to flow from the +25-volt line through resistor 83 and diode 82 to connection point 4 and to provide a signal on the 40/2B line.

LOCK-OUT FEATURE

The system of the invention also includes a Lock-Out feature which gives the system the capability of ignoring holes or openings in a box which may have one or more openings therein. An example of this is a crate which may not be entirely full and which may allow the light beams to pass through the openings in the crate. Assume that a first portion of the box passing through the light array causes all of cells P20 through P60 to become dark. Next, a succeeding portion of the box having an opening therein passes through the light array. The Lock-Out feature assures that if cells P20 through P60 are initially covered, the same initial measurement would be maintained even though the opening through the box permits some of the light beams to pass therethrough to light cells P21 through P59 and causing only cells P20 and P60 to be dark. The same feature would hold true for any combination of the major cells, from the cell P0 to cell P130. If the cells between these two cells P0–P130 are once caused to become dark, then the same measurement for that particular box is retained even if only cell P0 and the cell P130 are in a dark condition.

10/2 LOCK-OUT

The Lock-Out feature for cells P5–9, P15–19, P25–29, P35–39, P45–49, etc., is provided by the 10/2 blocks and the Lock-Out feature for cells P0–4, P10–14, P20–24, P30–34, etc., is provided by the circuits represented by the blocks labeled LO in FIG. 4.

Refer first to the Lock-Out feature provided by the 10/2 blocks, and to FIGS. 4, 5 and 8. Connection point 3 of FIG. 8 is connected through connection point 16 of the P25–29 block, diode 69 (see FIG. 5) to the junction of cell P25, and resistor 30 to the +25-volt D.C. line. Note that diode 69 has its anode connected to the junction of cell P25 and resistor 30, and has its cathode connected to connection point 16. When transistor 57 in the 10/2 block is rendered conductive, diode 69 will become forward-biased to permit current to flow from the +25-volt line through resistor 30, diode 69 and the conducting transistor 57 to ground. This current flow once initiated will continue even though cell P25 returns to its light condition, provided that the cells on either side thereof, that is, P20 and P30 remain in the dark condition.

LO CIRCUIT LOCK-OUT

The details of the circuit of the LO blocks in FIG. 4 which provide the Lock-Out feature for photocells P0–4, P10–14, P20–24, P30–34, P40–44, etc., are shown in FIG. 7. The LO circuit as shown in FIG. 7 includes an NPN transistor 85 having a base $b$, an emitter $e$, and collector $c$ electrodes. The base $b$ of transistor 85 is connected through biasing resistor 86 to —10-volt line and through connection points labeled 2 in the 5/2 blocks 51 and 87 in FIG. 4. The collector $c$ of transistor 85 is connected through connection point 1 to connection point 16 of the photocell block P30–34; and, more specifically, through connection point 16 and diode 69 to the upper terminal of cell P30, see FIG. 5 which is representative of each of the blocks.

In operation, with no box in the light array, transistor 85 of block 52, FIG. 4 (see also FIG. 7), is normally biased to be nonconductive or OFF. Transistor 85 is OFF since the 5/2 block 51 (FIG. 4) couples a low potential through its connection point 5 to connection point 2 of LO block 52 (see also FIG. 7) and the base *b* of transistor 85; and, since block 87 also couples a low potential through its connection point 4 to connection point 2 of LO block 52.

Assume that a box enters the light array and covers major cells 25, 30 and 35. Note at least three major cells must be covered to effect a Lock-Out function for the intermediate one of the covered cells.

When cell P25 is dark, a low potential will be provided from the cathode of transistor 29 through resistor 31 and its connection point 15 to connection point 1 in block 51 (see also FIG. 6).

When cell P30 is dark a low potential will be coupled from connection point 11 of block P30–34 to the connection point 1 in block 51.

As mentioned above, the resistor 31 of block P20–24 connected through its connection point 15 to connection point 1 of block 51, and resistor 32 of block P30–34 connected through its connection point 11 to connection point 1 of block 51 function as the input circuit for block 51. Accordingly, in order for transistor 33 in block 51 to be turned OFF, both inputs to connection point 1 of block 87 must be at a low potential, i.e., both cells P25 and P30 must be dark.

When both cells P25 and P30 are dark and transistor 33 in block 51 is OFF, a high potential will be coupled from its connection point 5 to connection point 2 of the LO block 52. Similarly, when both cells P30 and P35 are dark a low potential is provided to the 5/2 block 87; and, block 87 will provide a high potential through its connection point 4 to the connection point 2 of the LO block 52 (FIG. 7).

When both blocks 51 and 87 provide a high potential through their respective connection points 5 and 4 to connection points 2 of block 52 (FIG. 7), transistor 85 will be caused to conduct and its collector *c* will provide a low potential through connection point 1 of LO block 52 to connection point 16 of block P30–34. Accordingly, a current flow path will be established from the B+ line in block P30–34 (FIG. 5) through resistor 30, diode 69, connection point 16, connection point 1 of LO block 52 (FIG. 7), through transistor 85 to ground. The current will continue to flow through the foregoing path even though cell P25 returns to its light condition. Thus even though the box may have a hole therein which permits light to pass therethrough to light cell P25, the initial measurement provided by P25 through P35 being dark will remain effective.

NULLIFYING FEATURE

The invention also provides a nullifying feature. For example, if both 5/2 blocks 50 and 51 in FIG. 4 are energized a total spacing of 10/2 will have been measured. Accordingly, when the foregoing occurs the 10/2 block 53 will be energized to provide an output signal, and concurrently the outputs from both the 5/2 blocks 50 and 51 will be nullified. Likewise, when both 10/2 blocks 53 and 54 are energized they will trigger the 20/2 block 55 ON, and concurrently the outputs from both 10/2 blocks 53 and 54 will be nullified. The same operation occurs for the 40/2 block with respect to the 20/2 blocks.

The nullifying feature for the 10/2 blocks, with respect to the 5/2 blocks is as follows. For example, note in FIGS. 4, 6 and 8, the connection point 4 in the 10/2 block 53 is connected to connection points 2 in 5/2 block 51, and connection 1 of block 53 is connected to connection point 2 in 5/2 block 51. When transistor 57 in FIG. 8 (10/2 block 53) is turned ON, and transistor 58 is turned OFF, a 10/2 signal will be provided through connection point 5 to the 10/2B line, as explained above. When transistor 57 is turned ON, its collector *c* will go to a low potential which is coupled to the cathodes of diodes 67 and 68 and forward biases these two diodes.

When this occurs, the current that had been flowing in the 5/2 blocks 50 and 51 (see FIG. 6) from the +25-volt line through resistor 35 and diode 36B to the 5/2B and 5/2A output lines of blocks 50 and 51 will be shunted to ground through connection point 2 of each of blocks 50 and 51 (FIG. 6) and connection points 1 and 4 of 10/2 block 53, and respective diodes 67 and 68 and transistor 57 to ground. Accordingly, the 5/2A and the 5/2B output signals will be nullified concurrently as the 10/2B output signal is provided.

The nullifying feature for the 20/2 blocks with respect to the 10/2 blocks is as follows. For example, in FIGS. 4, 8 and 9 the connection point 2 of the 20/2 block 55 is connected to connection point 6 of both the 10/2 blocks 53 and 54. When transistor 71 in the 20/2 block 55 (see FIG. 9) is cut OFF to provide an output signal through resistor 75 and diode 74 to the associated 20/2 output line, the potential at the collector *c* of transistor 71 in block 55 will be high and this high potential is coupled through connection point 2, block 55 (FIG. 9) to connection points 6 of each of the 10/2 blocks 53 and 54 (see FIG. 8) causing the respective transistors 58 in block 53 and 54 to turn ON and shunt to ground the signal heretofore being provided through resistor 63 and diode 62 to connection point 5 and the associated 10/2 output lines.

The nullifying feature that the 40/2 block provides for the 20/2 blocks is similar to that which the 10/2 block provides for the 5/2 blocks. That is, when transistor 78 in the 40/2 block 56 (see FIG. 10) is turned ON by an input signal to its base *b*, the potential at the collector *c* of transistor 78 will drop to essentially ground potential. This potential is effective through diodes 80A and 80B through connection points 1 and 3 of block 56 to connection points 4 of the 20/2 blocks 55 and 57, respectively, thereby shunting to ground, the signal heretofore being provided to the 20/2 output lines.

Consider now a typical operation such as when a box of a dimension equivalent to 40 measuring spaces sufficient to interrupt light beams and hence to darken the respective photocells, for example cell P20–60, is to be measured. In this instance, the cells P20 and P25 provide a signal to connection point 1 of the 5/2 block 50 causing this circuit to be actuated, see FIG. 3A and FIG. 4.

Tracing down the circuit of FIG. 5, cells P25 and P30 provide a signal to the 5/2 block 51; cells P30 and P35 provide a signal to the 5/2 block 87, etc.

The 5/2 blocks 50 and 51 provide a signal to the 10/2 block 53; the 5/2 blocks 87 and 104 provide a signal to the 10/2 block 54, etc.

In turn, the 10/2 blocks 53 and 54 provide an output signal to the 20/2 block 55, etc. And, the 20/2 blocks 55 and 57 provide a signal to the 40/2 block 56, etc. The 40/2 block 56 will provide an output on the 40/2B output line of FIG. 4 representing the total of forty measuring spaces.

Further, the 40/2 block 56 will nullify the 20/2A and 20/2B signals from 20/2 blocks 55 and 57; blocks 55 and 57 will in turn nullify the signals from their associated 10/2 blocks; and, the 10/2 blocks will nullify the signals from their associated 5/2 blocks.

As will be discussed, the output of dark unit cells located between major or fives cells which are dark have their outputs nullified by the major cells on either side thereof. Accordingly, the only signal output in this instance will be the 40/2 signal on output line 40/2B.

MINOR OR UNITS PHOTOCELLS

The details of the circuit of FIG. 5 and its operation with respect to the four minor cells will now be explained. It will, of course, be appreciated that each of the minor photocell circuits from 1 through 134 are similar. Accordingly, the circuit details and the operation only of one minor cell, that is, cell P26 and its associated circuitry will be described hereinbelow.

As mentioned above and as shown in FIG. 3A and

FIG. 3B, there are four minor or unit cells between each two major or five cells. The unit cells are connected to selectively couple a signal to a normal bus 88 or a prime bus 89, each bus contains four electrical conductors or leads and each provides an output data bit. The normal bus 88 contains the lines or leads indicated as 1/2A, 1/2B, 1/2C, 1/2D, and the prime bus 89 contains leads indicated as 1/2A′, 1/2B′, 1/2C′ and 12D′. Thus, the normal and prime buses contain a total capability of eight half bits.

The operation of the circuit, as will be described fully hereinbelow, is such that if a unit cell is dark and the major cell immediately to the right of the unit cells is also dark, an output is provided on the normal bus 88 to represent 1/2A, 1/2B, 1/2C and/or 1/2D. For example, in FIG. 5, unit cell P26 is 1/2 space to the left of major cell P25 and provides a 1/2A output, cell P27 is two 1/2 spaces to the left of cell P25 and provides a 1/2B output, cell P28 provides a 1/2C output and cell P29 provides a 1/2D output.

If the major cell immediately to the left of the group of four minor cells is dark, then if these minor cells are dark, an output is provided on the prime bus 89 and the information will represent a 1/2A′, 1/2B′, 1/2C′ and/or 1/2D′. For example, in FIG. 5, unit cell P29 is 1/2 space to the right of major cell P30 and provides a 1/2D′ output, cell P28 is two 1/2 spaces to the right of P30 and provides a 1/2C′ output, cell P27 provides a 1/2B′ output and cell P26 provides a 1/2A′ output.

It is theoretically possible to obtain all of the eight bits of information if the four minor cells on both sides of a dark major cell are dark. However, as will be discussed, when a major or a five cell on both sides of a group of four minor cells is in a dark condition, then the reading which would normally be obtained from these four minor cells is nullified.

Refer now to minor cell P26 in FIG. 5. The lower terminal, as oriented in FIG. 5, of minor cell P26 is connected to the −10-volt D.C. line and the upper terminal of cell P26 is connected in common to the cathodes of diodes 91 and 92. The anode of diode 91 is connected through a resistor 95 to connection point 14. The junction of resistor 95 and diode 91 is connected to the anode of diode 93 whose cathode is connected to connection point 6 and the 1/2A output line of the normal bus 88. The anode of diode 92 is connected through series resistors 99 and 102 to the +25-volt line.

The junction of resistors 99 and 102 is connected to the anode of diode 103 whose cathode is connected to the +15-volt D.C. line to clamp or maintain the voltage at the junction of resistor 99 and resistor 102 at the +15-volt level. Also, the junction of resistor 99 and resistor 102 is connected to the anode of diode 96B whose cathode is conneted to connection point 2 and to the collector c of transistor 29. The junction of diode 92 and resistor 99 is connected to the anode of diode 94 whose cathode is connected to connection point 10 and the 1/2A′ line of the prime bus 89.

For purposes of explanation of the operation of the minor cell outputs, assume cells P0–P26 are in a dark condition and that the remainder of the cells P27–P134 are in a light condition. The output from the system would be such as to obtain a 20/2A+5/2B+1/2A or a 26/2 output. For present purposes consider only the output which will be provided on the 1/2A line to the left of the last major cell P25 which is dark.

Since cell P25 is dark, its associated transistors 27 and 28 are OFF and its associated transistor 29 is ON and its collector c is at essentially ground potential. With collector c of transistor 29 of cell P25 at ground potential, diode 96B is forward-biased and will shunt to ground through transistor 29, any current which would tend to flow from the +25-volt line through the path which may be traced through resistor 102, resistor 99, diode 92 and cell P26 to ground. However, since cell P30, the next major cell to the left of minor cell P26 is in a light condition, the potential at the collector c of its transistor 29 will be high and this high potential is coupled through connection point 2 of the P30–34 block to connection point 14 of the P25–29 block and through resistor 95, diode 91 and the dark photocell P26 to ground. The resistor 95, diode 91 and the dark photocell P26 effect a voltage dividing action which provides a potential to forward bias diode 93 and develop an output through connection point 6 and the 1/2A output line of bus 88.

Now assume that a box in the light array causes photocells P26 through P60 to become dark. Note that photocell P25 remains in a light condition. In this case, an output of

20/2A+10/2A+1/2A′+1/2B′+1/2C′+1/2D′=34/2 is obtained.

Consider the operation of the minor photocells to provide the 1/2A′, 1/2B′, 1/2C′ and 1/2D′ output. Note that each of photocells P29, P28, P27 and P26 is dark. The operation of the circuit of cell P26 to provide a 1/2A′ output will be described and it will be understood that a similar operation takes place for cells P27, P28 and P29 to provide a 1/2B′, 1/2C′ and 1/2D′ output respectively.

When cell P25 is in a light condition, its associated transistors 27 and 28 will be ON and its associated transistor 29 will be OFF. Accordingly, the potential on the collector c of transistor 29 will be high, which will reverse bias diode 96B and permit a current to flow from +25-volt line through resistor 102, resistor 99, diode 92 and the dark photocell P26. The resistor 99, diode 92 and the dark photocell P26 effect a voltage dividing action which provides a potential to forward bias diode 94 and develop an output which is coupled as an output on the 1/2A′ line of the prime bus 89.

As mentioned, when the major cells on both sides of a group of four minor cells are dark, the output from the group of minor cells will be nullified. For example, with cells 30 and 35 being dark the respective associated, transistors 29 will be conducting and place the cathode of the respective diodes 96B at essentially ground potential. Hence, transistor 29 associated with cell 30 will have a low potential at its collector c and will prevent any current from flowing through its associated diodes 92 and 94, and the other diodes in the group corresponding to diodes 92 and 94. Likewise, the transistors 29 associated with cell 30 will have a low potential at its collector c and will prevent any current from flowing through the diodes 91 and 93 associated with cell P30, or through any of the other diodes associated with cell P30 and corresponding to diodes 91 and 93.

UNITS-FIVES QUANTIZERS AND SUMMERS CIRCUITS

The outputs from the tree circuit shown in FIG. 4 are coupled to the Units-Fives Quantizers and Summer circuits shown in FIG. 11. The function of the circuit of FIG. 11 is to reduce the sixteen bits of input information provided by the tree circuit of FIG. 4 to nine bits of output information.

The lines labeled 1/2D, 1/2C . . . , 5/2A, 5/2B, etc., in FIG. 4 are connected to the similarly labeled lines in FIG. 11. The circuit details of the various blocks of the circuit of FIG. 11 are shown in FIGS. 12–17. In FIG. 11, the connection of each of the blocks to its associated block is indicated by the labeled connection points. For example, in FIG. 11 the input from the 1/2C line is connected to connection point 1 of block 115, also shown in FIG. 13. As shown, there is no input to block 115 on connection point 2, indicating that connection point 2 is not connected in the circuit of block 115. The output from the connection point 3 of block 115 is connected through line 115A to the connection point 7 of block 120 and its connection point 4 will be connected through line 115 to connection point 2 of block 123.

1/2 IN CIRCUITS

The 1/2 IN blocks 114–119 are connected to receive the 1/2 bit outputs or signals from the photocell circuits. In FIG. 11, the blocks 114–119 each comprise a 1/2 IN circuit; the details of a 1/2 IN circuit are shown in FIG. 13. The circuit of FIG. 13 includes an NPN type transistor 133 having a base $b$, an emitter $e$, and collector $c$ electrodes. The base $b$ of transistor 133 is connected to the cathode of a diode 134A whose anode is connected to connection point 1; base $b$ is also connected to the cathode of a diode 134B whose anode is connected to connection point 2. A first input is connected to the base $b$ of transistor 133 through diode 134A, and a second input is connected to base $b$ of transistor 133 through diode 134B. The two inputs to base $b$ of transistor 133 function as an "Or" logical circuit; that is, when connection 1 or 2 in FIG. 13 is at a high potential, transistor 133 will be biased to conduct. The collector $c$ of transistor 133 is connected to the +15 volt line. The emitter $e$ of transistor 133 is connected through series resistors 135 and 136 to the —10-volt line. The junction of resistors 135 and 136 is connected to the base $b$ of an NPN transistor 137. The emitter $e$ of transistor 137 is connected to ground, and the collector $c$ of transistor 137 is connected through series resistors 138 and 139 to the —10-volt line. The junction of resistors 138 and 139 is connected to the base $b$ of an NPN transistor 141. The emitter $e$ of transistor 141 is connected to ground reference, and its collector $c$ is connected through resistor 134 to B+ potential.

The collector $c$ of transistor 137 is also connected through a resistor 142 to B+ potential, and an output is taken from the collector $c$ of transistor 137 through connection point 4. A second output from the circuit of FIG. 13 is taken from the collector of transistor 141 through connection point 3.

The operation of the 1/2 IN circuit of FIG. 13 is as follows. When either connection point 1 or 2 has a high potential coupled thereto, indicating that one of the associated 1/2 bit lines is energized, and that its associated photocell is dark, the emitter-follower circuit of transistors 133 and 137 which is biased such that transistors 133 and 137 which are normally nonconducting will be biased to conduct. When this occurs, the potential at the collector $c$ of transistor 137 will drop to approximately ground potential, thus providing a low potential output on connection point 4. Transistor 141 which is normally conducting will now be biased to cut OFF, thereby providing a high potential at connection point 3.

1/2 ADD CIRCUITS

The purpose of the 1/2 Add block 120 and 121 is to add two 1/2 inputs applied thereto and provide an output indicative of the addition. The details of 1/2 Add blocks 120 and 121 in FIG. 11 are shown in FIG. 12. The circuit of FIG. 12 comprises an NPN transistor 145 having its emitter $e$ connected to ground reference, and its base $b$ connected through a biasing resistor 146 to the —10-volt line. The base $b$ of the transistor 145 is also connected through a resistor 147 to input connection point 7 and through a second resistor 148 to input connection point 6. The collector $c$ of transistor 145 is connected in common to the cathodes of a bank of diodes 151, 152, 153 and 154, and through a resistor 155 to B+ potential. The anodes of diodes 151, 152, 153, and 154 are respectively connected to output connection points 1, 2, 3, and 4 in FIG. 12.

Resistor 147 which is connected to input connection point 7 and resistor 148 which is connected to input connection point 6 form an "And" logical circuit such that transistor 145, which is normally in the OFF condition, is turned ON when a high potential is applied to both connection points 6 and 7. When transistor 145 is in the ON condition, the cathodes of diodes 151, 152, 153, and 154 connected are essentially at ground potential, and hence these diodes are forward biased for purposes to be explained.

5/2C CIRCUIT

The details of block 122, the 5/2C circuit, are shown in FIG. 14. The output of the 5/2C circuit of block 122 is arranged to provide an output equivalent of five 1/2 units; that is, the 5/2C circuit output effectively adds the 1/2 bit inputs and couples the results to the 5/2 Summer block 126 as will be explained.

The circuit of FIG. 14 comprises a transistor 161 having an emitter $e$ connected to ground reference, a base $b$ connected through resistor 162 to the —10-volt line. The base $b$ of transistor 161 is also connected through a resistor 163 to input connection point 2 and through resistor 164 to input connection point 1. The collector $c$ of transistor 161 is connected through a resistor 165 of the B+ potential line, and collector $c$ is also connected to the output connection point 3. The circuit of FIG. 14 is a "Nor" logical circuit; that is, when one or the other of the inputs at the connection points 1 or 2 drops to a low potential, transistor 161 will be biased to cut OFF and provide a high potential output through connection point 3.

1/2 OUT CIRCUIT

The details of the 1/2 Out blocks numbered 123 and 124 in FIG. 11 are shown in FIG. 15. The circuit of FIG. 15 is structurally and operationally the same as FIG. 14; however, the function or use of the two circuits is different. More specifically, the 1/2 Out blocks 123 and 124 provide an output indicative of a 1/2 bit. Since FIG. 15 is similar to FIG. 14, the circuit structure will be described hereinafter in connection with a description of the operation of the circuit.

N-SUMMERS

The details of the N-Summer blocks 125–128 in FIG. 11 are shown in FIG. 16. The designation N represents a 5/2, 10/2, 20/2, or a 40/2 sum, as will be explained. The circuit of FIG. 16 comprises in essence a three input "And" logical circuit 16A, an "Or" logical circuit portion 16B, and three "And" logical circuit portions 16C each having two inputs. FIG. 16 includes an NPN transistor 166 having an emitter $e$ connected to ground reference, a base $b$ connected through biasing resistor 167 to a —10-volt line; and, a collector $c$ connected through a resistor 168 to the B+ line. The base $b$ of transistor 166 is also connected to the cathode of a diode 169 whose anode is connected to one terminal of each of resistors 171, 172, and 173. The other terminals of each of resistors 171, 172 and 173 are connected to connection points 1, 2 and 3, respectively. The common terminal of resistors 171, 172 and 173 is also connected through a resistor 174 to the —10-volt line.

The base $b$ of transitsor 166 is further connected to the cathode of a diode 175 whose anode is connected through resistor 176 to a common terminal of resistors 177, 178 and 179. The other terminals of each of resistors 177, 178 and 179 are connected to input connection points 1, 2 and 3, respectively. The common terminal of the three resistors 177, 178 and 179 is also connected to the anode of diode 181 whose cathode is also connected to the collector $c$ of an NPN transistor 180, for purposes to be described. The collector $c$ of transistor 166 is also connected through a resistor 184 to the base $b$ of an NPN transistor 185. The base $b$ of transistor 185 is connected through a resistor 186 to a —10-volt line, and the collector $c$ of transistor 185 is connected through resistor 187 to the B+ line. The collector $c$ of transistor 185 is also connected to output connection point 4 and the line labeled N.

Note again that the preface letter N is used with reference to FIG. 16 and may represent a 5/2, 10/2, 20/2 or 40/2, as indicated in blocks 125 and 129. More specifically when referring to FIG. 16 as representing Summers block 125, N is equal to 5/2; and when referring to FIG. 16 as representing Summers block 126, N is equal to 10/2, etc.

In operation, transistor 166 is normally OFF and transistor 185 is normally ON. The resistors 171, 172 and 173 function as a three input "And" logical circuit while the resistors 177, 178 and 179 function as an "Or" logical circuit. A signal will be coupled through resistors 171, 172 and 173 and diode 169 to base $b$ of transistor 166 to cause transistor 166 to turn ON, only when all three of the input connection points 1, 2 and 3 are at a high potential. When transistor 166 turns ON, its collector $c$ will drop to a low potential causing transistor 185 to turn OFF. This, in turn, causes a high potential to be applied from the collector $c$ of transistor 185 to the output connection point 4 providing an output indicative of an N output. When only one or two of the input connection points 1, 2 or 3 are at a high potential, the "And" circuit comprising resistors 171, 172 and 173 will not affect the operation of transistor 166.

The resistors 177, 178 and 179 function as an "Or" logical circuit. When the potential at any one of the connection points 1, 2 or 3 is high, a signal will be coupled through the respective resistors 177, 178 or 179, resistor 176 and diode 175 to the base $b$ of transistor 166 to cause transistor 166 to turn ON causing transistor 185 to turn OFF and provide an output N at connection point 4.

The portion 16C of the circuit includes an NPN transistor 180 having its emitter $e$ connected to ground reference and its collector $c$ connected through a resistor 197 to the B+ line. As previously mentioned, the collector $c$ of transistor 180 is also connected to the cathode of a diode 181 whose anode is connected to the common terminal of resistors 177, 178 and 179. The base $b$ of transistor 180 is connected through a biasing resistor 198 to −10-volt line. The base $b$ of transistor 180 is further connected to the cathode of a diode 201 whose anode is connected to a common terminal of resistors 195 and 196. The other terminal of resistor 196 is connected to input connection point 1; and, the other terminal of resistor 195 is connected to input connection point 3. Resistors 195 and 196 function as an "And" logical circuit for transistor 180, as will be explained. The common connection of resistors 195 and 196 is also connected through resistor 204 to the −10-volt line.

The base $b$ of transistor 180 is further connected to the cathode of a diode 202 whose anode is connected to the common terminal of resistors 193 and 194. The other terminal of resistor 194 is connected to input connection point 1; and, the other terminal of resistor 193 is connected to input connection point 2. The common connection of resistors 193 and 194 is also connected through resistor 205 to the −10-volt line Resistors 193 and 194 also function as an "And" logical circuit to be explained. Further, base $b$ of transistor 180 is also connected to the cathode of a diode 203 whose anode is connected to the common terminal of resistors 191 and 192. The other terminal of resistor 191 is connected to input connection point 3 and the other terminal of resistor 192 is connected to input connection point 2. The common terminal of resistors 191 ad 192 is also connected through resistor 206 to the −10-volt line. Resistors 191 and 192 also function as an "And" logical circuit.

The collector $c$ of transistor 180 is connected through a resistor 182 to the base $b$ of an NPN transistor 183. The base $b$ of transistor 183 is also connected through a resistor 207 to the −10-volt line. The emitter $e$ of transistor 183 is connected to ground and its collector $c$ is connected through a resistor 207A to the B+ line. The collector $c$ of transistor 183 is also connected to output connection point 5 to provide a 2N output as shown.

In operation, assume only one of the connection points 1, 2 or 3 is at a high potential and the other two connection points are low. A signal can thus only be coupled through one of the resistors 177, 178 or 179 to cause transistor 166 to conduct. When transistor 166 conducts, transistor 185 will be cut OFF, thereby providing a high potential on connection point 4 indicative of one N output.

Assume in the next case that two of the three connection points 1, 2 or 3 are at a high potential and the other connection point is at a low potential. In this case, one of the pair of resistors 191–192, 193–194 or 195–196 will provide a sufficiently high potential at the common connection of the resistors to provide a high potential to cause transistor 180 to conduct. When transistor 180 conducts, the potential at its collector $c$ will drop to ground potential thus causing transistor 183 to be cut OFF. When this occurs, an output will be provided at the collector $c$ of transistor 183 to provide an output indicating a 2N output.

As mentioned, when transistor 180 conducts, its collector $c$ drops to a low potential and it will, in essence, connect ground potential through diode 181 to the common connection or resistors 177, 178 and 179, thus preventing a high potential from being coupled to the base $b$ of transistor 166 to thereby maintain transistor 166 in its OFF condition and transistor 185 ON when only two inputs are received.

When three inputs are present, a signal will be coupled through resistors 171, 172 and 173 to forward bias transistor 166 to cause it to conduct and turn associated transistor 185 OFF, providing an output from the collector $c$ of transistor 185 to output connection point 4 indicative of an N output. Also, all three "And" logical circuits 191–192, 193–194 and 195–196 will provide a high potential to turn ON transistor 180 and turn OFF transistor 183 to provide a 2N output at connection point 5. Note that in this case transistor 180 is conducting, and the common connection of resistors 177, 178 and 179 is at a low potential, but this will not affect the circuit since the high potential provided through resistors 171, 172 and 173 maintains transistor 166 in the ON condition. Thus, if all three inputs are present, both connection points 4 and 5 will have a high potential applied thereto indicative of N+2N or 3N output.

80/2 SUMMER

The details of an 80/2 Summer of block 129 are shown in FIG. 17 (see the sheet of FIG. 11). The 80/2 Summer functions to combine two 40/2 signals. The 80/2 Summer includes NPN transistors 208 and 209, each having a base $b$, an emitter $e$, and collector $c$ electrodes. The base $b$ of transistor 208 is connected through a resistor 209A to connection point 1 and through a resistor 209B to the −10-volt line. The emitter $e$ of transistor 208 is connected to ground, and the collector $c$ is connected through a resistor 210A to the B+ line. The collector $c$ of transistor 208 is also connected through series resistors 210B and 210C to the −10-volt line. The junction of resistors 210B and 210C is connected to base $b$ of transistor 209. The emitter $e$ of transistor 209 is connected to ground, and its collector $c$ is connected through a resistor 210A to the B+ line. The collector $c$ of transistor 209 is also connected to output connection point 2.

In operation, transistor 208 is normally OFF and transistor 209 is normally ON. When a high potential indicative of a 2N input received from the 40/2C Summer 128 of FIG. 11 is applied to connection point 1 of the 80/2 Summer 129, transistor 208 is turned ON and transistor 209 is turned OFF thereby causing the collector $c$ of transistor 209 to couple a high potential to connection point 2 indicative of on 80/2 output.

OPERATION OF UNITS-FIVES QUANTIZERS AND SUMMERS WITH BOX COVERING 38 PHOTOCELLS

Assume for purposes of explanation that a portion of a box is momentarily interrupting cells 21–58 of the tree array of FIG. 3A; that is, a total of 38 cells are being interrupted. Accordingly, the tree circuit of FIG. 3A and FIG. 4 will provide data signals 10/2A, 10/2B, 5/2A, 5/2B, 1/2A′, 1/2B′, 1/2C′, 1/2D′, 1/2A, 1/2B and 1/2C.

The 5/2A block labeled 701, 10/2A block labeled 702, 10/2B block 703, and 5/2A block 704 will be energized to provide an output equal to 30. The four unit cells generally labeled 705 and the three unit cells generally labeled 706 will provide a total of seven 1/2 bits totalling 37/2 bits.

The Units-Fives Quantizers and Summers circuits of FIG. 11 will convert the foregoing signals into a 20/2, 10/2, 5/2, 1/2C, and 1/2A, as will now be described. Note that the 1/2A′, 1/2B′, 1/2C′, and 1/2D′ bits are coupled as high potential inputs to the 1/2 In circuit blocks 117, 119, 118 and 114, respectively. The 1/2A, 1/2B and 1/2C bits are coupled as high potential inputs to blocks 117, 116 and 115, respectively.

As mentioned above, with reference to FIG. 13, when a high potential input is provided to the circuit of a 1/2 In block, the block will provide a high potential output at its respective connection point 3. Block 114 will provide a high potential through lines 114B as a 1/2D to output connection point 1. Block 115 will provide a high potential through line 115A to the 1/2 Add circuit block 120. Block 116 will provide a high potential to line 116B as an input to connection point 7 of the 1/2 Add block 121. Block 117 will provide a high potential through line 117B as a 1/2A to output connection point 4. Block 118 will provide a high potential through line 118A to connection point 6 of the 1/2 block 120. And, block 119 will provide a high potential through lead 119A to connection point 6 of the 1/2 Add block 121.

As described above, each 1/2 Add block (FIG. 12) comprises an "And" logical circuit. Thus, if two high potential inputs are being coupled from the 1/2 In blocks to each of the 1/2 Add circuits 120 and 121, both blocks 120 and 121 will provide a low potential to the 5/2C block 122.

As also described above, the 5/2C block 122 (FIG. 11) comprises a "Nor" logical circuit wherein when either or both positive inputs drop to a low potential, block 122 provides a high potential at its output connection point 3. The high potential from connection point 3 of block 122 is coupled through lead 122A as an input to connection point 3 of the 5/2 Summer 125 as a 5/2C input.

Thus, the signal output from the units portion of FIG. 11 comprises seven 1/2 units, or more specifically, a 1/2D at output connection point 1, a 1/2A output at output connection point 4, and a 5/2 which is coupled through line 122A to connection point 3 of the 5/2 Summer block 125 as a 5/2C input.

Note that 1/2 Out block 123 of FIG. 11 receives a low potential at its connection point 1 through line 123A from connection point 4 of 1/2 In block 118 which is at a low potential. Likewise, connection point 2 of block 123 receives a low potential input through line 115B from connection point 4 of the 1/2 In block 115 which is at low potential. As mentioned above with respect to FIG. 15, the circuit of block 123 is a "Nor" circuit. Accordingly, when a low potential input is connected to either the input connection points 1 and 2 of block 123 (FIG. 15) transistor 161B will be cut OFF. Accordingly, the collector c of transistor 161 and connection point 3 of 1/2 Out block 123 will have a high potential thereon which would normally be applied to the 1/2C line. However, since transistor 145 of the 1/2 Add block 120 is conducting, essentially ground potential will be coupled through conducting transistor 145, diode 154 and connection point 4 of block 120 through line 123B to connection point 3 of 1/2 Out block 123.

Thus, the 1/2C line will be at ground or low potential indicating no output on the 1/2C line.

The operation of the 1/2 Out block 124 is similar to that of 1/2 Out block 123 in that connection point 4 of the 1/2 Add block 121 maintains the output on the 1/2B line at ground potential through line 124B and its conducting transistor 145.

Since in this particular case a total of 38 cells are dark, the tree circuit provides a 5/2A, 5/2B, 10/2A, 10/2B input to the Units-Fives Quantizers and Summers circuits of FIG. 11. The 5/2A, 5/2B are coupled as inputs to connection points 1 and 2 of the N Summer block 125 and a third 5/2 input is coupled to connection point 3 of the N Summer block 125 from the 5/2C block 122. As described above in connection with FIG. 16, block 125 will, accordingly, provide a signal representative of a 5/2 through its connection point 4 to output connection 5. Block 125 will further provide a 10/2 output from its connection point 5 which is coupled as a 10/2C input to the 10/2 Summer block 126.

Note in the case being discussed a 10/2A and a 10/2B is coupled directly to the tree circuit to connection points 1 and 2, respectively, of block 126.

Block 126 will thus provide a 10/2 output at its connection point 4 to output connection point 6; and, a 20/2 output at its connection point 5 which is coupled as a 20/2C input to the 20/2 Summer block 127. Since the Summer block 127 has only a 20/2C input, an output will be provided only at its connection point 4 to output connection point 7 indicating a 20/2 total. Thus, in FIG. 11, connection points 1, 4, 5, 6 and 7 will be at a high potential representing a 37/2 output which represents the number of increments which are caused to become dark by the portion of the box in the field or the plane of the light array.

PROCESS CONTROLLER

The output from the Units-Fives Quantizers and Summers of FIG. 11 is connected to the Process Controller of FIG. 18, see also the block diagram of FIG. 1. The Process Controller of FIG. 18 includes a Height Multiplier Input Circuit 255 for receiving the data representative of the height of a box being measured; a Width Multiplier Input Circuit 256 for receiving the data representative of the width of a box being measured; a Multiplier Clock 257 for stepping or commutating the operation of the Multiplier; a Multiplier 258 for performing multiplication of the height times the width in accordance with a length counter to provide pulses indicative of the volume of a box; a Box-In Circuit 259 for indicating the entry and exit of a box from the field of the light array; a Length Counter 260 for obtaining an indication of the length of a box; a Counter generally numbered 262 for counting the number of output pulses received from the Multiplier circuit which is a measure of the volume of a box; a Print Command Circuit 261 for controlling the printing operation; a Printer 269 for printing or registering the volume computation; and, a Digital Display Unit 278 for visually displaying the volume computed.

The function and purpose of the circuits represented by the block diagram of FIG. 18 will first be described generally, and the operation of the individual circuits will then be described in connection with FIGS. 12–28 showing the details of the blocks of FIG. 18.

Referring to FIG. 1, it will be appreciated that the height and width parameters of a box are obtained by similar but separate circuitry generally numbered 19 and 20, respectively. The Height Multiplier Input Circuit 255 in the Process Controller of FIG. 18 receives data indicating the height of the box as provided by the Height Light Array, the Height Tree Circuits, and the Height Quantizers and Summers, generally numbered 19 in FIG. 1, and described hereinabove. Likewise, the Width Multiplier Input Circuit 256 in the Process Controller receives data indicating the width of the box as provided by the Width Light Array, the Width Tree Circuits and the Width Quantizers and Summers, generally numbered 20 in FIG. 1, and described hereinabove.

The outputs of the Height Multiplier Input Circuit 255 and the Width Multiplier Input Circuit 256 are coupled to the Multiplier Circuit 258 where the height and width parameters of the box are combined and multiplied, as will be explained.

When a box 8 (see FIG. 1) to be measured enters the field; that is, the plane of the light array, the Box-In Circuit 259 develops a signal which initiates the operation of the Length Counter 260. The Length Counter 260 provides output pulses for each given increment of length that the box travels through the light array. The output of the Length Counter initiates a multiplication, in the Multiplier 258, of the height and width parameters for each given increment of length.

The outputs or results of the multiplication by the Multiplier 258, which are in the form of pulses, are coupled to the Counters circuit generally labeled 262 where the pulses are summed to effect an integration or summation of the incremental volumes of the box and provide a result representative of the total volume of the box. The Read-Out Amplifier blocks 271–274 amplify the outputs from the respective counter blocks to energize a Digital Display 278 or a Printer 269. The operation of the printer to record the outputs is controlled by the Print Command block 261 which, in turn, is energized by the Box-In circuit 259.

HEIGHT MULTIPLIER INPUT CIRCUIT

The circuit of FIG. 19 shows the circuit details of the Height Multiplier Input block 255 of FIG. 18. The Height Multiplier Input circuit receives the code representing the height of the box being measured. Note that the connection points in block 255 of FIG. 18 represent the similarly numbered connection points shown in FIG. 19. Further, the connection points 1–9 in FIGS. 18 and 19 are connected to the similarly numbered connection points in FIG. 11.

In the embodiment of the invention, the system is arranged to receive and process two factors or numbers, each number being a two digit number with one number A2, A1 representing the height of the box; and, the other number B2, B1 representing the width of the box. The circuit of FIG. 19 comprises a units portion; that is, a portion arranged to receive the A1 digits in the units position of the number, and a tens portion arranged to receive the A2 digits in the tens position of the number. For example, if the number being received is 65, the tens portion of the circuit of FIG. 19 will process the 6 digit and the units portion of the circuit will process the 5 digit.

UNITS INPUT PORTION OF HEIGHT MULTPLIER INPUT

In FIG. 19, the units portion of the circuit comprises a first NPN transistor 301 including a base $b$, an emitter $e$, and collector $c$ electrodes. The base $b$ electrodes is connected through resistor 303 to connection point 10 to receive the A1 or units position control signal, as will be more fully described hereinbelow. The base $b$ of transistor 301 is connected through resistor 304 to the −10-volt line, and its emitter $e$ is connected to ground. The collector $c$ of transistor 301 is connected through load resistor 307 to the B+ line, and is also connected through another resistor 305 to the base of a second NPN transistor 302. Transistor 302 has a base $b$, an emitter $e$, and collector $c$ electrodes. The base $b$ of transistor 302 is connected through registor 306 to the −10-volt line. The emitter $e$ of transistor 302 is connected to ground, and the collector $c$ is connected through a load resistor 308 to the B+ line. The collector $c$ of transistor 302 is also connected in common to each of the cathodes of a bank of diodes generally labeled 310. The anodes of each of diodes 310 is connected through respective load resistors generally labeled 311 to the B+ line.

The resistors generally labeled 311, which are connected in circuit with a capacitor 514, as will become clear, are weighted in accordance with the input signal they are to represent.

The operation of the system of the invention is such that the time required for the said capacitor 514 to charge to a given point is used in commuting the volume of a box. Accordingly, the respective resistor 311 effectively connected or coupled in the circuit of FIG. 19 influences the charging rate of the capacitor 514 and hence is representative of the input code.

More specifically, resistors 311A, 311B, 311C and 311D which are representative of the 1/2D, 1/2C, 1/2B and 1/2A inputs have essentially five times the resistance value of the 5/2 resistor 311E and ten times the resistance of the 10/2 resistor 311F. Hence, for example, the associated capacitor 514 will charge essentially ten times faster when resistor 311F is effectively connected in the circuit of FIG. 19 as compared to its charging rate when resistor 311A is effectively connected in the circuit.

The junctions of the anodes of each of the diodes 310 and the respective resistors 311 are connected to the anodes of diodes generally labeled 312 whose cathodes are respectively connected to connection points 1–6 to receive the 1/2D, 1/2C, 1/2B, 1/2A, 5/2 and 10/2 inputs. In the present embodiment, the foregoing inputs are combined in the following code to provide the information indicative of the units digit of the number being received.

Decimal: FIG. 19 Units Code Input
0     0
½     1/2A (or any 1/2)
1     1/2A+1/2B (or any two 1/2's)
1½    1/2A+1/2B+1/2C (or any three 1/2's)
2     1/2A+1/2B+1/2C+1/2D
2½    5/2
3     5/2+1/2A (or any other 1/2)
3½    5/2+1/2A+1/2B (or any two other 1/2's)
4     5/2+1/2A+1/2B+1/2C (or any three 1/2's)
4½    5/2+1/2A+1/2B+1/2C+1/2D
5     10/2
5½    10/2+1/2A (or any 1/2)
6     10/2+1/2A+1/2B (or any two 1/2's)
6½    10/2+1/2A+1/2B+1/2C (or any three 1/2's)
7     10/2+1/2A+1/2B+1/2C+1/2D
7½    10/2+5/2
8     10/2+5/2+1/2A (or any 1/2)
8½    10/2+5/2+1/2A+1/2B (or any two 1/2's)
9     10/2+5/2+1/2A+1/2B+1/2C (or any three 1/2's)
9½    10/2+5/2+1/2A+1/2B+1/2C+1/2D

TENS INPUT PORTION OF HEIGHT MULTIPLIER INPUT

The tens portion of the circuit of FIG. 19 comprises another pair of NPN transistors 308 and 309, each having a base $b$, an emitter $e$, and a collector $c$ electrodes. The base $b$ of transistor 308 is connected through resistor 312A to connection point 11 to receive an A2 or tens position control signal, as will be discussed hereinbelow. The base $b$ of transistors 308 is also connected through resistor 312B to the −10-volt line. The emitter $e$ of transistor 308 is connected to ground, and its collector $c$ is connected through a load resistor 314 to the B+ line. The collector $c$ of transistor 308 is also connected through resistors 313A to the base $b$ of transistor 309. The base $b$ of transistor 309 is connected through resistor 313B to the +10-volt line. The emitter $e$ of transistor 309 is connected to ground, and its collector $c$ is connected through a load resistor 315 to the B+ line. The collector $c$ of transistor 309 is also connected in common to the cathodes of a bank of diodes generally labeled 316, and each of the anodes of the diodes labeled 316 is connected through respective resistors generally labeled 317 to the B+ line. The junction of the anodes of each of the diodes 316 is also respectively connected to connection points 7, 8 and 9 of FIG. 19 through input diodes generally labeled 318.

Note, as in the case with the resistors generally labeled 311, resistors 317 are relatively weighted to provide a desired charging rate to the associated capacitor 514.

In the embodiment of the invention described, a total of 134 lamps are employed, providing a total of 133 measuring spaces of .0232 feet each. As mentioned, each space of 0.232 feet is one-half of the basic measurement of .0464 feet. Accordingly, there are a total of 66½ basic increments of measurement in each of the height and width dimensions which can be recorded. Accordingly, the maximum number that has to be registered is 66½; and, hence, the maximum number employed in the tens portion in the circuit of FIG. 19 is the number 6; the circiut of FIG. 19 is arranged accordingly to receive a BCD coded input of 1, 2 and 4 sufficient to provide the number 6 in the tens position.

The code employed in the tens digit portion is a modified BCD code; that is, the following relation is used:

BCD: FIG. 19 Tens Code Input
1 20/2
2 40/2
3 20/2+40/2
4 80/2
5 80/2+20/2
6 80/2+40/2
7 80/2+40/2+20/2 (not used)

OPERATION OF HEIGHT MULTIPLIER INPUT CIRCUIT

In operation when connection point 10 receives a positive potential indicative of an A1 or units position control signal from the Multiplier Clock 257 (to be discussed hereinbelow) transistor 301 of FIG. 19 is caused to conduct which places a low potential on its collector $c$ and turns transistor 302 OFF. The data input signal on any of connection points 1–6 of FIG. 19 is a high potential signal which reverse biases the selected diodes generally labeled 312. When transistor 302 is turned OFF by an A1 control signal, ground potential will be removed from the cathodes of diodes 310 and a current will be permitted to flow from the B+ line through the selected resistors 311, the respective diodes 310 and diode 319A to output connection point 12 in FIG. 19. For example, if the connection point 1 has a high potential signal applied thereto, diode 312A will be back-biased; and, when transistor 302 is turned OFF, ground potential will be removed from the cathode of diode 310A. Accordingly, current will flow from the B+ line through resistor 311A, diode 310A, and diode 319A to the connection point 12 indicating a 1/2D output to the Multiplier 258.

The tens digit portion of the circuit of FIG. 19 operates in essentially the same manner as the units portion of the circuit. That is, when a high potential signal indicative of an A2 or tens control signal is present at connection point 11, the high potential causes transistor 308 to become conductive and its collector $c$ potential to drop to a low level; and, this, in turn, couples a low potential to the base $b$ of transistor 309 causing transistor 309 to be cut OFF. When transistor 309 cuts OFF, ground potential is removed from the cathodes of each of the diodes 316, and if a high potential is present at connection points 7, 8 or 9, a current will be permitted to flow from B+ line through the seletced resistors 317, the respective diodes 316, and diode 319 to the connection point 12. For example, if a high potential signal indicative of a BCD 1 input is applied to connection point 7, diode 318A will be back-biased. When transistor 309 is turned OFF by the A2 control signal, a current will be permitted to flow from B+ line through resistor 317A, diode 316A and diode 319 to connection point 12 providing a BCD 1 output in the tens digit position.

A BCD 0 is represented by the units portion of the circuit of FIG. 19 when all the connection points 1–6 are at a low potential. In this condition, all the diodes 312 will be forward biased and will shunt to ground all signals which would tend to flow through the diodes 310 to connection point 12. When an A1 control signal is applied to the circuit of FIG. 19, a zero is represented in the tens portion of the circuit of FIG. 19 in a similar manner to that described in the units portion of FIG. 19.

WIDTH MULTIPLIER INPUT

The circuit of FIG. 21 shows the circuit details of the Width Multiplier Input circuit of block 256. The connection points 1–9 in FIG. 21 and the connection points 1–9 in block 256 of FIG. 18 represents the same connection points. Further, connection points 1–9 in block 256 are connected to the similarly numbered connection points in FIG. 11.

An input to block 256 consists of a two-digit number representing the width of the box being measured. The particular data bit inputs to the various connection points are indicated on the line connected to the respective connection points.

The circuit of FIG. 21 comprises an NPN transistor 320 including a base $b$, an emitter $e$, and collector $c$ electrodes. The base $b$ of transistor 320 is connected through resistor 321 to the −10-volt line and through resistor 322 to connection point 10 which receives a B1 control signal from connection point 3 of the Multiplier Clock 257 indicative of the units position, as will be explained hereinbelow. The emitter $e$ of transistor 320 is connected to ground, and its collector $c$ is connected through a load resistor 323 to the B+ line. The collector $c$ of transistor 320 is also connected through resistor 324 to the base $b$ of an NPN transistor 325 having a base $b$, an emitter $e$, and collector $c$ electrodes. The base $b$ of transistor 325 is connected through resistor 326 to the −10-volt line; its emitter $e$ is connected to ground, and its collector $c$ is connected in common to the cathodes of a bank of diodes generally labeled 327. The anodes of diodes 327 are connected through respective resistors generally labeled 328 to the B+ line. The cathodes of diodes 327 are also connected through a series circuit including a diode 329 and a resistor 361 to the base $b$ of an NPN transistor 360. Transistor 360 comprises a portion of the zero control circuit to be described hereinbelow.

UNITS INPUT PORTION OF WIDTH MULTIPLIER INPUT

The units portion of the circuit of FIG. 21 includes a group of capacitors generally labeled 332 which capacitors are weighted to have a capacitance value representative of the input signal. For example, the capacitor representative of a 1/2D input is approximately one-tenth the capacitance value of the capacitor representative of the 10/2 input on connection point 5; that is, the charging rate of capacitor 332A is arranged to be ten times more rapid than the charging rate of capacitor 332F. The operation of the system of the invention is such that the time which the particular one of the capacitors generally numbered 332 requires to charge to a given point is used in obtaining the width dimension of a box. Accordingly, the respective capacitor or capacitors 332 effectively connected or coupled in the circuit of FIG. 21 and their charging rate are representative of the input code. The system of the invention is further arranged such that when the charge on a capacitor reaches a given level, a device will be triggered into operation as part of a multiplication operation as will become clear in connection with the description of the Multiplier block 258 and FIG. 24.

For purposes of explanation, capacitor 332A and its associated circuits will be described and it will be understood that the capacitors generally labeled 332 are similar in structure and function.

Capacitor 332A has its upper plate, as oriented in FIG. 21, connected through line 334 to output connection point 13 and its lower plate connected to the collector c of an NPN transistor 333A. Transistor 333A includes an emitter e connected to ground, and a base b connected through a resistor 335 to the —10-volt line, and through series resistors 336 and 328A to the B+ line. The junction of resistors 336 and 328A is also connected to the anode of a diode 338A whose cathode is connected to input connection point 1 to receive a 1/2D input. The junction of resistors 336 and 328A is also connected to the anode of diode 327A whose cathode is connected to the anode of a diode 329 whose cathode is connected through a resistor 361 to the base b of zero control transistor 360.

In operation, assume that a high potential signal is applied to connection point 1 of FIG. 21 indicative of a 1/2D signal. (Note that the code input for FIG. 21, for both the units and tens position, is the same as that described above for the circuit of FIG. 19.) The high potential applied to connection point 1 will reverse bias diode 338A. If a B1 control signal, indicating that a multiplication of the digits in the units position is to be performed, is coupled to connection point 10 of FIG. 21, transistor 320 will be turned ON and transistor 325 will be turned OFF. When transistor 325 turns OFF it will remove ground potential from diodes 327 and a signal will be permitted to flow from B+ line through resistor 328A (diode 338A being back-biased), resistor 336 and resistor 335 to cause transistor 333A to turn ON. When this occurs, a circuit will be completed as will be explained hereinafter in connection with a description of the Multiplier Clock 257 and the Multiplier 258, from the positive supply potential through connection point 13 and lead 334 to charge capacitor 332A toward a positive potential; however, for present purposes, it is sufficient to assume that connection point 13 has a positive potential applied thereto. Capacitor 332A is thus permitted to charge to a given potential to activate a triggering device, as will be explained hereinbelow.

TENS INPUT PORTION OF WIDTH MULTIPLIER INPUT

The tens portion of the Width Multiplier Input circuit of FIG. 21 is essentially the same as the units portion of the circuit and operates in essentially the same manner. The tens portion of the circuit of FIG. 21 includes a transistor 340 having an emitter e connected to ground and its base b connected through resistor 341 to connection point 11 to receive a B2 or tens digit control signal. The base b of transistor 340 also is connected through resistor 342 to the —10-volt line, and the collector c is connected through resistor 343 to the B+ line. The collector of transistor 340 is further connected through resistor 344 to the base b of transistor 345 which has its emitter e connected to ground. The base b of transistor 345 is also connected through resistor 346 to the —10-volt line, and its collector c is connected to the cathodes of a bank of three diodes generally labeled 347. The anode of each of the diodes 347 is connected through respective resistors generally labeled 348 to the B+ line. The anodes of the diodes 347 are also connected through three respective diodes generally labeled 349 to respective data input connection points 7, 8 and 9. The cathodes of diodes 347 are connected to the anode of a diode 362 whose cathode is connected through resistor 361 to the base b of transistor 360 in the zero control portion 353 of the circuit of FIG. 21.

The tens portion of the circuit of FIG. 21 includes a grouping of three capacitors generally labeled 350, each associated with the respective transistor switch generally labeled 351 for purposes to be explained. The circuit connections and operation of the three capacitors 350 are similar to one another, hence a description of one capacitor 350A and its operation is sufficient to the understanding of the tens portion of the circuit of FIG. 21.

The lower plate of capacitor 350A is connected to the collector of transistor 351A. The emitter of transistor 351A is connected to ground, and the base b of transistor 351A is connected through resistors 352 and 348A to the B+ line. The base b of transistor 351A is also connected through resistor 354A to the —10-volt line. The upper plate of capacitor 350A is connected to line 334 and connection point 13.

In operation, assuming a positive signal is supplied to connection point 7 indicating a 20/2 or BCD 1 input, diode 349A will be back-biased and when connection point 11 has a positive potential coupled thereto indicating a B2 control signal from the Width Multiplier Input block 258, see FIG. 18, transistor 340 will be turned ON and transistor 345 will be turned OFF, causing diodes 347 to have ground potential removed from their cathodes. In this condition, a current will be permitted to flow from the B+ line through resistor 348A, resistor 352A, and resistor 354A to cause transistor 351A to conduct. When transistor 351A conducts, capacitor 350A is permitted to charge from connection point 13 (which is connected to a supply potential as will be described), line 334, capacitor 350A and transistor 351A to ground. As mentioned, the capacitance value of each of the capacitors generally numbered 350 is weighted to represent a value indicative of the input signal. For example, capacitors 350A, 350B, and 350C are weighted to provide a representative output of 1, 2 and 4 in a BCD code.

As mentioned before, the maximum number processed by the system in the present embodiment is a 66½; hence, the maximum decimal digit required in the tens position is a 6; three inputs representative of BCD 1, 2 and 4 are sufficient to provide a 6 decimal digit.

ZERO CONTROL OF THE WIDTH MULTIPLIER INPUT

In order to provide a zero digit output in the circuit of FIG. 21, a zero control circuit 353 is provided. The zero control circuit 353 comprises an NPN transistor 360 having a base b, an emitter e, and collector c electrodes. The base b of transistor 360 is connected through resistor 361 in common to the cathodes of diodes 329 and 362. The base b of transistor 360 is also connected through resistor 363 to the —10-volt line, and the collector c of transistor 360 is connected through a resistor 364 to the B+ line. The collector c of transistor 360 is further connected through connection point 12 to the connection point 7 of the Multiplier 258, see also FIGS. 18 and 24. The collector c of transistor 360 is further connected through a resistor 365 to the base b of transistor 366. The emitter e of transistor 366 is connected to ground and its collector c is connected to the lower plate, as oriented in FIG. 21, of a capacitor 367. The upper plate of capacitor 367 is connected to connection point 13. The base b of transistor 366 is further connected through resistor 368 to the —10-volt line. Transistor 360 is biased to be normally conducting and transistor 366 is normally nonconducting.

The operation of the circuit when a B1 control signal is present and the data signal at connection points 1–6 of FIG. 21 is zero is as follows. The B1 control signal causes transistor 325 to turn OFF and removes or disconnects ground potential from the cathodes of diodes 327. Current would thus tend to flow from the selected resistors 328, through the respective diodes 327 and diode 329 to the zero control circuit 353. However, with a zero data signal input to connection points 1–6, all of the diodes 338 will be forward biased and shunt to ground any current tending to flow through diodes 327 and 329. Accordingly, transistor 360 in the zero control circuit 353 will be turned OFF and transistor 366 will be turned ON. When the foregoing occurs, the capacitor 367 which is a relatively small capacitor will be permitted to charge through the circuit, which will be subsequently traced, from the supply potential, connection point 13, capacitor 367 and the conducting transistor 366 to ground. Capacitor 367 charges to a level to trigger the associated triggering device, as mentioned hereinabove, relatively rapidly. As will also become clear as this description progresses, a multiplication by zero is effected by shifting the stepping control from the one multiplying position to the next multiplying position.

The operation of the zero control circuit for the B2 or tens control signal is similar to that described above for the B1 control signal. Briefly, when a B2 control signal is present at connection point 11 and no signal or zero data signal is present at connection points 7, 8 or 9, then diodes 349 will be forward biased and shunt to ground any current tending to flow in diodes 347 and diode 362. Accordingly, transistor 360 in the zero control circuit 353 will be turned OFF and transistor 366 will be turned ON completing a current path through which capacitor 367 can charge. When capacitor 367 charges to the triggering level of the device, the associated Multiplier Clock 257 is stepped to initiate the succeeding multiplication operation, as will be explained fully hereinbelow.

BOX-IN CIRCUIT

The Box-In circuit 259 of FIG. 18 provides a signal to indicate when a box enters, and when the box leaves the field of light array. The signal outputs from the Box-In circuit 259 initiate various circuit operations, as will be described.

The circuit of FIG. 23 shows the details of the Box-In block 259 of FIG. 18. The Box-In signal is provided by any or all of the major height photocells, or any or all of the major width photocells when any one of these photocells is caused to become dark by the interruption of its associated light beam.

The Box-In circuit of FIG. 23 comprises an NPN transistor 340 which is biased to be normally conducting. Transistor 340 includes a base $b$ which is connected through series resistors 341 and 342 to the B+ line. The base $b$ of transistor 340 is also connected through resistor 345 to the —10-volt line. The junction point of resistors 341 and 342 is connected to the anode of a first diode 343 whose cathode is connected through connection point 1 to connection point 12 of the major cell blocks, see FIG. 5, of the height photocells. The junction point of resistors 341 and 342 is also connected to the anode of a second diode 344 whose cathode is connected to connection point 12 of the major cell blocks, see FIG. 5, of the width photocells. The emitter $e$ of transistor 340 is connected to ground and its collector $c$ is connected through resistor 346 to B+ line. The collector $c$ of transistor 340 is connected to the anode of a diode 351 whose cathode is connected through output connection point 3 to connection point 1 of the Length Counter 260, see FIG. 18. The collector $c$ of transistor 340 is connected through connection point 5 to connection point 1 of the Print Command block 261, see also FIG. 18.

Note that input connection points 1 and 2, or either one, can be connected to one or more photocell blocks such as shown in FIG. 5 to trigger the Box-In circuit of FIG. 23. A connection to more than one photocell block is preferable since, for example, the leading edge of the box, either in the height or width dimension, may be irregular, and it is desirable that the leading point of the box initiate the multiplication operation to assure an accurate computation of the volume of the box.

The operation of the Box-In circuit is as follows: Transistor 340 is biased to be normally conducting and transistor 29 is biased to be normally nonconducting. An input signal from connection point 12 of any one of the major photocell blocks, see FIGS. 4 and 5, indicating that one or more major height or one or more major width photocells is dark, will place connection points 1 or 2 at a low, essentially ground, potential; thus forward biasing either or both diodes 343 and 344. Accordingly, the current from B+ potential through resistor 342 will be shunted to ground through either or both diodes 343 and 344; and, transistor 340 will be turned OFF. The collector $c$ of transistor 340 will then rise to a high potential and this high potential will be coupled through diode 351 and output connection point 3 to connection point 1 of the Length Counter 260 (see FIG. 18) to initiate the operation of the Length Counter. A second output from collector $c$ of transistor 340 is coupled through output connection point 5 to connection point 1 of the Print Command circuit 261 (FIGS. 18 and 27) to energize the associated Printer 269 as will be explained. A third output from the Box-In circuit of FIG. 23 is coupled through capacitor 352 and output connection point 4 to the Counter 262 (FIG. 18) to reset all the counters 263 . . . 268 to zero and also to reset the Length Counter blocks 260A and 260B, FIG. 22, to zero when a new or succeeding box enters the light array.

LENGTH COUNTER

The operation of the Length Counter block 260 in FIG. 18 will now be described by reference to FIG. 22. The Length Counter 260 receives input pulses from a suitable electromagnetic pulse generating means 22A of the length pulser 22, of any known type, connected to be operated by movement of the conveyor on which the box is being transported. The pulse generating means generates pulses in response to the movement of the conveyor.

The Length Counter 260 effectively divides the pulses produced by the electromagnetic means 22A by four and provides an output pulse for every four input pulses, as will be explained. The output pulses from the Length Counter 260 initiate successive multiplication operations as will also be explained.

Referring to FIG. 22, a Box-In signal, indicating that a box is in the plane of the light array, is coupled to connection point 1 of the Length Counter 260 from connection point 3 of the Box-In circuit block 259 to initiate operation of the Length Counter.

The Length Counter 260 includes a transistor 371 having a base $b$ connected through resistor 370 to connection point 1. The base $b$ of the transistor 361 is also connected through resistor 372 to ground, and a capacitor 373 is connected in parallel with resistor 372. The emitter $e$ of transistor 371 is connected to ground and its collector $c$ is connected through a resistor 374 to a source of about +4.5 volts D.C. potential. The collector $c$ of transistor 371 is connected through line 375 to a pair of flip-flop circuits 386 and 387 of any suitable known type, arranged to receive input pulses and provide one output pulse for every four pulses received, as is well known in the art.

The length pulses being received through connection point 2 are coupled through a resistor 378 and a pulse shaping network generally labeled 379 to the base $b$ of an NPN transistor 380. The transistor 380 has the usual base $b$, emitter $e$ and collector $c$ electrodes. The emitter $e$ of transistor 380 is connected to ground and the collector $c$ is connected through a resistor 378A to a +4.5-volt D.C. potential line. Transistor 380 is connected to be energized by the input pulses coupled to its base $b$ from connection point 2 through resistor 378 and the pulse shaping network 379. In operation, flip-flop 386 is continually being turned ON and OFF.

The output pulses from transistor 380 are coupled from its collector $c$ to connection point 2 of the flip-flop circuit 386. Flip-flop 386 has its connection point 1 connected to the collector $c$ of transistor 371, its connection point 8 is connected to the cathode of a diode 388 (the anode of diode 388 is connected to the +4.5-volt D.C. line), and its connection point 7 connected as an input to connection point 2 of flip-flop 387. Connection points 3, 4 and 6 of flip-flop 386 are connected to ground.

Flip-flop 387 has its input connection point 6 connected to the collector of transistor 371, its connection point 8 connected to the cathode of diode 388, and its connection point 7 connected through a resistor 382 to the base $b$ of an NPN transistor 383. Connection points 1, 3 and 4 of flip-flop 387 are connected to ground.

Transistor 383 has its base connected through a resistor 382a to ground, its emitter e connected directly to ground and its collector c connected through connection point 3 to the Multiplier Clock circuit 257 for purposes of initiating the multiplication operation as will be explained.

The Box-In signal coupled to connection point 1 causes transistor 371 to be turned ON. A low potential will thus be coupled from the collector c of transistor 371 through lines 375 and 375A to connection point 1 of flip-flop 386 and to connection point 6 of flip-flop 387 to preset the flip-flops to a count of three.

Accordingly, the next pulse received, that is, the first length pulse received on input connection point 2 from the pulse forming means 22A and the length pulse 22 after a box enters the plane of the light array, is coupled through resistor 378 and pulse shaping network 379 to momentarily turn transistor 380 ON. A low potential will thus be provided at the collector c of transistor 380 to activate or cause flip-flop 386 to couple an output pulse to flip-flop 387 which in turn couples an output pulse to turn transistor 383 ON and permit current to flow therethrough to energize the Multiplier Clock circuit 259 as will be described. Flip-flops 386 and 387 will then continue to receive and in effect count and divide the input pulses by fours as is well known in the art and flip-flop 387 will couple output pulses to transistor 383 upon receipt of each group of four input pulses from the length pulser 22.

The decade counters 260A and 260B, which may be of any suitable known type such as for example, similar to the counter of FIG. 20 receive and count the pulses from flip-flop 387 and provide an indication of the total length of a box. A reset signal for the counters 260A and 260B is provided by the Box-In block 259, see FIG. 18, from connection point 4 of block 259 to connection point 4 of each of the counters 260A and 260B to reset the counters when a new or succeeding box enters the light array.

MULTIPLIER CLOCK

The Multiplier Clock 257 or transfer control register of FIG. 18 commutates or steps the multiplying operation of the multiplying circuit 258 from one selected grouping of input data to multiply succeeding selected groupings of input data; that is, the Multiplier Clock 257 programs the multiplications operation. The Multiplier Clock comprises a plurality of silicon controlled rectifiers (abbreviated hereinafter as SCR) and the associated circuitry of FIG. 25.

For purposes of describing the invention, assume that the multiplication is to be performed of two numbers each comprising two digits, for example, 37×40. Generally, the numbers to be multiplied are indicated as (A2, A1)×(B2, B1), where A2 and A1 are the tens and units factors, respectively, in the multiplicand, and B2 and B1 are the tens and units factors, respectively, in the multiplier. Mathematically, the multiplication of the terms (A2, A1)×(B2, B1 can be expressed as follows:

$$(A2, A1)(B2, B1) = (A1 \times B1) + (A2 \times 10 \times B1) + (A1 \times 10 \times B2) + (A2 \times 10 \times B2 \times 10) \quad (1)$$

The Multiplying Clock 257 is programmed to enable the first two selected factors A1, B1 to be multiplied, and when that multiplication is completed a signal is provided to step the Multiplying Clock to enable the next two factors A2, B1 to be multiplied. This operation will continue until the complete multiplication of all the digits is performed.

It should be understood that other groupings of A2, A1 and B2, B1 can be utilized to obtain a product; however, the grouping and sequencing indicated above has been found to be quite satisfactory.

The Multiplier Clock 257 includes a plurality of stages comprising SCRs and associated circuitry as shown in FIG. 24. The first SCR 413 in the Multiplier Clock has its anode a connected to the B+ line, its cathode c connected through a resistor 425 to ground reference and its gate electrode g connected to one terminal of the secondary winding W2 of a transformer 424. The cathode c of SCR 413 is also connected through connection point 6 to connection point 4 of the multiplication circuit 258 (see FIG. 18) for purposes to be described. The other terminal of winding W2 is connected to the cathode c of SCR 413; winding W2 is thus connected across the gate to cathode electrodes of SCR 413. A resistor 426 is connected in parallel with winding W2, as is known in the art.

The cathode c of SCR 413 is connected in common to the anodes of a bank of diodes 430, 431 and 432. The cathode of each of diodes 430, 431 and 432 is connected to different portions of the circuit, as will be described hereinbelow.

The cathode of SCR 413 is also connected through a series circuit including resistor 436, a diode 437 and a capacitor 438 to the cathode of the succeeding SCR (SCR 414) in the Multiplier Clock. A resistor 439 is connected in parallel with resistor 436 and diode 437, for purposes which will become clear hereinbelow.

The cathode c of SCR 413 is further connected to a lead 440 as an input to the Rest Control SCR 417, FIG. 1B, as will also be described hereinbelow.

The associated circuitry of the SCR's 414–416 in the Multiplier Clock is essentially identical to the circuitry of SCR 413 with the exception that SCR's 414, 415, and 416 do not have a lead similar to 440 which connects SCR 413 to SCR 417.

Note that SCR 414 is connected to connection points 2 and 3 of FIG. 25, also labeled A2 and B1; SCR 415 in turn is connected to connection points 1 and 4 of FIG. 25, also labeled A1 and B2; and SCR 416 is connected to connection points 2 and 4 of FIG. 25, also labeled A2 and B2. Connection points 1 and 2 of the Multiplier Clock 257 (FIG. 25) are respectively connected to connection points 10 and 11 of the Height Multiplier Input 255 (FIG. 18) as the A1 and A2 control signals and connection points 3 and 4 of the Multiplier Clock are connected to connection points 10 and 11 of the Width Multiplier Block 256 as the B1 and B2 control signals for purposes which will be described.

Accordingly, the multiplication operation is programmed or controlled by the stepping or commutating of the Multiplier Clock. The factors or digits that are multiplied during the period a particular SCR is conducting is indicated in FIG. 25 alongside each of SCR's 413–416.

It should be appreciated at the outset that any number of SCR's can be connected similarly as the SCR's in FIG. 25 to function in the Multiplier Clock, the number of SCR's employed being dependent on the groupings of the factors to be multiplied.

Refer again to SCR 413 and the associated bank of diodes 430, 431 and 432 which have a common anode connection and which have their cathodes connected to separate circuits as follows. Diode 430 is connected through the output lead 461 and connection point 1 also labeled A1 to connection point 10 of the Height Multiplier Input circuit 255, see FIGS. 18 and 19. Diode 431 is connected through connection point 3 and the line labeled B1 to connection point 10 of the Width Multiplier Input circuit 256, see FIGS. 18 and 21. The cathode of diode 432 is connected through a Zener diode 433, the primary winding W1 of a transformer T10, and connection point 5 of FIG. 25 to connection point 5 of the Multiplier circuit 258, see FIGS. 18 and 24, for purposes to be described. A resistor 495 and a variable resistor 496 connected in series with one another are connected in parallel with Zener diode 433 and winding W1 of transformer T10. The Zener diode 433 and resistors 495 and 496 function to limit the voltage effective across winding W1 of transformer T10, as will become clear.

REST CONTROL

The circuit of the Rest or Rest Control SCR 417 is similar to the circuit of SCR 413 and includes additional circuitry as will be described. The SCR 417 and the associated circuitry comprise a Rest Control for the circuit of FIG. 25. The SCR 417 is arranged to be energized after a given multiplication operation is completed at which time the Multiplier Clock 257 and the Multiplier circuit 258 are in condition for accepting additional data for initiating succeeding multiplication operations; i.e., the foregoing circuits are at rest and in conditon to start the next operaton.

The circuit of SCR 417 is similar to the circuits of 413 (and the other SCR's 414–416) with the exception that the cathode c of SCR 417 is not connected to a bank of diodes; and, in addition, the circuit of SCR 417 includes an associated NPN transistor 450 and a Zener diode 451 which functions to initially turn SCR 417 ON as will now be described.

A capacitor 455 is connected to SCR 417 similarly to the manner in which capacitor 438 is connected to SCR 413. Thus, capacitor 455 completes an electrical loop for the Multiplier Clock 257 through line 440 to the cathode c of SCR 413. The capacitor 455 functions similarly as capacitor 438 in a manner to be described.

The transistor 450 comprises an emitter e, a base b and a collector c. The emitter e of transistor 450 is connected through a Zener diode 451 to the B+ line. As is known in the art, the cathode of the Zener diode 451 is connected to the B+ line and its anode is connected to the emitter e of transistor 450 to effect a voltage limiting function. The emitter e of transistor 450 is also connected through resistor 453 to ground reference. The base b of transistor 450 is also connected to the cathode of a diode 456 whose anode is connected to the cathode c of SCR 417. The base b of transistor 450 is further connected to the cathodes of diodes 457 and 458 whose anodes are connected to respective leads B1 and B2 for purposes to be described. The collector c of transistor 450 is connected to the anode of diode 454 whose cathode is connected to the gate electrode g of SCR 417. The base b of transistor 450 is further connected through resistor 453A to ground reference.

The operation of the Rest Control circuit is as follows. When the X+ potential is applied, the Zener diode 451 breaks down and conducts. When the Zener diode 451 conducts, transistor 450 which was previously turned OFF will be biased to conduct. Emitter to collector current will flow in transistor 450 through the diode 454, and the gate g to cathode c electrodes of SCR 417, and cause SCR 417 to turn ON. When this occurs, the potential at the cathode c of SCR 417 will rise to a high level and this high potential will be coupled through diode 456 to base b of transistor 450 to turn transistor 450 OFF. The Multiplier Clock of FIG. 25 will now be in a condition to initiate a multiplication operation with SCR 417 turned ON and the other SCR's 413–416 turned OFF.

Transistor 450 and Zener diode 451 have no function in the circuit other than to initially turn SCR 417 ON. Transistor 450 is maintained in an OFF condition either by the potential applied through cathode c of SCR 417, or by the potential applied through the diodes 457 and 458 from leads labeled B1 and B2 in FIG. 25, respectively, as will become clear from the following description.

COMMUTATING OR STEPPING OPERATION

The commutating or stepping operation of the Multiplier Clock of FIG. 25 will now be explained. As mentioned, whenever the circuit of FIG. 25 is initially energized the Rest SCR 417 is turned ON. Also, the Rest Control SCR 417 will be turned ON at the end of each multiplication operation and will remain ON until the initiation of the succeeding multiplication operaton. Note that when SCR 417 is conducting its cathode c is at approximately B+ potential and capacitor 455 will be charged through resistor 455A to have approximately B+ potential on its lefthand plate, as oriented in FIG. 25.

As previously mentioned, when the Length Counter 260 registers a count, see FIG. 22, transistor 383 is ON and connection point 3 of Length Counter 260 is, in effect, connected to ground. Connection point 3 of the Length Counter 260 is connected to connection point 10 of the Multiplier Clock 258, see also FIG. 25. Thus, when Length Counter 260 registers a count and transistor 383 is ON a current will be caused to flow from the +4.5 v. potential of FIG. 25 through resistor 425A, the primary winding W1 of transformer 424, connection point 10 of FIG. 25, to connection point 3 of the Length Counter 260 (FIG. 22) and thence through transistor 383 to ground reference. The initiation of current flow through winding W1 will cause a potential to be developed which is inductively coupled to winding W2 of transformer 424 and thence to the gate electrode g of SCR 413 to cause a current flow in the gate g to cathode c circuit of SCR 413 to turn SCR 413 ON.

When SCR 413 is turned ON its cathode c rises to approximately B+ potential and this B+ potential is coupled through lead 440 to capacitor 455 of SCR 417. Since the charge across capacitor 455 cannot change instantaneously, the momentary voltage on the anode of diode 455B will be approximately double the B+ potential. This high potential on the anode of 455B is coupled through the diode and resistor 455C to the cathode of SCR 417, tending to cause a momentary reverse current to flow in SCR 417, turning SCR 417 OFF.

Thus, upon receipt of a length count pulse SCR 413 is turned ON and all the other SCR's in the Multiplex Clock of FIG. 25 are turned OFF. Note that capacitor 438 will be charged to essentially B+ potential through resistor 439, similarly as directed above in connection with SCR 417 and capacitor 455.

When SCR 413 is turned ON a potential will be applied from the B+ potential line through SCR 413 and diode 430 to energize the line labeled A1 and connection point 1 which is connected to the connection point 10 of the Height Multiplier Input block 255, see also FIG. 19, to enable the operation of the units portion of the circuit of FIG. 19.

Concurrently, the conducting SCR 413 will couple a potential through diode 431 to the line labeled B1 and connection point 3 to the Width Multiplier Input circuit, block 256, see also FIG. 22, to enable the operation of the units portion of the circuit of FIG. 22. Accordingly, the multiplication of the factor A1, B1 will take place as will be described more fully hereinbelow.

When the multiplication of factor A1, B1 is completed, the unijunction transistor 510 of the Multiplier block 258, see FIG. 24, will be caused to fire; that is, conduct as is explained herein elsewhere. Accordingly, a current will flow through the path which may be traced from the B+ potential, SCR 413, diode 432, Zener diode 433, winding W1 of transformer T10, connection point 5, connection point 5 of FIG. 24, the conducting unijunction transistor 510 and resistor 512 to ground. The initiation of a flow of current through winding W1 of transformer T10 will induce a voltage which is coupled to winding W2 of transformer T10 which in turn will trigger SCR 414 ON in a manner similar to that discussed in the operation of SCR 413.

When SCR 414 starts to conduct, its cathode rises to a high potential and this high potential is coupled to the left-hand plate of capacitor 438. Since capacitor 438 has been previously charged to approximately B+ potential and since it cannot discharge instantaneously, the charge at the anode of diode 437 will momentarily be twice the B+ potential. This high potential is applied to the cathode of SCR 413 to cause SCR 413 to turn OFF in the same manner as described in connection with the operation of SCR 417.

At this point SCR 414 is turned ON and all the other SCR's in the Multiplier Clock of FIG. 25 are turned OFF. In this state, the factors A2 and B1 will be multiplied. Note that SCR 414 couples an A2 control signal through diode 430A to the line labeled A2 and connection point 2, and thence to connection point 11 of the Height Multiplier Input of FIG. 19 to enable the tens portion of the circuit of FIG. 19 to operate.

When the multiplication of A2, B1 is completed transformer T11 will be energized in the same manner as explained above in connection with SCR 413 and transformer T10. SCR 415 is accordingly turned ON and SCR 414 is turned OFF; and, the factors A1, B2 are multiplied. When the multiplication of A1, B2 is completed transformer T12 is energized which causes SCR 416 to turn ON which turns SCR 415 OFF.

When SCR 416 is ON the multiplication of factors A2, B2 is performed and when this latter multiplication is completed, transformer T13 will be energized to cause SCR 417 to turn ON which causes SCR 416 to turn OFF.

SCR 417 remains in its ON state until the next signal is received from the Length Counter 260. A signal from the Length Counter turns SCR 413 ON and initiates the next multiplication operation.

A complete multiplication operation by the Multiplier of FIG. 24, and including the stepping operation of the Multiplier Clock 257 and FIG. 25 requires approximately 25 milliseconds. The Length Pulser of FIG. 1 is arranged to provide a pulse approximately every 11.6 milliseconds; however, the pulses are, in effect, divided by four by Length Counter flip-flops of FIG. 22 to provide a length counting pulse signal every 46.4 milliseconds to the Multiplied Clock 257 and FIG. 25. Accordingly, a complete multiplication operation can be completed by the Multiplier 258 upon receipt of a signal from the Length Counter, and before a succeeding signal is provided by the Length Counter.

In this particular embodiment, the conveyor speed is sixty feet per minute; for speeds other than sixty feet per minute the frequency of the pulses would be proportional to the speed.

MULTIPLYING CIRCUIT

The operation of the Multiplier circuit of FIG. 24 indicated as block 258 of FIG. 18 is fully disclosed in the copending application of Robert M. Henderson and Richard Zechlin, Ser. No. 570,909, filed on Aug. 8, 1966, assigned to the same assignee as the present invention.

For purposes of a brief general explanation of the multiplying circuit of Multiplier of FIG. 24, assume that the emitter $e$ of the unijunction transistor 510 is connected through a variable capacitor K1 to ground reference, and through a resistor K2 to a source of positive potential. Assume the base $b2$ of unijunction transistor 510 is connected through appropriate resistors to a source of potential and provides an output signal through lead K3. The base $b1$ of unijunction transistor 510 is connected through a resistor 512 to ground reference.

For purposes of this explanation, further assume the circuitry of unijunction transistor 511 is as follows. The base $b1$ is connected to ground reference and base $b2$ is connected through appropriate resistors to a source of potential and provides an output through lead K5. The emitter $e$ of unijunction transistor 511 is connected through a capacitor 514 to ground reference; and, the capacitor 514 is connected in series with a variable resistor K4 to a positive potential. Note that the connections indicated as K1–K5 and shown by dotted lines are all assumed connections merely included herein for purposes of clarity and brevity in this explanation.

The unijunction transistor 510 provides a time base for the circuit consisting of one or more selected unit values of time; and, the unijunction transistor 511 provides a pulse output indicative of the number of times transistor 511 fires during a time base provided by transistor 510. Assume that in this example, for a unit value of time provided by unijunction transistor 510, the count unijunction transistor 511 will provide up to nine pulses.

Assume next that the capacitor K1 is adjusted such that it takes one unit value of time to charge capacitor K1 through resistor K2 to the avalanche point of unijunction transistor 510. When unijunction transistor 510 avalanches, K1 will discharge through the emitter $e$ to base $b1$ circuit of unijunction transistor 510 and an output will be obtained at output lead K3. It is assumed that the output at K3 is suitably connected to terminate a given multiplication operation.

Concurrently, as the capacitor K1 is being charged, the count capacitor 514 is also being charged through the associated resistor K4. The setting of K4 will determine the length of time it takes capacitor 514 to be charged to the avalanche point of unijunction transistor 511. When unijunction transistor 511 fires and conducts, capacitor 514 discharges through the emitter $e$ to those $b1$ of unijunction transistor 511. The unijunction transistor 511 will thus provide an output pulse at its base $b2$. Thus, it can be seen that if the capacitor K1 is arranged to provide a time value or base of one, and the resistor K4 is arranged to permit capacitor 514 to charge to the avalanche point of unijunction transistor 511 twice per unit length of time, then the unijunction transistor 511 will provide a total of two output pulses on lead K5 during this multiplication operation.

If the time capacitor K1 is varied to provide a time base of nine, representative of an input factor of nine, and K4 associated with the count capacitor 514 is varied to permit capacitor 514 to charge to the avalanche point of unijunction transistor 511 six times during each unit length of time; i.e., to be representative of an input factor of six, then during nine length units of time, unijunction transistor 511 will provide 9×6 or a total of 54 output pulses at lead K5 during the given time base. Thus, in the example, the output from the count unijunction transistor 511 can be considered as a multiplication representative of the respective factors inserted as capacitive values K1 and resistive values K4.

The multiplying circuit of FIG. 24 includes circuitry for synchronizing the multiplying operation, and hence the charging and discharging cycle of capacitors 514 and the capacitors associated with unijunction transistor 510, as will be explained.

The circuit of FIG. 24 includes a monostable multivibrator (flip-flop) circuit 592 of a type well known in the art, and including NPN transistors 585 and 586; a synchronizing unijunction transistor 587, and an NPN transistor 588. Transistors 585, 586 and 588 each have the usual emitter $e$, collector $c$ and base $b$ electrodes. The unijunction transistor 587 includes the usual emitter $e$ and two base electrodes $b1$ and $b2$. The emitter $e$ of unijunction transistor 510 is connected through resistors 502 and 501 and lead 520 to the cathodes of a bank of four diodes generally labeled 522. The anodes of diodes 522 are respectively connected through connection points 4, 3, 2 and 1 to connection points 6, 7, 8 and 9 of the multiplier Clock 257 (see also FIG. 18) for purposes to be described. The base $b1$ of unijunction transistor 510 is connected through a resistor 590 to the base $b$ of transistor 585, and the base $b1$ of unijunction transistor 510 is also connected through resistor 512 to ground reference.

The base $b$ of transistor 585 is connected through a resistor 594 and a capacitor 593 to the collector $c$ of transistor 586. The emitter $e$ of transistor 586 is connected directly to ground. The collector $c$ of transistor 585 is als connected through a resistor 599 to base $b$ of the second transistor 586 of the monostable flip-flop circuit 592. The base $b$ of transistor 586 is further connected through bias resistor 599A to ground. The emitter $e$ of transistor 586 is connected to ground and its collector $c$ is also connected through a resistor 528 to the B+ line.

The collector c of transistor 585 is further connected to a junction or control terminal point 601 for purposes to be described, and thence through a resistor 528A to the B+ potential line. Terminal 601 is connected to the cathode of a diode 602 whose anode is connected through connection point 8 and connection point 13 to the capacitors of the Width Multiplier Input block 258 in FIG. 18, see also FIG. 22, associated with unijunction transistor 510, as will be explained. Terminal 601 is also connected through diode 602 to the emitter e of unijunction transistor 510. Terminal point 601 is further connected to the cathode of a diode 604 whose anode is connected through lines or leads 505 and 505A to the emitter e of unijunction transistor 511. Terminal 601 is further connected to the cathode of a diode 508 whose anode is connected to the emitter e of a unijunction transistor 587 which is connected through a capacitor 513 to ground and through series resistors 514A and 519B to B+ line. A resistor 503 is connected in parallel with capacitor 513 to permit fine adjustment of the timing cycle of unijunction transistor 587. The base b2 of unijunction transistor 587 is connected through a resistor 519 to B+ line, and the base b1 of unijunction transistor 587 is connected through a resistor 515 to ground.

The base b1 of unijunction transistor 587 is connected to the anode of a diode 530 whose cathode is connected to the base b of the transistor 588 to couple a signal thereto. The base b of transistor 588 is connected through resistor 516 to ground. The base b of transistor 588 is also connected through resistor 517, lead 551 and connection point 7 to connection point 12, and the Zero Control portion of the Width Input circuit 256 of FIG. 18 (see also FIG. 22), for purposes to be described. As will be described fully herein, energization of the lead 551 causes transistor 588 to conduct and disables or prevents the capacitor 514 from charging, to effectively multiply by zero.

The emitter e of transistor 588 is connected through diode 517A to ground. The collector c of transistor 588 is connected to the cathode of a diode 518 whose anode is connected through resistor 518A and connection point 5 to connection point 5 of the Multiplier Clock circuit 257, see also FIG. 25, for purposes to be described. The emitter e of transistor 588 is also connected through a resistor 517B to the B+ potential line. The collector c of transistor 588 is connected to the cathode of a diode 523 whose anode is connected to the emitter e of unijunction transistor 511 and to the upper plate, as oriented in FIG. 24, of the count capacitor 514. The lower plate of capacitor 514 is connected to ground. The base b1 of unijunction transistor 511 is connected to ground, and its base b2 is connected through line or lead 521 to each of the cathodes of diodes 596A, 596B and 596C. The anodes of diodes 596A, 596B and 596C are respectively connected through output connection points 9, 10 and 11 to input connection point 1 of each of counters 263 and 264 and 265 (see FIGS. 18 and 20) for providing pulses to said counters, as will be explained.

The anode of diode 596A is also connected through a circuit including a variable resistor 540 and a resistor 541 to the cathode of a diode 542 whose anode is connected through connection point 4 of FIG. 24 to connection point 6 of the Multiplier Clock 257 (see also FIG. 18). The anode of diode 542 is also connected to the anode of diode 522 and the cathode of diode 522A is connected to lead 520.

The anode of diode 596B is connected through a variable resistor 543 and a resistor 544 and to the cathode of a diode 545 whose anode is connected through connection point 3 to connection point 7 of the Multiplier Clock 257.

The anode of diode 596B is also connected through a variable resistor 546 and a resistor 547, to the cathode of a diode 548 whose anode is connected through connection point 2 to connection point 8 of the Multiplier Clock 257 (see also FIG. 18).

The anode of diode 596C is connected through a variable resistor 549 and a resistor 550 to the cathode of diode 551 whose anode is connected through connection point 1 to connection point 9 of the Multiplier Clock 257 (see FIG. 18). Each of diodes 545, 548 and 551 has its anode connected to the anode of a respective one of diodes 522. And, the cathodes of diodes 522 are connected in common through line 520, resistor 501 and variable resistor 502 to connection point 8.

OPERATION OF SYNCHRONIZING PORTION OF MULTIPLIER

The monostable flip-flop circuit 592 of FIG. 24 including transistors 585 and 586 provides a time delay between one multiplication and a succeeding multiplication so that a multiplication will not be initiated until the preceding multiplication is fully terminated. This is necessary since there is a measurable time required to permit the commutation or stepping of the Multiplier Clock 257. The synchronizing circuit, including unijunction transistor 587, assures that the capacitors 514, 332 and 350 in the Width Input circuit (FIG. 21) are sufficiently discharged before each multiplication is initiated and provides the basic unit value of time in the circuit as will now be explained.

As mentioned, the monostable flip-flop 592 does not permit the next operation to proceed until a preset time elapses. When unijunction transistor 510 fires indicating the termination of a given time period, a positive potential is applied to the base b of transistor 585 of monostable multivibrator 592 turning transistor 585 ON, thus causing its collector c and terminal point 601 to drop to essentially ground potential. Time capacitors 332 and 350 (FIG. 21); the count capacitor 514 (FIG. 24); and, the synchronizing capacitor 513 (FIG. 24), are all connected through respective diodes 602, 604 and 508 to terminal point 601. Accordingly, the just mentioned capacitors cannot charge until transistor 585 is turned OFF which occurs when monostable multivibrator 592 returns to its stable position; that is, with transistor 585 OFF and transistor 586 ON. As is known, the size of capacitor 593 and its charging rate determine the time delay; that is, the time required by monostable multivibrator 592 to return from its unstable to its stable condition.

When transistor 585 turns OFF, capacitors 332 and 350 (FIG. 21), and capacitor 514 start to charge toward the avalanche point of the unijunction transistors 510 and 511, respectively, to provide the time and count parameters for the circuit as described above. Also, when transistor 585 turns OFF, capacitor 513 starts to charge to the avalanche point of unijunction transistor 587. Capacitor 513 and the associated circuitry, including resistor 514A, is precisely adjusted such that unijunction transistor 587 is caused to fire each selected unit value of time. Each time unijunction transistor 587 fires, a pulse is provided from the base b1 through diode 530 to the base b of transistor 588 to cause transistor 588 to turn ON. When transistor 588 turns ON a discharge path for capacitor 514 is provided from the upper plate of capacitor 514, through diode 523, the conducting transistor 588 and diode 517A to ground. Thus, at the termination of each selected or basic unit value of time, capacitor 514 is fully discharged. Unijunction transistor 587 continues to charge and discharge once for each basic unit value of time for the circuit.

Accordingly, the parameters of capacitor 513, resistors 503, 514A and 519B, and the unijunction transistor 587 (and the potentials applied thereto) are selected and/or adjusted to provide the length of the basic unit value of time for the Multiplier circuit.

The circuit is thus arranged so that capacitor 514 will start charging; that is, registering the input pulses from the same initial level at the start of each basic unit value of time. Capacitor 514, the count capacitor, charges and discharges once to represent a count in response to a signal applied thereto. Thus, capacitor 514 can charge and discharge one or more times during each unit value of time.

OPERATION OF THE MULTIPLIER CLOCK AND MULTIPLIER INPUTS

The operation of the Multiplier circuit 258 in conjunction with the Multiplier Clock 257 and the Height and Width Multiplier Input circuits 255 and 256 of FIG. 18 will now be described.

Assume for purposes of this explanation that the Height Quantizers and Summers of FIG. 11 provide an output indicating a factor 37, and the Width Quantizers and Summers provide an output indicating a factor of 40 which are to be multiplied. Accordingly, the operation can be considered as $(A2A1) \times (B2B1)$ where $A2=3$, $A1=7$, $B2=4$, and $B1=0$. Upon receipt of a signal from the Length Counter 260, representing an increment of length as previously explained, the multiplication of the factors $37 \times 40$ will be performed.

When the signal from the Length Counter 260 is applied to the Multiplier Clock 257, see FIG. 25, SCR 413 will be turned ON, causing SCR 417 to turn OFF. Hence, the SCRs 414–417 will be turned OFF. With SCR 413 ON the lines labeled A1 and B1 will have a high potential applied thereto. Connection point 1 of FIG. 25 and line A1 will couple this high potential to connection point 10 of the Height Multiplier Input circuit, see FIG. 19, causing transistor 301 of FIG. 19 to turn ON. When transistor 301 turns ON transistor 302 is turned OFF, and ground potential is removed from the diodes 310.

The code representing the height factor 37 will be present at input connection points 1–9 of FIG. 19. A digit 7 is indicated, as shown in the afore-listed code, by a high potential at connection points 1, 2, 3, 4 and 6; that is 1/2D, 1/2C, 1/2B, 1/2A+10/2=7 to back-bias the associated diodes 312. Similarly, a digit 3 is indicated by a high potential at connection points 7 and 8; that is, 1+2=3. Likewise, an input representing the width factor 40 is indicated in FIG. 21 as follows. A zero in the units position is indicated by a low potential on all of the input connection points 1–6, and a 4 input in the tens position is indicated by a high potential at connection point 9.

Accordingly, when the A1 control signal is applied, a current will be caused to flow through resistors 311A, 311B, 311C, 311D and 311F through the associated diodes 310 and diode 319A through connection point 12 to connection point 6 of the Multiplier circuit 258 (FIG. 24). The current flowing through the aforementioned resistors will charge the capacitor 514 in the Multiplier circuit of FIG. 24 at a rate representative of a 7 input.

Concurrently, as the A1 control signal is being applied, a high potential will also be applied through SCR 413 (FIG. 25), diode 431 to the line labeled B1, connection point 3, and thence to connection point 10 of the Width Multiplier Input circuit 256, see also FIG. 21. When a high potential indicative of the control signal B1 is applied to connection point 10 of FIG. 21, transistor 320 will be turned ON and transistor 325 will be turned OFF thereby removing ground potential from the cathodes of each of diodes 327. However, since each of the connection points 1–7 associated with the units position in FIG. 21 is at low potential representing a zero digit input, the current from the B+ line in FIG. 21 will flow through resistors 328 and through diodes 338 to ground reference and no current will flow through diode 329.

Accordingly, transistor 360 in the Zero Control circuit will be cut OFF. When transistor 360 is OFF, its collector c will be at a high potential and transistor 366 is caused to turn ON. The high potential at the collector c of transistor 360 and hence at connection point 12 is coupled through connection point 7 of the Multiplier 258 (FIG. 24), line 551, resistor 517 to bias transistor 588 to conduct. When transistor 588 conducts it prevents capacitor 514 from charging regardless of the input at connection point 6 received from the Height Multiplier Input block 255 (FIG. 19). Hence, a zero input to the Width Multiplier circuit results in no output pulses from count unijunction transistor 511.

When transistor 366 turns ON a current path will be established for charging capacitor 367 (FIG. 21) which may be traced from the B+ potential line of FIG. 25 through conducting SCR 413 through connection point 6 of FIG. 25 to connection point 4 of the Multiplier circuit of FIG. 24, through diode 522A, line 520, resistor 501, variable resistor 502, connection point 8 in FIG. 24, connection point 13 of FIG. 21 through capacitor 367 and the conducting transistor 366 to ground. Capacitor 367 is a relatively small capacitor, hence it will charge at a relatively rapid rate through the aforementioned current path.

Note that connection point 13 in FIG. 21 is connected through connection point 8 of FIG. 24 to the emitter e of unijunction transistor 510. Thus, when capacitor 367 charges to the avalanche point of unijunction transistor 510, unijunction transistor 510 will fire and establish a current path from the B+ potential line in FIG. 25 through SCR 413, diode 432, Zener diode 433, primary winding W1 of transformer T10, connection point 5 of FIG. 25, to connection point 5 of FIG. 24, and through the conducting unijunction transistor 510 and resistor 512 to ground. Thus, when unijunction transistor 510 fires, it will cause primary winding W1 of transformer T10 to be energized and thereby cause a potential to be induced in winding W2 which triggers SCR 414 ON.

As previously described, when SCR 414 turns ON it will turn SCR 413 OFF. Thus, in this example, a multiplication by zero results merely in the stepping of the Multiplier Clock 257 to its next multiplying position wherein the factors A2 and B1 are multiplied.

The operation of SCR 414 results in a multiplication of $A2 \times B1$. Since the factor $B1=0$, accordingly, the same operation as before will take place with the exception that at this point the A2 line in FIG. 25 will have a high potential applied thereto which will permit the tens portion of the Height Multiplier Input circuit of FIG. 19 to accept input data. However, an input of zero (0) to the Width Multiplier circuit of FIG. 21 will give a zero count output as previously explained. As before, capacitor 367 will be charged to cause time unijunction transistor 510 to fire which, in turn, will energize transformer T11 to trigger SCR 415 ON which causes SCR 414 to be turned OFF.

With SCR 415 ON, the factors $A1=7$ and $B2=4$ will now be multiplied. The A1 control signal from SCR 415 is applied to FIG. 19 as previously explained causing transistor 301 to turn ON and transistor 302 to turn OFF. Ground reference will thus be removed or disconnected from diodes 310 permitting a current to flow from the B+ potential line of FIG. 19 through resistors 311A, 311B, 311C, 311D and 311F and the respective diodes 310, and through diode 319A to connection point 12 and thence to connection point 6 of the Multiplier 258 (FIG. 24) to charge capacitor 514 at a rate representative of the digit 7. Capacitor 514 will thus charge to the avalanche point of unijunction transistor 511 a total of seven times during each basic unit value of time.

Each time unijunction transistor 511 fires, a current path will be established through SCR 415, through connection point 8 of FIG. 25 (block 257), connection point 2 of FIG. 24, diode 548, resistor 547, variable resistor 546, diode 596B, line 521 and the conducting unijunction transistor 511 to ground. A potential change will thus be effected at the junction of variable resistor 543 and diode 596B which is coupled through connection point 10 of FIG. 24 as an input pulse to the tens (10's) position counter 264 of the Counter 262, see FIG. 18.

Concurrently, the high potential B2 control signal is applied through SCR 415, through the line labeled B2 and connection point 4 of FIG. 25 to connection point 11 of the Width Multiplier Input circuit of FIG. 21.

Accordingly, transistor 340 will be turned ON and transistor 345 will be turned OFF to remove or disconnect ground from the cathodes of diodes 347 thus permitting a current to flow from the B+ line of FIG. 21 through resistor 348C, 352C and 354C to bias transistor 351C to conduct. When transistor 351C conducts, a charging path is established for capacitor 350C from the B+ potential line of FIG. 25, SCR 415, connection point 8 of FIG. 24, thence to connection point 2 of FIG. 24, through diode 522C, line 520, resistor 501, variable resistor 502, connection point 8 of FIG. 24, thence to connection point 13 of FIG. 21, line 334, capacitor 350C and conducting transistor 351C to ground. Capacitor 350C has a capacitance value weighted to provide a time base of 4; that is, it will charge to the avalanche point of transistor 510 in four basic unit values of time.

When capacitors 350C reach the avalanche point of unijunction transistor 510, unijunction transistor 510 will fire and permit a current to flow through the conducting SCR 415 and primary winding of transformer T12 which, in turn, will turn ON SCR 416 and turn SCR 415 OFF. At this point, unijunction transistor 510 will have fired a total of 4×7 or 28 times to provide 28 pulses to the Counter 262 through the circuit traced above. Next, the A2=3 and B2=4 factors will now be multiplied.

The operation of the multiplication of 3 and 4 can be appreciated from the previously described multiplication of the other factors; hence, the circuit paths will not be retraced. Note, however, that the output representative of A2, B2 is coupled from connection point 11 of FIG. 24 to the hundreds (100's) position counter 265 of Counter 262.

When the unijunction transistor 510 next fires, indicating the termination of the time base provided by the factor B2, transformer T13 will be energized causing the Rest Control SCR 417 to turn ON and thereby turn SCR 416 OFF.

At this point, the multiplication operation of factors 37×40 will be completed and the circuit is in condition for receiving a succeeding length pulse to initiate the multiplication of succeeding height and width factors.

As previously mentioned, the Counter 262 sums the number of pulses resulting from the multiplication operations.

Assuming the foregoing box being measured is rectangular in shape and is three feet in length, a total of sixty-four multiplication operations of 37×40 will be performed; that is $$\frac{3\text{ feet}}{.0464} \text{ (length counter pulses)} \cong 64$$

Since the number of pulses obtained from each multiplication operation is summed by the counter, the total number of pulses provided by the sixty-four multiplication operations give a measure of the volume of the box. Note, of course, that the box may be of any shape, and the summed pulses will still give a measure of the volume of the box.

PRINT COMMAND

The Print Command circuit, block 261 (FIGS. 18 and 27), as the name implies controls the operation of the Printer 269. The Print Command circuit comprises a pair of transistors 600 and 611 each having a base $b$, an emitter $e$ and collector $c$ electrodes. The base $b$ of transistor 600 is connected to the anode of a diode 612 having its cathode connected to the right-hand plate, as oriented in FIG. 27, of a capacitor 603. The left-hand plate of capacitor 603 is connected through connection point 1 in FIG. 27 to connection point 5 in the Box-In block 259 of FIG. 18, see also FIG. 23. The cathode of diode 612 is also connected through a resistor 614 to the collector $c$ of transistor 600. The base $b$ of transistor 600 is also connected through resistor 606A to the −10-volt potential and through another resistor 606 to the collector $c$ of transistor 611. The emitter $e$ of transistor 600 is connected to ground, and the collector $c$ is connected through a load resistor 607 to the B+ potential line. The collector $c$ of transistor 600 is further connected through a resistor 608 and connection point 2 as an input to the printer block 269.

The collector $c$ of transistor 600 is still further connected through capacitor 609 and a resistor 610 to the base $b$ of transistor 611. The base $b$ of transistor 611 is also connected through resistor 610A to the −10-volt potential, and its emitter $e$ is connected to ground. Collector $c$ of transistor 611 is connected through a load resistor 612 to the B+ potential.

In operation, transistor 600 is normally ON and transistor 611 is normally OFF. When a signal is received from the Box-In block 259 that a box is in the field of the light array, capacitor 603 is permitted to charge to have a positive potential on its left-hand plate through the circuit which may be traced from the B+ line through resistor 346 (FIG. 23) and connection point 5 of the Box-In circuit of FIG. 23, connection point 1 of FIG. 27, capacitor 603, resistor 614 and the conducting transistor 600 to ground. Capacitor 603 will remain thus charged as long as a box is in the field of the light array. When the box leaves the field of the light array, the potential applied from the photocell circuits, see FIGS. 4 and 5, to the cathodes of diodes 343 and 344 of the Box-In block 259 (FIG. 23) will go high. Accordingly, transistor 340 of FIG. 23 will be biased to conduct and its collector $c$ will go to a low potential. Capacitor 603 of the Print Command circuit is connected through connection point 1 of block 261 through connection point 5 to the collector $c$ of transistor 340. Accordingly, when the potential at the collector $c$ of transistor 340 goes low, capacitor 603 will now be discharged through a path which may be traced from the left-hand plate of capacitor 603, the collector $c$ to emitter $e$ circuit of transistor 340, and the emitter $e$ to base $b$ path of transistor 600, and diode 612 to the right-hand plate of capacitor 603. When capacitor 603 thus discharges, transistor 600 is turned OFF and the high potential appearing at the collector $c$ of transistor 600 will instantaneously be coupled through resistor 607, capacitor 609 and resistor 610 to the base $b$ of transistor 611 to turn transistor 611 ON. Transistor 611 will remain ON substantially until the capacitor 609 charges to its rated level at which time the biasing potential applied to base $b$ of transistor 611 will go to zero, and transistor 611 will return to its OFF state. When transistor 611 returns to its OFF state, a positive potential will be coupled from the collector $c$ of transistor 611 through resistor 606 to turn transistor 600 ON.

When transistor 600 turns ON a negative going potential or signal will appear at its collector $c$ which is coupled through resistor 608 to connection point 2 to trigger the Printer 269.

There is a measurable time delay required for the coupling capacitor 609 to be charged to cause transistor 611 to turn OFF and transistor 600 to turn ON which thus permits any multiplication in process in the system to be completed before the Print Command circuit of FIG. 27 energizes the Printer to start the printing operation.

COUNTERS

The Counters for counting and summing the pulses from the Multiplier 258 are generally labeled 262 in FIG. 18. Any suitable known type of decade counter can be employed, and a number of commercial units are available. Each of the Decade Counter blocks 263–268 represented in FIG. 18 are similar and operate similarly with the exception that different inputs and outputs may be connected to the counters as indicated in FIG. 18 to obtain an operable system as will now be described.

The details of the circuits of the counter blocks 263–268 of FIG. 18 are shown in FIG. 20. The function of the Decade Counters is to count the input pulses and provide a binary coded decial (BCD) output as labeled in FIG. 20.

The circuit of FIG. 20 includes a pair of NPN transistors 616 and 615. The base *b* of transistor 616 is connected through a resistor 622, a capacitor 621 and connection point 1 and the connection point 9 in the Multiplier circuit 258. As mentioned above, the connections of each of the blocks 263–268 are somewhat different for each of the counters to provide an operable system, as indicated in FIG. 18. The base *b* of transistor 616 is connected through resistor 623 to ground, and its emitter *e* is connected directly to ground. The collector *c* of transistor 616 is connected through a load resistor 625 to the +4.5 potential line, and the collector *c* is also connected to provide an input through connection point 5 to the Decade Counter. The base *b* of transistor 616 is connected to the cathode of a diode 620 whose anode is connected to the collector *c* of transistor 615. The collector *c* of transistor 615 is connected through a load resistor 619 to the +4.5 D.C. potential line, and its emitter *e* is connected to ground. The base *b* of transistor 615 is connected through capacitor 617 and connection point 2 and to connection point 4 of the preceding Decade Counter, as shown in FIG. 18. The function of the input to the connection point 2 in the Decade Counter is to provide a signal indicative of a carry to the next succeeding Decade Counter indicating that the preceding counter has reached a count of ten. Accordingly, in the units decade counter, block 263 in FIG. 18, the connection point 2 is not connected in the circuit.

The input to the Decade Counter 626 is provided to connection point 5. The energizing potential lead is applied to connection point 8 and ground is applied to connection point 9. A reset input to the Counter 626 is obtained from connection point 4 of the Box-In block 259 (see FIG. 18) for purposes of resetting the counter when a box first enters the field of the light array. The outputs from the connection points 7, 6, 5 and 4 provide respective 1, 2, 4 and 8 BCD bits.

The counter is arranged to receive positive going pulses and to indicate an output on a line when that particular line is at low potential. The reset input to the counter resets all the output lines to a high potential.

In operation, the Decade Counter is reset to a zero count whenever a box enters the field of the light array and enables the unit to begin its counting operation. In FIG. 20, the transistor 616 is normally ON, and transistor 615 is normally OFF. A signal applied to connection point 1 from the Multiplier (see FIGS. 18 and 24) will be a negative going signal indicating that the count unijunction transistor 511 has fired. This negative going signal or pulse is coupled to the base *b* of transistor 616 and causes transistor 616 to turn OFF. When transistor 616 turns OFF it will provide a positive input to the Decade Counter; hence, it will count the number of times a negative going input pulse is received at connection point 1 of FIG. 20 and, hence, the number of times that the count unijunction transistor 511 has fired.

The counters 263–268 are arranged to have a capacity of measuring a volume up to 99.9999 cubic feet with the counter block 263 providing the $10^{-4}$ position digit, the counter 264 providing the $10^{-3}$ position digit . . . etc., and counter block 268 providing the $10^{-1}$ position digit.

CARRY OPERATION

The carry operation is as follows: When a counter such as block 263 in FIG. 18 has received ten input pulses, the potential at connection point 4 will go from low to high potential and couple this high potential to connection point 2 to the succeeding counter. For example, block 263 couples a high potential from connection point 4 to connection point 2 of block 264 (see also FIG. 20) through capacitor 617 to the base *b* of transistor 615 to cause transistor 615 to turn ON. When transistor 615 turns ON, the base of transistor 616 normally flowing from +4.5 potential, resistor 619, diode 620, and resistor 623 to ground is shunted to ground and causes transistor 616 to turn OFF, thus coupling a positive pulse to the Decade Counter. Note that in FIG. 18 the Multiplier circuit provides an input only to the units, tens, and hundreds counters labeled 263, 264 and 265, and that the inputs to each of the counters 266, 267 and 268 is the carry output from its preceding counter. The output from the counters 265–268 of FIG. 18 are coupled to suitable Read-Out Amplifiers 271–274, respectively, generally labeled 270.

INTERFACE OR AMPLIFIERS

The purpose of the Interface or Read-Out Amplifier 270 (see also FIG. 26) is to amplify the voltage received from the respective decade counters prior to coupling the voltage to the Printer 269 and Digital Display 278 in FIG. 18.

FIG. 26 shows the circuit details of one of the amplifier blocks 271–274, all of which amplifiers may be similar in construction and operation. The circuit of FIG. 26 includes an NPN transistor 630 having a base *b*, an emitter *e*, and a collector *c* electrodes. The emitter *e* of transistor 630 is connected to ground, and its collector *c* is connected through a load resistor 631 to B+ potential line. An output is also taken from the collector through a resistor 632 to connection point 8 and a line or lead generally labeled 633 as shown in FIG. 18 to the Printer 269 and Digital Display 278. The base *b* of transistor 630 is connected through resistor 634 to the −10-volt line and through another resistor 635 through connection point 4 to connection point 4 of the decade counters as shown in FIG. 18. Note that the line 633 represents a plurality of lines connecting each of the sixteen individual output connection points to the Printer 269 and Digital Display 278.

When it is desired to employ the Interface Memory Read-Out Amplifiers 270 as a storage device or memory, a bistable flip-flop circuit, of any suitable known type and indicated by the dotted block labeled 630A, may be substituted for the transistor 630 and the associated circuitry. As is known, a bistable flip-flop will remain in the state to which it is set and thus store or remember a signal.

PRINTER AND DIGITAL DISPLAY

FIG. 28 shows a typical Printer 269 and Digital Display 278 in the system of the invention. Note that the printer and the display drivers are connected in parallel and hence can be operated independently of one another. The Printer 269 and Digital Display 278 are of any suitable known type and comprise a BCD to decimal decoder to provide a digital output, as is well-known in the art. Note also that the decimal point is shown in FIG. 28 and positioned as described hereinabove. However, since in the particular embodiment used the units and tens position are not used, the decimal point is placed two places to the left of the least order position. In other words, the decimal point is placed in position to indicate a multiplication by $10^{-4}$; however, in the present embodiment it is desired to obtain a measurement of the volume to the closest hundredths of a cubic foot; that is, an accuracy to $10^{-2}$ digit. Accordingly, the digits indicating the $10^{-4}$ and $10^{-3}$ digits in the counters 263 and 264 are not coupled out; however, the decimal point is still located in relatively the same place to indicate a multiplication by $10^{-4}$. As mentioned at the outset, the output from the counters can be utilized directly, or coupled to other suitable data processing equipment such as for combining the information with weight data of the particular box to obtain shipping charges, rates, etc.

DATA PROCESSING OPERATION

The system and its operation has been described in detail, for the purpose of obtaining the actual volume of the box. For various purposes it is also desirable to obtain other parameters or dimensions of an object such as a mailbag, barrel, etc. For example, parameters such as the so-called cubed volume, the maximum height, maximum width, length, actual weight, equivalent weight, etc., might be desirably obtained, and the data then printed out or displayed.

The so-called cubed volume of an article is determined by multiplying the maximum height, maximum width and length of an article. In present airline practice, the shipping charges of an article may be determined by comparing the actual weight of the article as against its equivalent weight; and, the equivalent weight is often obtained by multiplying the cubed volume by a constant. To compare the actual weight and the equivalent weight, the numerical results of each may be printed out and visually compared or the results may be compared electronically. Note that the actual volume multiplied by a selected constant might also be used to obtain the equivalent weight.

Also, it is often desirable to obtain the maximum height, width and length of an article. In the present embodiment of the invention, each of the foregoing dimensional indications obtained by the system must be multiplied by .0464 to provide a measurement in feet.

In FIG. 29, in addition to coupling the output from the Height and Width Quantizers and Summers 19 and 20 to the respective Height and Width Multiplier Input circuits (as shown in FIG. 18), the output from the Height Quantizer and Summer 19 is connected to a Comparing Circuit or Maximizer 800A which functions to store the highest number coupled thereto during a given operation. Likewise, the output from the Width Quantizer and Summer 20 is coupled to a Comparing Circuit 800B. The comparing circuits 800A and 800B are similar to one another and may be of the type disclosed in copending application entitled "Comparing Circuit," Ser. No. 571,- 116, filed on Aug. 8, 1966, of Robert M. Henderson and Richard Zechlin which application is assigned to the same assignee as the present invention. Any suitable known type of comparing circuit capable of comparing and storing the maximum or highest number coupled thereto during a given operation may also be employed.

While the said application Ser. No. 571,116 discloses a comparing circuit for processing four digits, the circuitry in said application can be readily expanded to process the nine inputs provided by the system of the invention. Since the comparing circuits or "Maximizer" in the invention receives a total of nine inputs; i.e., ½ 1/2, 1/2, 1/2, 5/2, 10/2, 20/2, 40/2 and 80/2, from the respective Units-Fives Quantizers and Summers, a total of nine blocks in addition to the Reset and Hold-Out blocks shown in the application are employed (see FIG. 29A).

In the circuit of FIG. 29A, each of the blocks represent blocks similar to those shown in application Ser. No. 571,116. In FIG. 29A, however, the blocks labeled 1/2 receive a number of the same magnitude and hence a comparison between these blocks is not required. Accordingly, the blocks labeled 1/2 have their connection points 3 connected through resistors generally labeled 3A to connection point 2 of the block receiving a 5/2 input. As mentioned above, the digit in the units position is coded or provided by the 1/2, 1/2, 1/2, 1/2, 5/2 and 10/2 inputs and the digit in the tens position is provided by the 20/2, 40/2 and 80/2 inputs. For example, as described above, in the number (26) the 6 in the units position is provided by 1/2, 1/2 and 10/2, and the 2 in the tens position is provided by the 40/2.

Referring to FIG. 29, after the box has passed the light array, it may be moved as by the conveyor onto a weighing platform, indicated by block 801, and the weight of the box is obtained. The circuit used for obtaining weight, indicated by block 802, may be similar to that shown in the Muniz et al. Pat. No. 3,258,764 assigned to the same assignee as the present invention. The output from the circuit of said Pat. No. 3,258,764 provides pulses which are coupled to the counters 262 to provide a numerical result which can be printed or displayed.

In FIG. 29, in order to provide a memory for counters 262, bistable flip-flops 630A (see FIG. 26) are used in the Interface Memory-Read-Out Amplifier circuits 270. As is well known, the bi-stable flip-flops 630A serve as storage devices or memory. Accordingly, data can be processed in the counters 262 and then transferred and stored in Interface or Read-Out Amplifiers 270 and subsequently read out, to free the Counters for receiving additional pulses to be counted.

The operation of the system to obtain the above-mentioned parameters involves essentially a computer type or programmed operation in which a master sequence controller (MSC) 900; that is, a system clock of any suitable known type, is connected to control the operation of each of the individual circuits of the system, see FIG. 29. The MSC causes the system to step through a series of operations or programs, as is well known in the computer and data processing art. The MSC is connected via control lines to each of the blocks in FIG. 29, however, for purposes of clarity in the drawing the lines from MSC 900 to various ones of the blocks are not shown. The system of the invention is programmed as follows. Note that a single or established program is provided; however, circuit modification could be made if desired to vary the steps and the sequence of steps recited. The MSC 900 clocks from State A to State H.

*State A.*—Actual volume is obtained by summing and the number is transferred to counter as fully explained above.

Maximum height data stored in the comparing circuits 800A, maximum width data stored in comparing circuit 800B, length dimension in length counter 260 (FIG. 18).

Signal from Box-In circuit 259 indicating box exit from light array causes Master Sequence Controller (MSC) 900 to step to State B.

During transition from State A to State B, data is transferred from Counters 262 to Interface Memory Amplifiers 270 and Counters are returned to zero.

*State B.*—Printing cycle initiation to print actual volume from Interface Amplifiers (Interface Memory).

Read height Maximizer into Height Summers and to Height Multiplier Input.

(Note herein, that read-out circuits, not shown, are provided in the system which are of a type well known in the art, and essentially sense when a component is ON or OFF or whether a line is energized or de-energized. Any suitable read-out circuit known in the art may likewise be employed.)

Read Width Maximizer into Width Summers and to Width Multiplier Input.

Multiply Maximum Height × Maximum Width (H×W). Product of H×W goes into counters.

End of multiplication, or end of print cycle whichever occurs last, steps MSC to State C.

During transition from State B to State C the product of Maximum (H×W) is transferred from counters to Interface Memory and Counters are returned to zero.

*State C.*—Read product of Maximum (H×W) from Interface Memory into Height Summers and into Height Multiplier Input.

Read length L from Length Counter into Width Summers and into Width Multiplier Input.

Multiplies, product Maximum (H×W)×L and, the new product representing the cubed volume (H×W×L) goes into counters.

End of multiplication steps MSC to State D.

*State D.*—Read (H×W×L) or cubed volume from Interface Memory to Height Summer and to H Multiplier Input.

Read K9 constant from F factor to Width Quantizers and Summers to Width Multiplier Input. The factor K9 represents a selected density factor in pounds per cubic foot and may be provided by any suitable known means such as by suitable switches and/or variable impedance means to represent the desired number.

Multiply cubed volume by K9 to obtain a product representing Equivalent Weight and sample product to counter.

Initiate printing cycle to print cubed volume from Interface Memory.

End of multiplication or end of printing cycle, whichever comes last, steps MSC to State E.

During transition from State D to State E, equivalent weight is transferred from Counters to Interface Memory and Counters are cleared, i.e., returned to zero.

*State E.*—Read from F (.0464) factor to Height Summers to H Multiplier Input and read length from Length Counter to Width Summer to Width Multiplier Input and multiply to obtain length in feet. Factor (.0464) may be provided by any suitable known means, such as by switching in appropriate resistors representative of the digits in the factor (.0464).

Start print cycle to print equivalent weight from Interface Memory.

At the end of the multiplication, or of the print cycle, which ever is last, steps MSC to State F.

During transition from State E to State F the length in feet is transferred to Interface Memory from Counters, and Counters are returned to zero.

*State F.*—Initiate print cycle to print length in feet from Interface Memory.

Read width from Width Maximizer into Width Summer and to Width Multiplier Input.

Read F factor into Height Summers to Height Multiplier Input. Multiply maximum width × F factor to obtain width in feet. Product transferred to counters.

At the end of the multiplication or of the print cycle, whichever is last, steps MSC to State G.

During transition from State F to State G, the width in feet is transferred from Counters to Interface Memory and Counters are returned to zero.

*State G.*—Initiate print cycle to print width in feet from Interface Memory.

Read Height from Height Maximum into Height Summers and Height Multiplier Input.

Read F factor to Width Summers and Width Multiplier Input.

Multiply (Height × F) and transfer product to counters. End of multiplication or of print cycle, whichever comes last, steps MSC to State H.

During transition from State G to State H transfer Height in feet from counters to Interface Memory and counters are returned to zero.

*State H.*—Initiate printing cycle to print Height in feet from Interface Memory.

Initiate weighing cycle. Weighing circuitry 802 will couple pulses to counter representative of actual weight of box on weight platform 801.

At end of weighing cycle, signal from weighing system transfers Weight from Counters to Interface Memory, clears counters to zero and initiates print cycle.

At the end of print cycle the system becomes quiescent. When the next box enters the light array the MSC control clock advances from State H to State A and the cycle is then repeated.

(Note herein that a digital display 278, also of any suitable known type, may be connected to selectively receive and separately store each of parameters desired, i.e., actual volume, cubed volume, actual weight, equivalent weight, etc.)

While the invention has been particularly shown and described with reference to preferred embodiments thereof, it will be understood by those skilled in the art that various changes in form and details may be made therein without departing from the spirit and scope of the invention. For example, in certain applications, it might be desirable to position the box and then move the lamp frame relative to the stationary box.

We claim:
1. A system for determining the volume of an object comprising, in combination:
   (a) sensing means for sensing first and second dimensions of said object;
   (b) means for providing an indication of a third dimension of said object as a result of the relative movement of said object and said sensing means;
   (c) said sensing means providing indications of said first and second dimensions of said object along said third dimension of said object;
   (d) means for combining said indications of said first and second dimensions with indications of incremental portions of said third dimension to provide indications of the respective volumes of said incremental portions; and
   (e) means for summing the respective volume indications of said incremental portions whereby the total volume of said objective may be determined.

2. A system as in claim 1 wherein said sensing means comprises:
   (a) means for providing a plurality of beams, and means for sensing and detecting when selected ones of said beams are interrupted;
   (b) means for moving an article through the field of the light array whereby selected ones of the beams are interrupted dependent on the height and width dimensions of the portion of said article passing through said light array;
   (c) means responsive to the movement of said article and arranged to initiate the multiplication of the height and width dimensions at discrete intervals as said article moves through said light array; and
   (d) and said summing means comprises counters for receiving and summing the output of said multiplication whereby an indication of the volume of the article may be obtained.

3. A system as in claim 1 wherein said sensing means comprise:
   (a) a first plurality of light sources positioned to provide parallel light beams in a generally horizontal direction;
   (b) a first plurality of light responsive photocells arranged to be selectively responsive to respective ones of said generally horizontally directed light beams;
   (c) a second plurality of light sources arranged to provide a plurality of parallel light beams in a generally vertical direction;
   (d) a second plurality of light responsive photocells arranged to be responsive to respective ones of said generally vertically directed beams;
   (e) said horizontal and vertical light beams comprising a light array in the form of a planar matrix of light beams whereby an article moving through said grid interrupts various ones of said light beams to thereby selectively effect the energization of the respective photocells to actuate said photocells to provide an indication of the vertical and horizontal dimensions of an article; and
   (f) electronic circuitry for resolving the indications from said photocells into electrical data signals.

4. A system in accordance with claim 3 further including:
   (a) a height multiplier input circuit for receiving the height data signals from said electronic circuitry and coupling said data signals to said multiplying means;
   (b) a width multiplier input circuit for receiving the width data signals from said electronic circuitry and coupling said data signals to said multiplying means;
   (c) a multiplier clock for programming the operation of said multiplying means;
   (d) length counting means for providing pulses representative of the movement of the object through said light array, and for initiating the operation of said multiplier clock in accordance therewith; and (e) counter means for receiving and summing the output pulses from said multiplying means.

5. A system as in claim 4 further including:
(a) memory means for receiving and storing the count from said counters;
(b) means for receiving the count from said memory means and recording said count representative of the volume of said object; and
(c) means for initiating the operation of said recording means.

6. A system as in claim 4 wherein:
(a) said multiplier clock is effective to couple said data signals to said multiplying means in programmed sequence; and, wherein said multiplier clock is effective to couple said product of said multiplying means in selected numerical order position of said counter means.

7. A system as in claim 4 further including:
(a) means for energizing said multiplier clock at selected time intervals in response to the passage of an article through said sensing means; and
(b) means for obtaining a signal to initiate the count-operation to provide a count of the number of pulses provided by said multiplying means.

8. A system as in claim 1 wherein said sensing means comprises:
(a) a plurality of banks of electrical beam sensing devices;
(b) one of said banks being located with respect to said object to produce indications of the height of said object; and
(c) another of said banks being located with respect to said object to produce indications of the width of said object.

9. A system as in claim 1 wherein:
(a) said sensing means senses the height and width dimensions of incremental portions of the length dimension of said object periodically to obtain the measurements thereof; and
(b) wherein said combining means comprise means for multiplying the height and width dimension measure-means at intervals indicative of a unit of the length dimension to provide the volume indication of each incremental portion.

10. A system as in claim 1 further including means responsive to the movement of said object relative to said sensing means for initiating a periodic sensing of said dimensions.

11. A system as in claim 10 wherein said responsive means actuates said multiplying means to initiate periodic mutiplications of incremental dimension measurements of said object.

12. A system as in claim 1 comprising:
(a) means for sensing the incremental distance of travel of said object; and
(b) said incremental distance is selected to be a unit value whereby the product of the multiplication of said height and width dimensions is effectively multiplied by a unit value to thus provide a resultant which is representative of the volume of an increment of said object.

13. A system as in claim 3 wherein said electronic circuitry includes:
(a) respective electronic tree circuits connected to said first and second pluralities of photocells; and
(b) said electronic tree circiuts each respectively receiving the output indications from said photocells being connected to the base of said tree circuits and said tree circuits combining and adding the output indications to obtain a single output indication representing a maximum output.

14. A system as in claim 13 wherein:
(a) said tree circuitry combines two lower order circuits into a single higher order circuit in a pyramidal relation, and wherein the highest energized circuit nullifies the output of the preceding lower order circuits coupling a signal thereto.

15. A system as in claim 13 wherein:
(a) said photocells are normally light and are caused to become dark to provide an intelligence signal; and
(b) said tree circuitry including means for enabling two adjacent major photocells to lock-out the output from a photocell intermediate thereto, whereby said intermediate photocell when once caused to change to a dark condition will not affect the circuit output when it returns to a light condition.

16. A system as in claim 13, wherein:
(a) the first and each fifth one of each of said photocells are connected in an electronic tree circuitry arrangement.

17. A system as in claim 16 further including:
(a) first and second output buses;
(b) said photocells intermediate said first and fifth photocells being connected to energize said first bus when a first or fifth photocell in one direction relative thereto is in a dark condition, and to energize said second bus when a first or fifth photocell in said one direction is in a lighted condition.

18. A system as in claim 16 wherein:
(a) the first and each fifth photoccell thereafter are connected as an electronic tree circuitry;
(b) the photocells intermediate said first and fifth photocells are designated as a second group of photocells and are connected to provide distinct outputs; and
(c) means for coupling the outputs from said second group of photocells as first and second unit intelligence dependent on whether the photocells in said first group to the right or left of a given photocell is activated.

19. A system as in claim 16 wherein said tree circuitry includes nullifying means for providing an output representative of the highest value coded output and concurrently deactivating circuitry representing a lower valued coded output.

20. A system as in claim 16 further including:
(a) a summing circuit for summing the outputs from said tree circuitry and providing a coded output.

21. A system as in claim 20 wherein said summing circuit includes means for receiving and adding up to three inputs, and comprising:
(a) an Or logical circuit;
(b) three pairs of double-input logical And circuits;
(c) a triple-input logical And circuit;
(d) means for connecting said Or circuit to provide an output indicative of a first value;
(e) means for connecting said double-input logical And circuit to provide an output indicative of a second value;
(f) means for providing a potential to deenergize the logical Or circuit when one of said double-input And circuits is energized to thereby provide an output indicative of said second value; and,
(g) means connecting said triple-input logical And circuit to overcome the deenergization of said logical Or circuit by said double-input logical And circuit to provide an output indicative of the addition of said first value and said second value when three inputs are received.

22. A system for obtaining the volume of a moving article comprising, in combination:
(a) a photosensitive means positioned to sense the instantaneous height and width dimensions of said moving article;
(b) electronic circuitry responsive to said photosensitive means for providing an electrical data signal representative of the instantaneous height of said moving article;
(c) electronic circuitry responsive to said photosensitive means for providing an electrical data signal representative of the instantaneous width of said moving article;

(d) a process controller for combining and multiplying the electrical data signals representative of the instantaneous height and width dimensions of said moving article, and for providing a pulsed output representative of the product of said multiplication;

(e) means for sensing the movement of said article relative to said photosensitive means, and for activating said process controller to initiate distinct multiplications of said instantaneous height and width dimensions of said moving article at periodic intervals; and (f) counter means for summing the pulsed output of said distinct multiplications to obtain an indication of the total volume of the article.

23. A system as in claim 22 wherein said intervals at which said multiplications are initiated are selected unit values whereby the multiplication of said instantaneous height and width dimensions provide a determination of an incremental volume.

24. A system as in claim 23 wherein said photosensitive means comprise:

(a) light sources and respective photocells;

(b) said light sources being spaced a distance from adjacent light sources a distance of .0464 feet divided by an exact divisor;

(c) said photocells being spaced a distance from an adjacent photocell a distance of .0464 feet divided by an exact divisor; and (d) wherein said intervals are spaced a distance of .0464 feet whereby the incremental volume is obtained by multiplying the height, width, distance of movement of box, and $.0464^3$.

25. A method of determining the volume of an object comprising the steps of:

(a) moving the object and a sensing means relative to one another and utilizing the distance movement of said object relative to said sensing means to provide a length dimension indication;

(b) sensing the height and width dimensions to provide respective indications thereof along said length dimension of said object;

(c) combining said height and width dimension indications of said object at selected incremental length dimension indications to provide a resultant indicative of an incremental volume; and (d) summing said incremental volumes for obtaining the total volume of said object.

26. A method as in claim 25 wherein said step of combining comprises combining by multiplication.

27. A method of determining the volume of an object comprising the steps of:

(a) moving the object and a sensing means relative to one another and utilizing the distance movement of said object relative to said sensing means to provide a first dimension indication;

(b) sensing the second and third dimensions along said length dimension of said object;

(c) combining the indications of said third and second dimensions with indications of incremental portions of said first dimension to provide indications of the respective volumes of said incremental portions; and, (d) summing said incremental volumes for obtaining the total volume of said object.

28. A method of determining the volume of an object comprising the steps of:

(a) moving the object and a sensing means relative to one another and utilizing the distance movement of said object relative to said sensing means to provide a length dimension indication;

(b) sensing said height and width dimensions at selected equal, unit length increments;

(c) combining said incremental height and width indications and multiplying by a unity factor to obtain an incremental volume; and, (d) summing said incremental volumes for obtaining the total volume of said object.

29. A system for determining the volume of an object comprising, in combination:

(a) means for moving an object along a selected path;

(b) means mounted substantially in a single plane for periodically sensing the instantaneous dimensions of said object in directions transverse to said path;

(c) means for periodically multiplying said instantaneous object dimensions as said object moves along said path; and (d) means for summing the products of said multiplications whereby the volume of the object may be obtained.

References Cited

UNITED STATES PATENTS

| 2,360,883 | 10/1944 | Metcalf. |
| 2,346,031 | 4/1944 | Jones et al. |
| 2,630,043 | 3/1953 | Kolisch. |
| 2,708,368 | 5/1955 | Kolisch. |
| 2,727,391 | 12/1955 | Kolisch 73—432 |
| 2,968,210 | 1/1961 | Perrozzi. |
| 3,154,673 | 10/1964 | Edwards. |

OTHER REFERENCES

Granville, W. A. et al.: Elements of the Differential and Integral Calculus, Ginn and Co., Boston, Mass., 1941, pp. 283–285.

GARETH D. SHAW, Primary Examiner

H. E. SPRINGBORN, Assistant Examiner

U.S. Cl. X.R.

356—157

UNITED STATES PATENT OFFICE
CERTIFICATE OF CORRECTION

Patent No. 3,513,444                                                          May 19, 1970

Robert M. Henderson et al.

It is certified that error appears in the above identified patent and that said Letters Patent are hereby corrected as shown below:

Column 7, line 18, "NA" should read -- $N_1$ --. Column 8, line 75, "groups" should read -- grouped --. Column 9, line 15, "0.232" should read -- .0232 --; line 35, after "array" cancel "of". Column 11, line 20, "resistors" should read -- resistor --. Column 12, line 30, "1ine," should read -- line. --; line 73, "sistor 57 ON." should read -- sistor 57 to turn transistor 57 ON. --. Column 13, line 13, "43" should read -- 53 --. Column 19, line 30, "134" should read -- 143 --. Column 20, line 16, "of", second occurrence, should read -- to --. Column 21, line 62, "ad" should read -- and --. Column 22, line 20, "or" should read -- of --; line 68, "on" should read -- an --. Column 26, line 5, "commuting" should read -- computing --; line 67, "+" should read -- - --. Column 27, line 8, "0.232" should read -- .0232 --; line 67, "seletced" should read -- selected --. Column 33, line 75, "24" should read -- 25 --. Column 35, line 45, "X+" should read -- B+ --. Column 36, line 33, "Multiplex" should read -- Multiplier --; line 36, "directed" should read -- described --. Column 38, line 20, "those" should read -- base --. Column 45, line 63, "10-$^1$" should read -- $10^1$ --. Column 46, line 1, "base of" should read -- base current of --. Column 48, line 49, "circuit" should read -- circuitry --. Column 50, line 16, after "and" insert a comma; line 21, "objective" should read -- object --. Column 51, line 22, "count" should read -- counting --. Column 52, line 25, "photoccell" should read -- photocell --.

Signed and sealed this 23rd day of March 1971.

(SEAL)
Attest:

EDWARD M. FLETCHER, JR.                                        WILLIAM E. SCHUYLER, JR.
Attesting Officer                                                  Commissioner of Patents